Dec. 23, 1941.  A. H. CHURCH  2,267,015
APPARATUS FOR ASSEMBLING NOZZLE CLOSURE MEANS FOR CONTAINERS
Filed Aug. 15, 1938   17 Sheets-Sheet 1
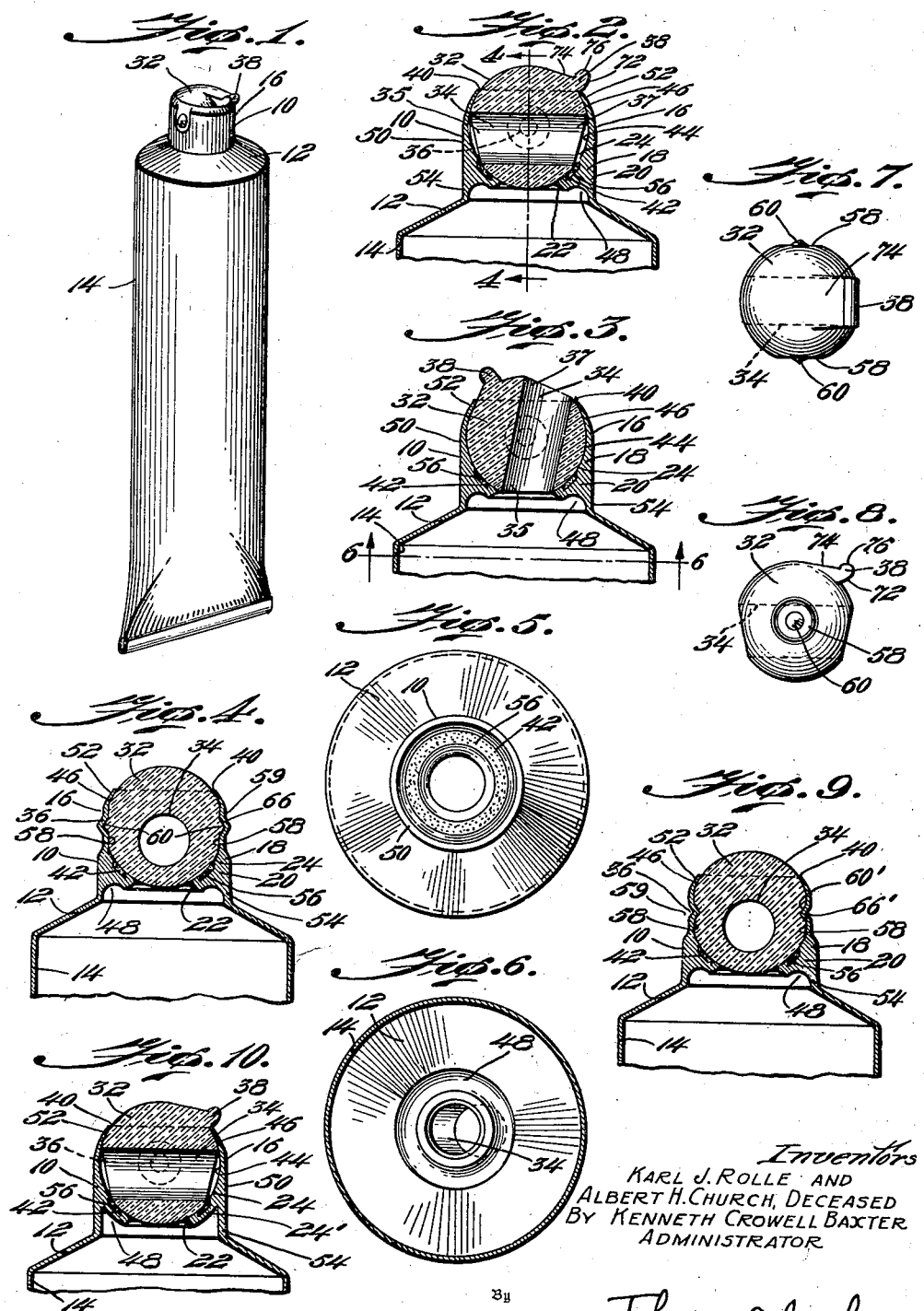
Inventors
KARL J. ROLLE AND
ALBERT H. CHURCH, DECEASED
BY KENNETH CROWELL BAXTER
ADMINISTRATOR
By Thomas A. Jenckes
Attorney Dec. 23, 1941.            A. H. CHURCH                    2,267,015
       APPARATUS FOR ASSEMBLING NOZZLE CLOSURE MEANS FOR CONTAINERS
                   Filed Aug. 15, 1938         17 Sheets-Sheet 2

Inventors
KARL J. ROLLE AND
ALBERT H. CHURCH, DECEASED
BY KENNETH CROWELL BAXTER
   ADMINISTRATOR Thomas A. Jenckes
                    Attorney Dec. 23, 1941.  A. H. CHURCH  2,267,015
APPARATUS FOR ASSEMBLING NOZZLE CLOSURE MEANS FOR CONTAINERS
Filed Aug. 15, 1938   17 Sheets-Sheet 3
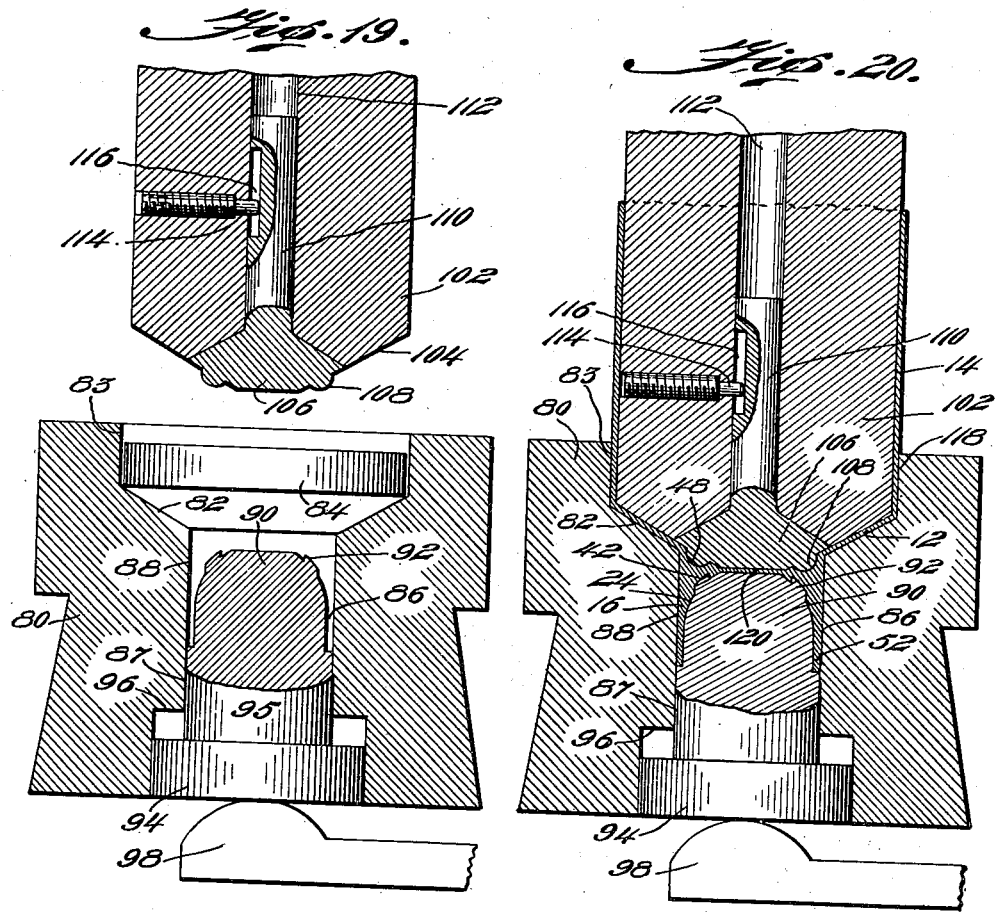
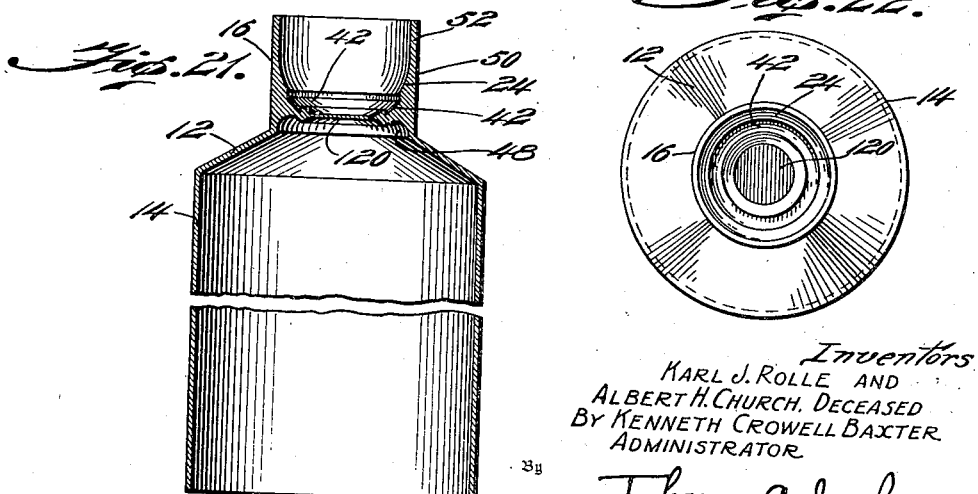
Inventors
KARL J. ROLLE AND
ALBERT H. CHURCH, DECEASED
BY KENNETH CROWELL BAXTER
ADMINISTRATOR
By Thomas A. Jenckes
Attorney

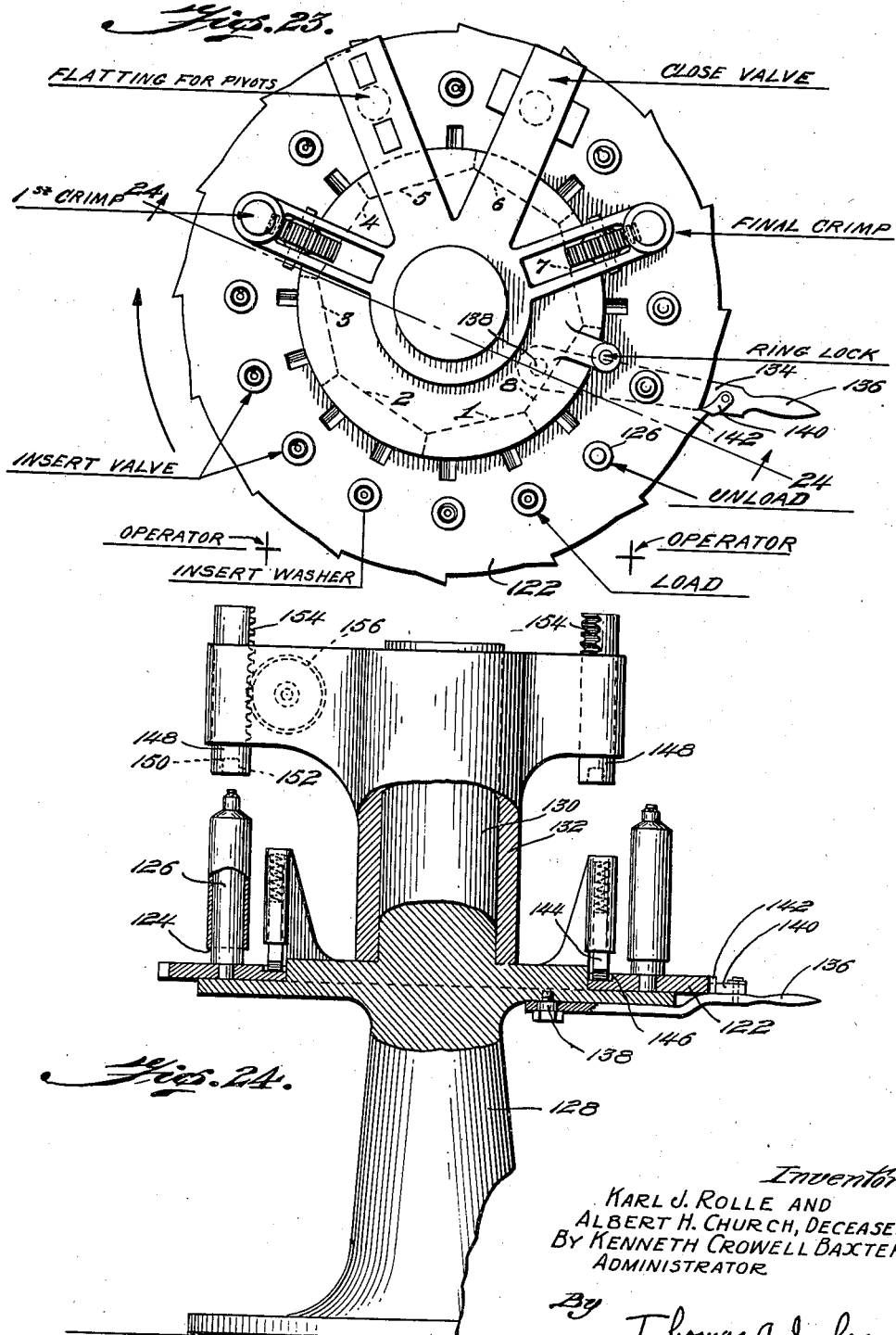

Dec. 23, 1941.    A. H. CHURCH    2,267,015
APPARATUS FOR ASSEMBLING NOZZLE CLOSURE MEANS FOR CONTAINERS
Filed Aug. 15, 1938    17 Sheets-Sheet 5

Inventors
KARL J. ROLLE AND
ALBERT H. CHURCH, DECEASED
BY KENNETH CROWELL BAXTER
ADMINISTRATOR
By Thomas A. Jenckes
Attorney Dec. 23, 1941.  A. H. CHURCH  2,267,015
APPARATUS FOR ASSEMBLING NOZZLE CLOSURE MEANS FOR CONTAINERS
Filed Aug. 15, 1938  17 Sheets-Sheet 6

Inventors
KARL J. ROLLE AND
ALBERT H. CHURCH, DECEASED
BY KENNETH CROWELL BAXTER
ADMINISTRATOR
By Thomas A. Jenckes
Attorney

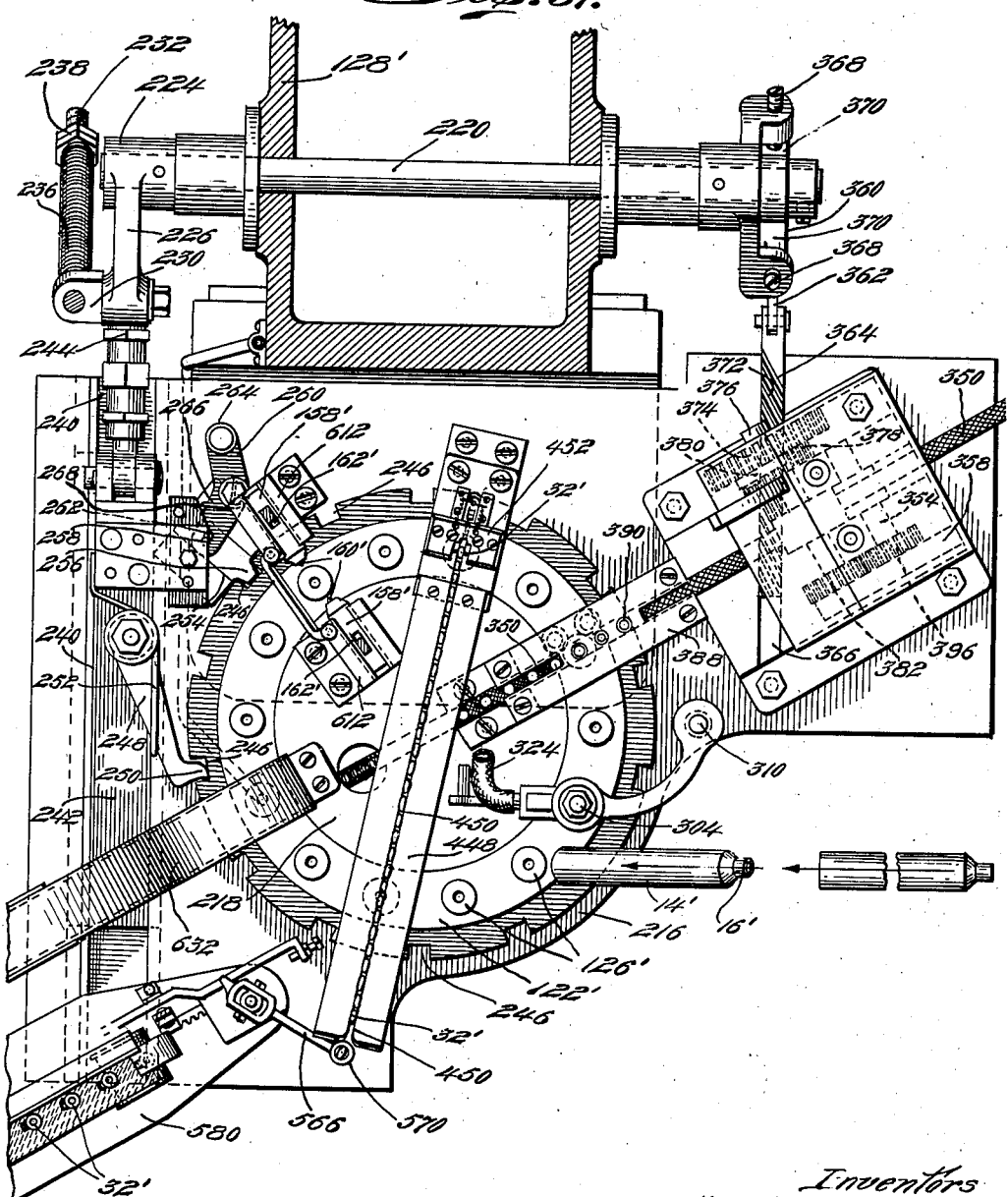

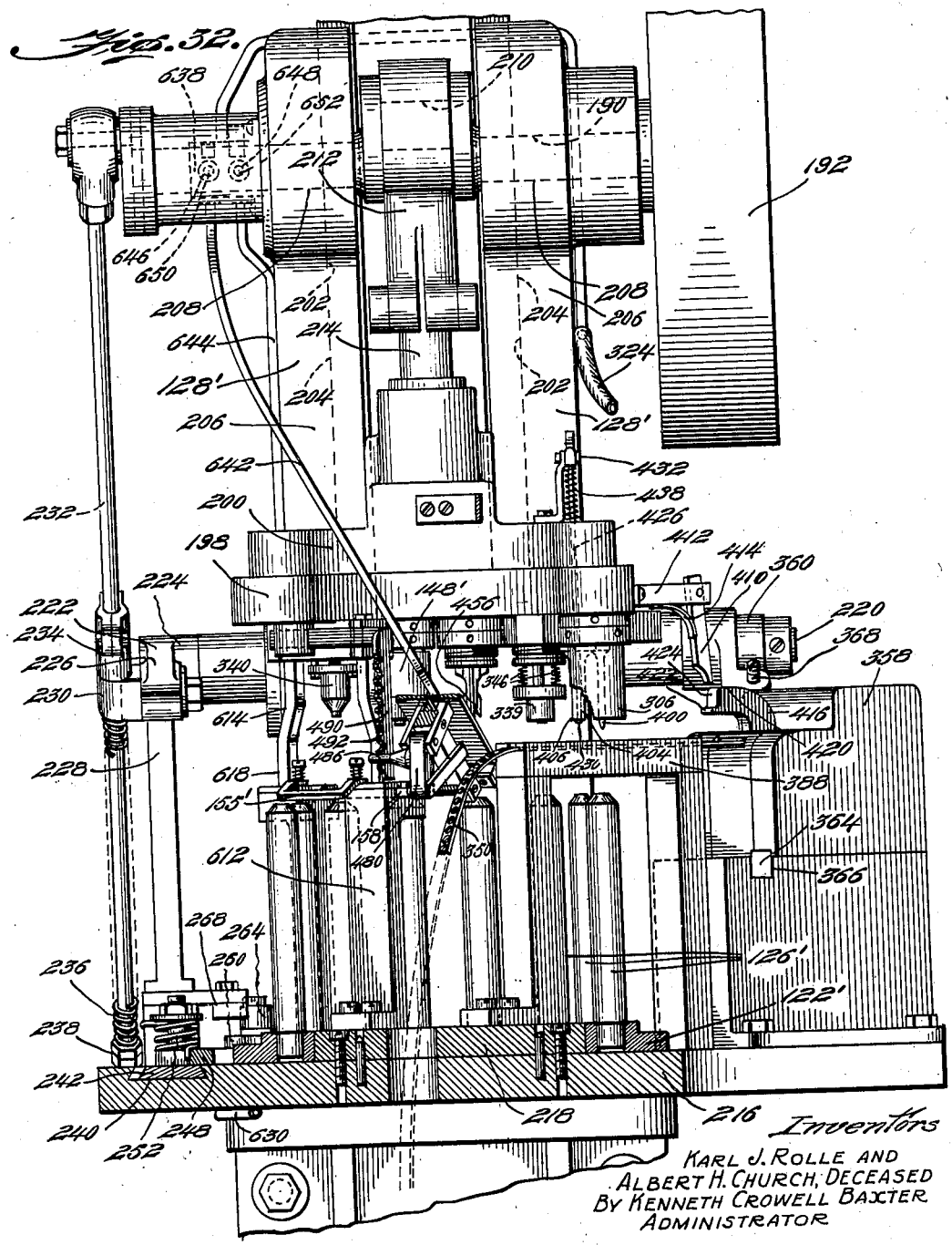

Dec. 23, 1941.  A. H. CHURCH  2,267,015
APPARATUS FOR ASSEMBLING NOZZLE CLOSURE MEANS FOR CONTAINERS
Filed Aug. 15, 1938   17 Sheets-Sheet 9
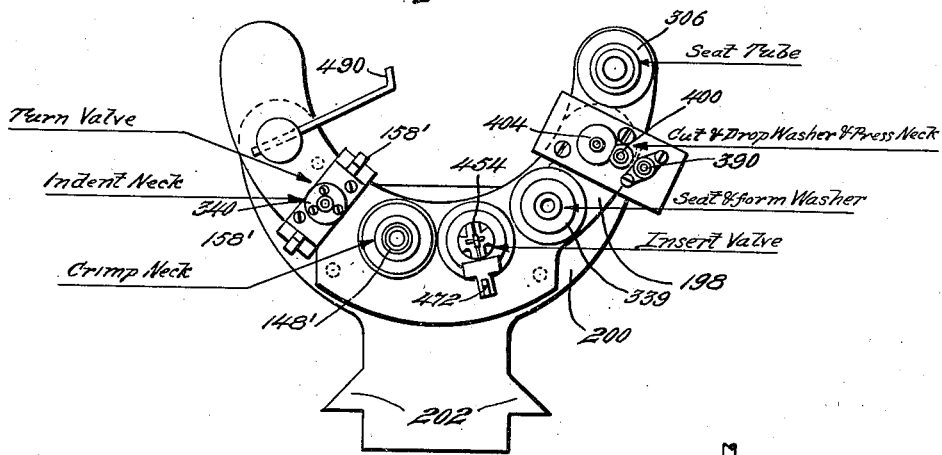
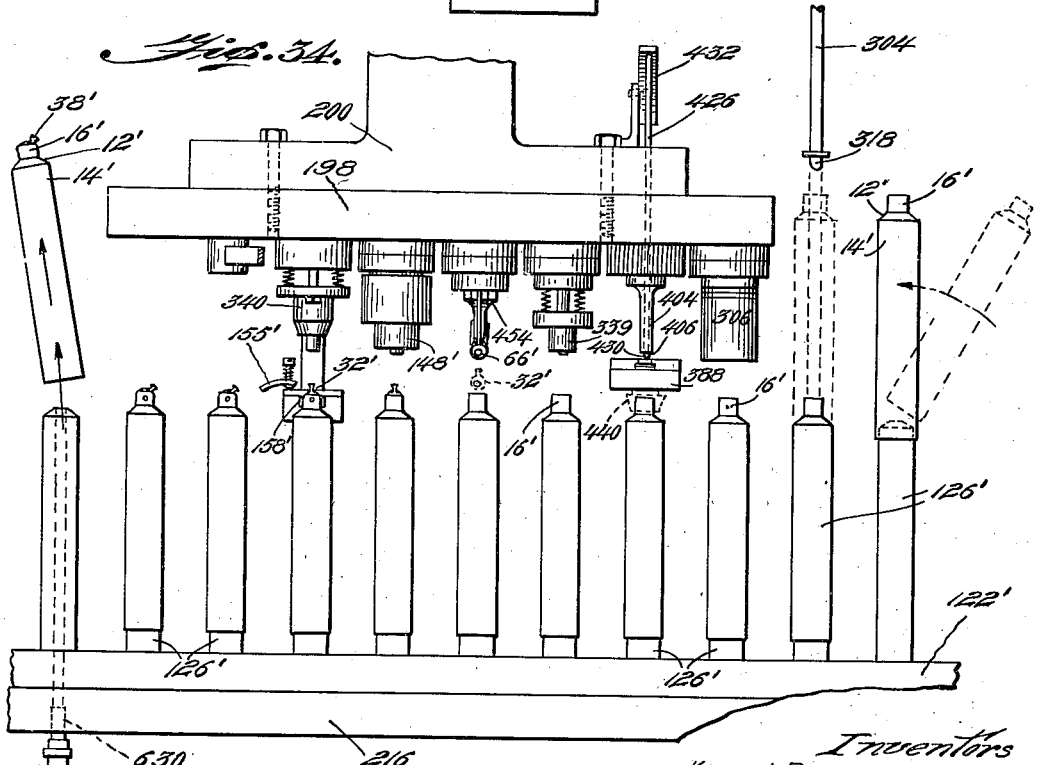
Inventors
KARL J. ROLLE AND
ALBERT H. CHURCH, DECEASED
BY KENNETH CROWELL BAXTER
ADMINISTRATOR
By Thomas A. Jenches
Attorney

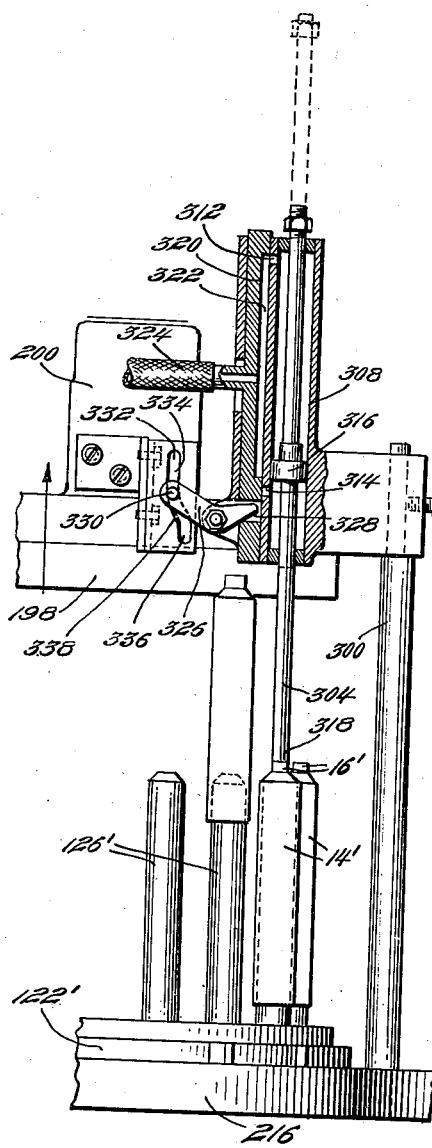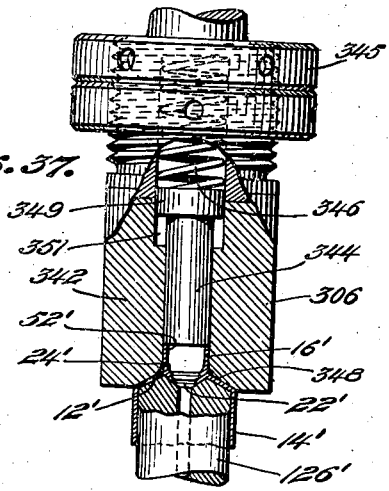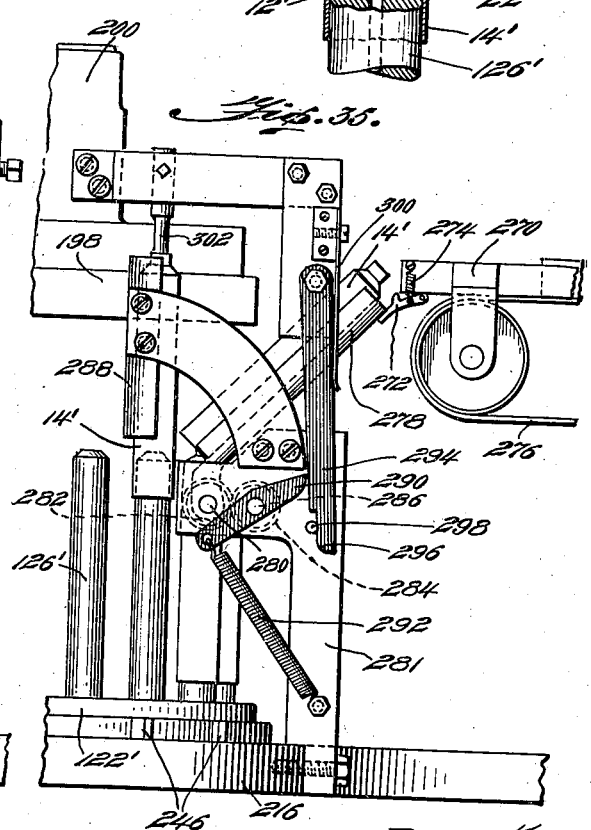

Dec. 23, 1941.  A. H. CHURCH  2,267,015
APPARATUS FOR ASSEMBLING NOZZLE CLOSURE MEANS FOR CONTAINERS
Filed Aug. 15, 1938  17 Sheets-Sheet 11
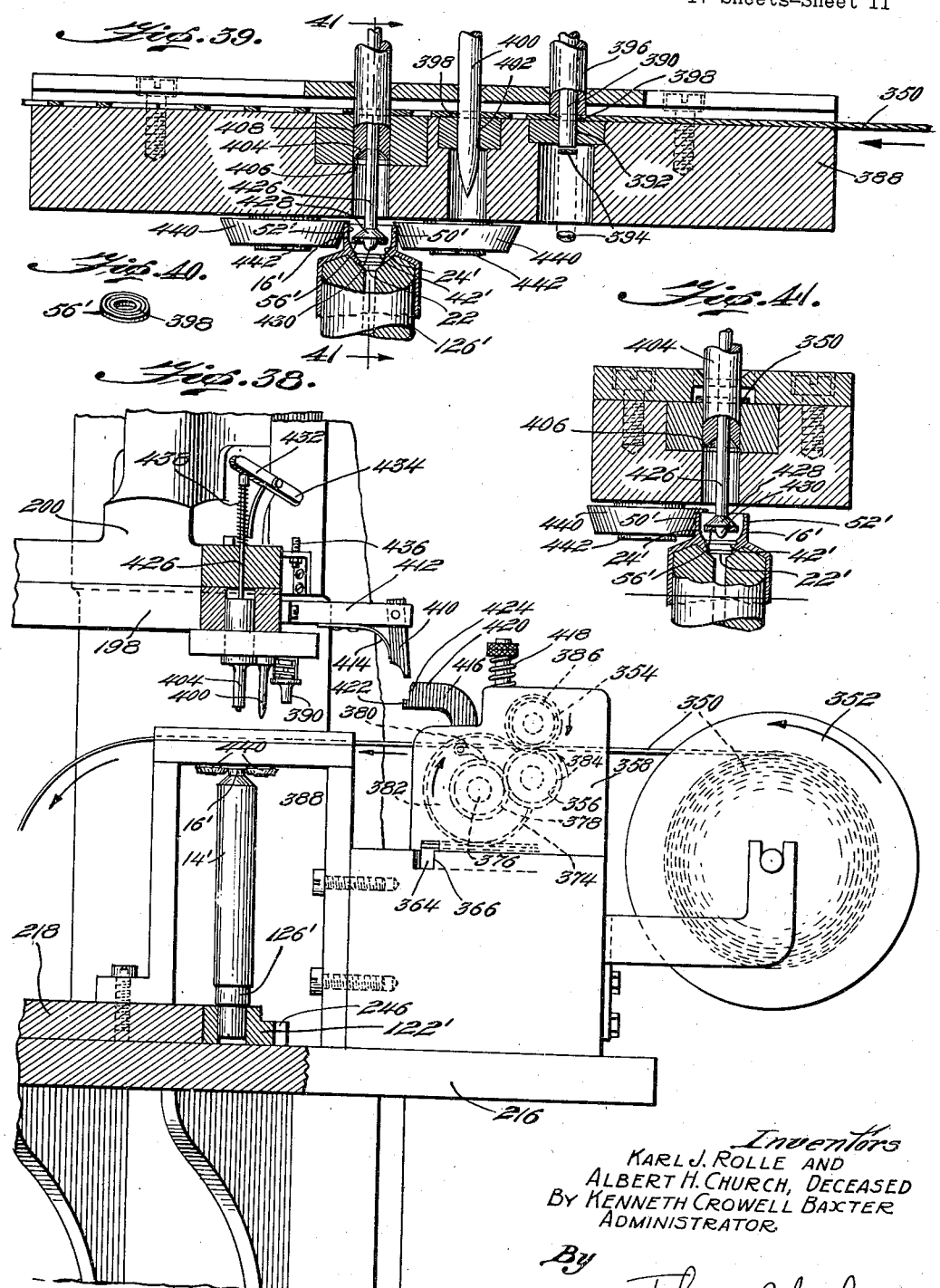
Inventors
KARL J. ROLLE AND
ALBERT H. CHURCH, DECEASED
BY KENNETH CROWELL BAXTER
ADMINISTRATOR.
By Thomas A. Jenckes
Attorney Dec. 23, 1941.　　　A. H. CHURCH　　　2,267,015
APPARATUS FOR ASSEMBLING NOZZLE CLOSURE MEANS FOR CONTAINERS
Filed Aug. 15, 1938　　　17 Sheets—Sheet 12
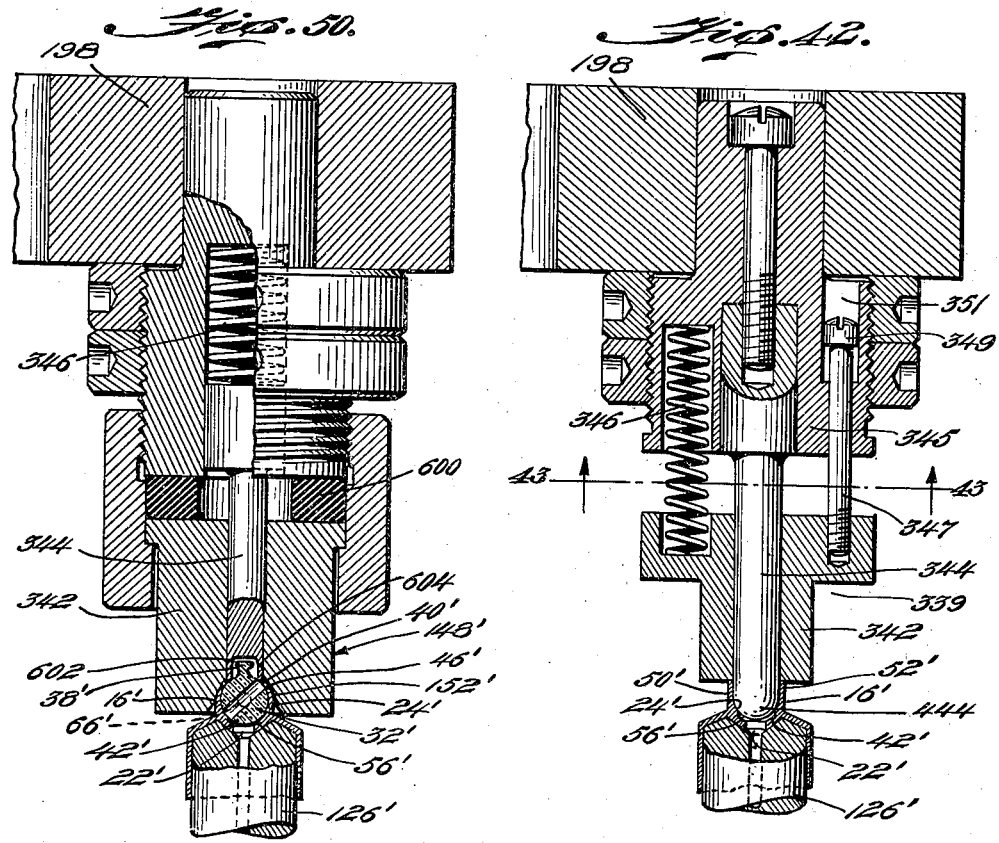
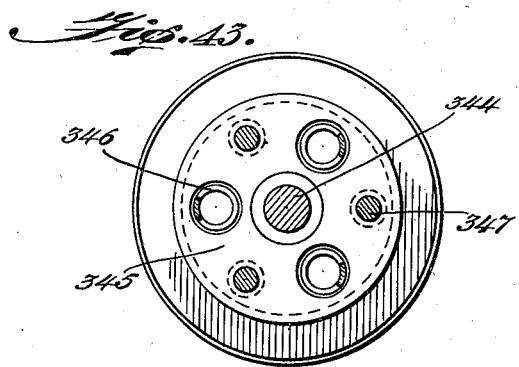
Inventors
KARL J. ROLLE AND
ALBERT H. CHURCH, DECEASED
BY KENNETH CROWELL BAXTER
ADMINISTRATOR
By　Thomas A. Jenckes
　　　Attorney Dec. 23, 1941.　　　　　A. H. CHURCH　　　　　2,267,015
APPARATUS FOR ASSEMBLING NOZZLE CLOSURE MEANS FOR CONTAINERS
Filed Aug. 15, 1938　　　17 Sheets-Sheet 13
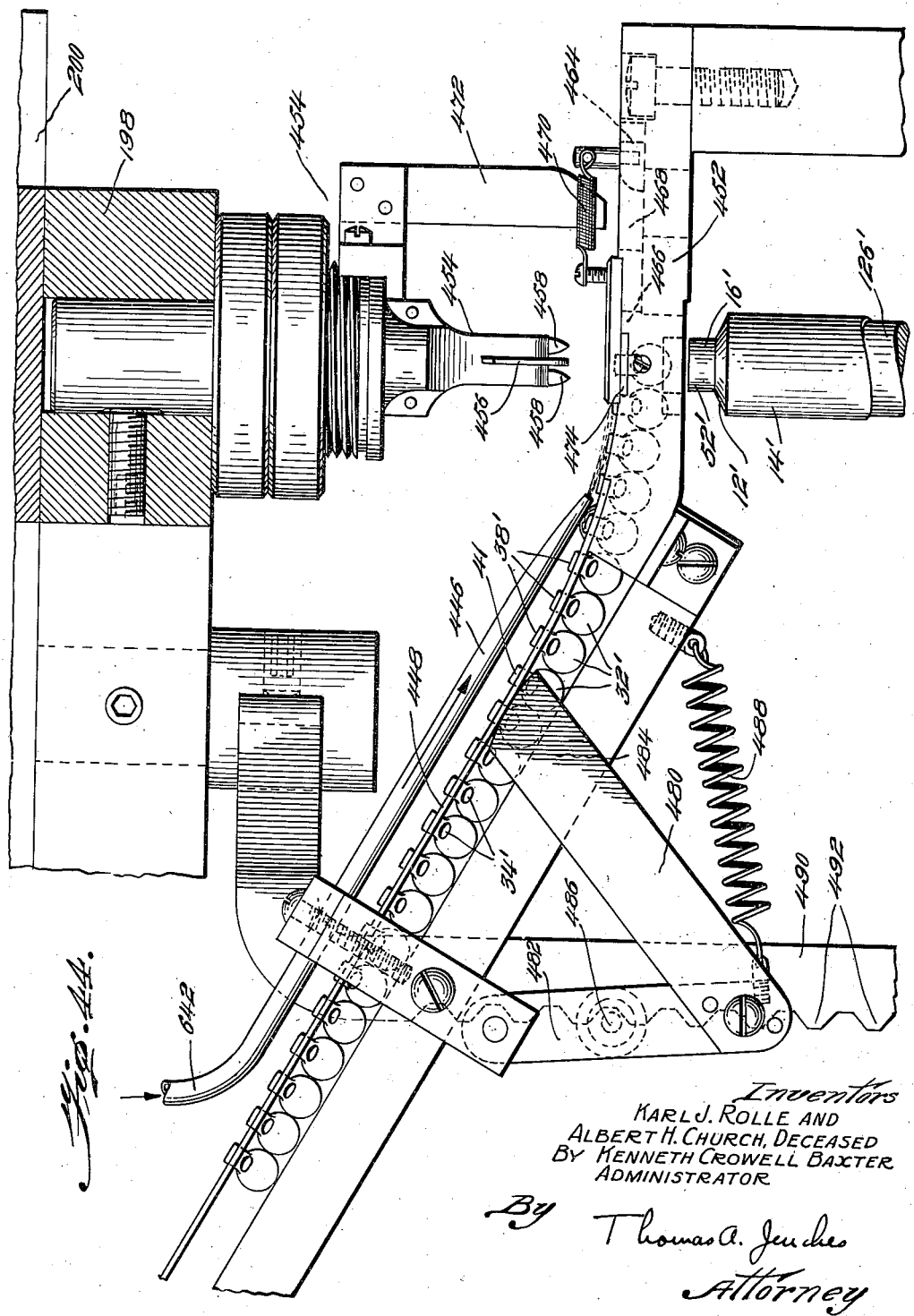
Inventors
KARL J. ROLLE AND
ALBERT H. CHURCH, DECEASED
BY KENNETH CROWELL BAXTER
ADMINISTRATOR
By Thomas A. Jenckes
Attorney

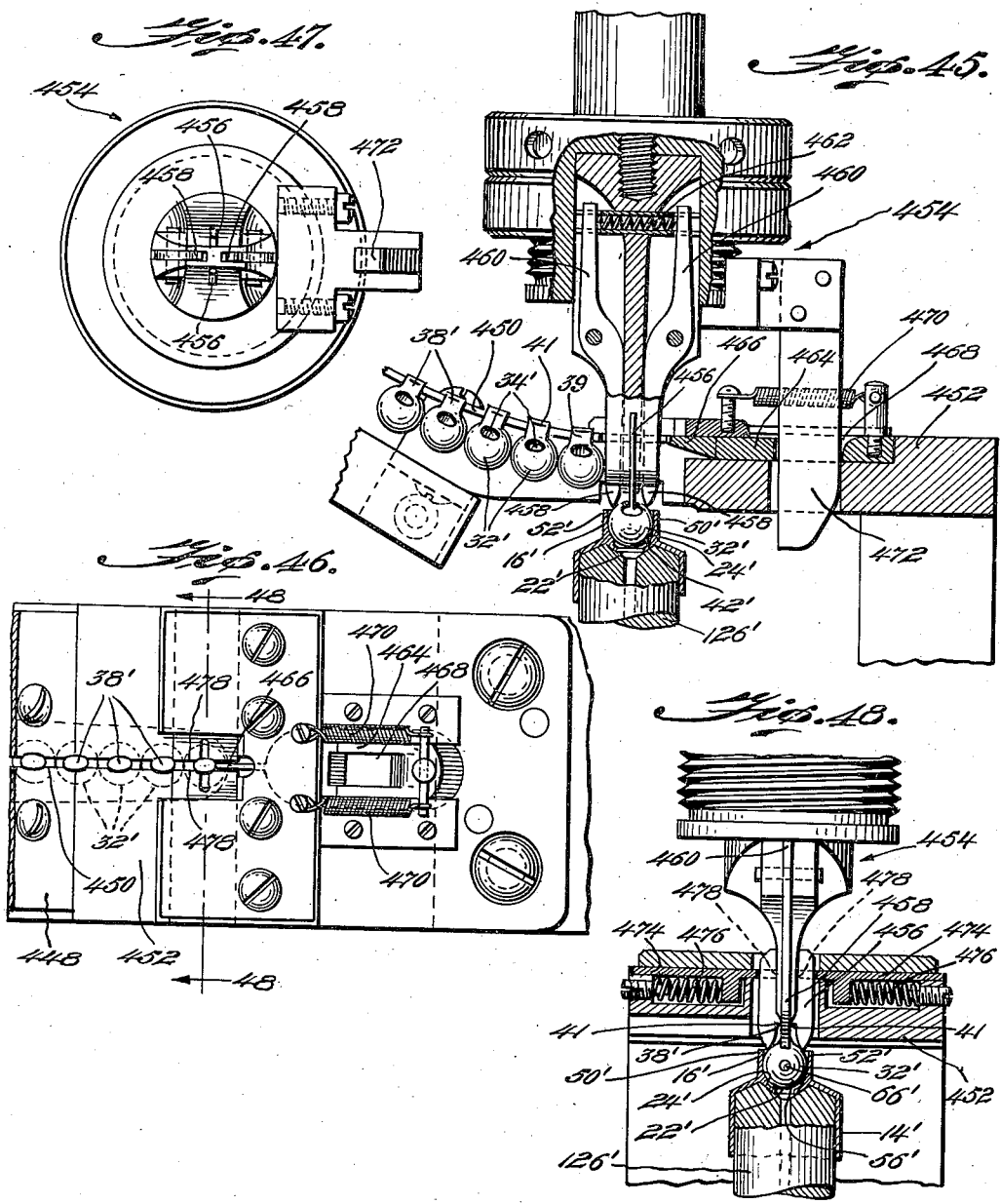

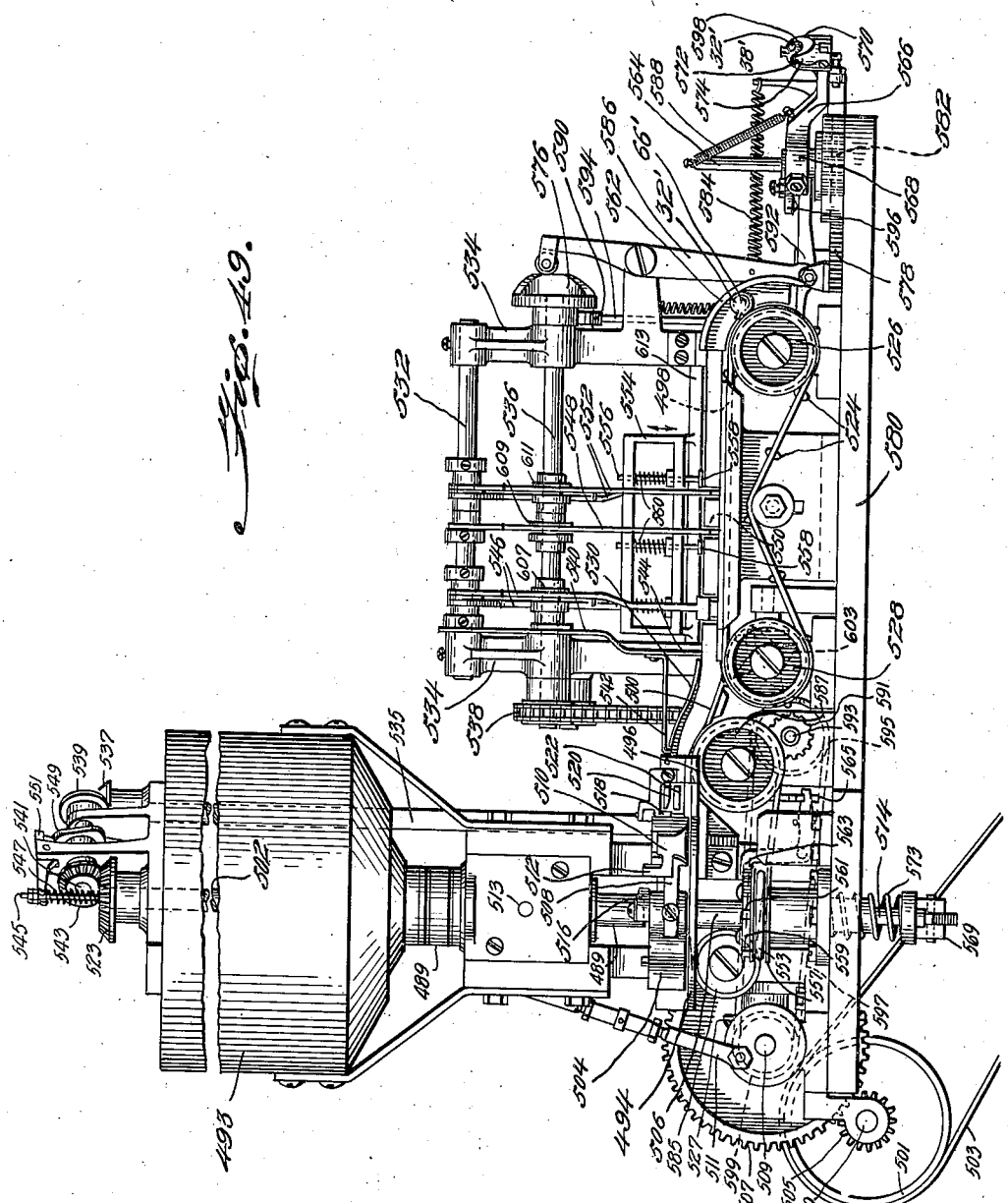

Dec. 23, 1941.  A. H. CHURCH  2,267,015
APPARATUS FOR ASSEMBLING NOZZLE CLOSURE MEANS FOR CONTAINERS
Filed Aug. 15, 1938   17 Sheets-Sheet 16

Inventor
Karl J. Rolle and
Albert H. Church, deceased
By Kenneth Crowell Baxter
Administrator
Thomas A. Jancks  Attorney Dec. 23, 1941.  A. H. CHURCH  2,267,015
APPARATUS FOR ASSEMBLING NOZZLE CLOSURE MEANS FOR CONTAINERS
Filed Aug. 15, 1938  17 Sheets-Sheet 17
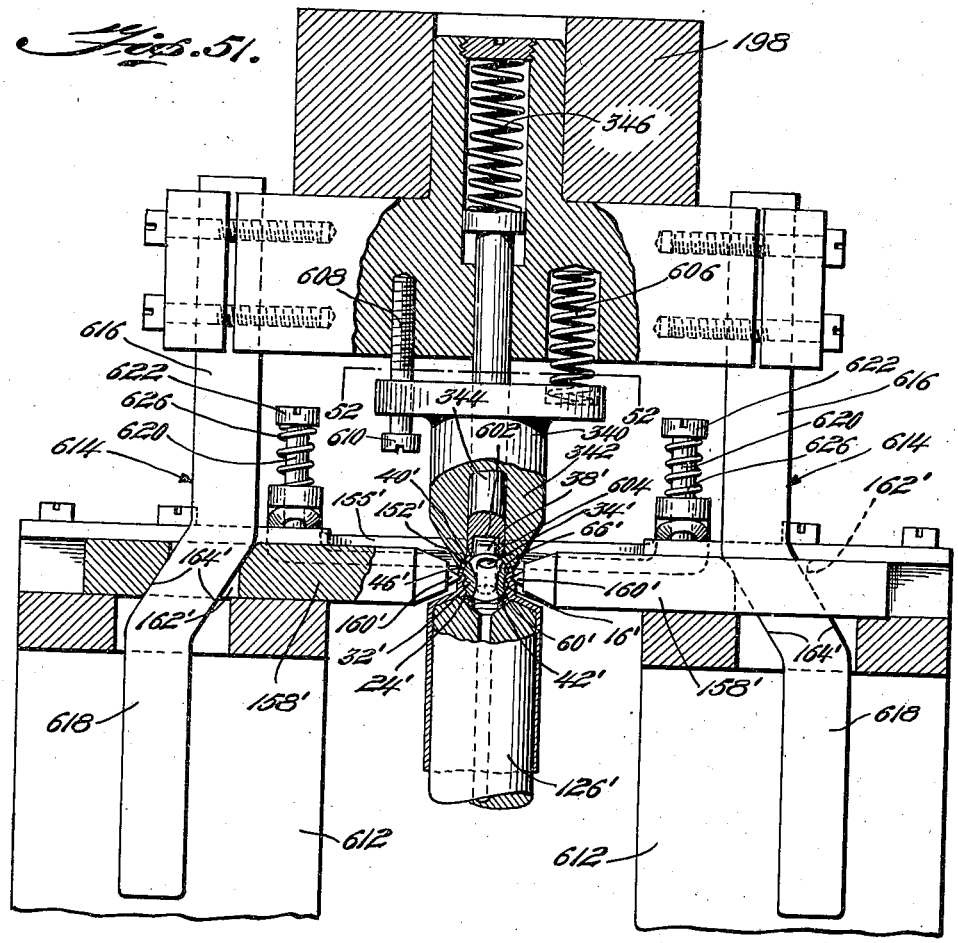
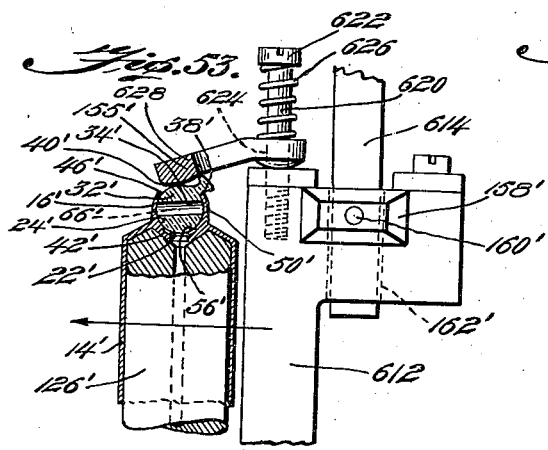
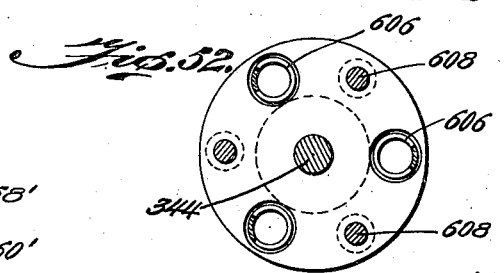
Inventors
KARL J. ROLLE AND
ALBERT H. CHURCH, DECEASED
BY KENNETH CROWELL BAXTER
ADMINISTRATOR
By Thomas A. Jenckes
Attorney Patented Dec. 23, 1941

2,267,015

UNITED STATES PATENT OFFICE 2,267,015

APPARATUS FOR ASSEMBLING NOZZLE CLOSURE MEANS FOR CONTAINERS

Albert H. Church, deceased, late of Providence, R. I., by Kenneth Crowell Baxter, administrator, Providence, R. I., and Karl J. Rolle, Cranston, R. I., assignors to No-Kap Closures (U. S. A.) Inc., Providence, R. I., a corporation of Rhode Island Application August 15, 1938, Serial No. 224,948

63 Claims. (Cl. 29—33)

Our invention relates to improvements in nozzle closure means for containers, cans, tubes, bottles or the like. While our invention is particularly adapted for use with collapsible tubes, in which at least a portion of the valve seat for the oscillatable, substantially spherical valve closure member thereof may be extruded simultaneously with the extrusion of the tube, it is equally applicable as a bottle nozzle closure means, provided, if desired, with a depending flange, similar to the upper end forming flange of a collapsible tube and also, if desired, with a nozzle extension projecting downwardly therefrom adapted to fit within itself being provided with an extension going around the neck of the bottle. It is apparent when it is applied to cans and containers, either the whole can or container or the top of the container only may be extruded or formed simultaneously with the formation of the nozzle and valve seat. The invention is adapted to dispense materials in powder form and more particularly is adapted to dispense materials in plastic, semi-plastic partially liquified form or liquid form and to provide at all times a positive closure for the nozzle means thereof which will not leak and has been proven in tests not to leak with water, glycerine or other types of chemicals over a long period of time.

While we are aware that others have provided nozzle closure means for containers, bottles, cans, tubes and the like having at least a partially spherical closure member functioning as a valve and rotatably mounted in a suitably formed valve seat in the nozzle thereof, so far as we are aware these have been largely paper patents either impossible to manufacture or only made at a great expense. We believe that we are the first therefore to provide a nozzle closure means of this type which may be manufactured on a practical commercial basis in the manner described herein and which is positively liquid, chemical and air resistant, and in which the valve forms preferably with a countersunk washer, a liquid, chemical and air resistant positive joint when in closed position and which may be readily manufactured in the simple manner shown herein and at a cost to make this type of a valve closure means possible under competitive conditions with other types of closure means now on the market.

As stated hitherto, the great difficulty with devices of this description has been that the valve action is not air or liquid resistant. An object of our invention therefore, is to provide a nozzle closure means of this general description in which the valve action is air, liquid and chemical resistant, and to this end we broadly provide, in combination, a valve seat constructed of thin more or less slightly yieldable metal preferably in such a manner that it of itself may be slightly yieldable, and construct the valve itself preferably of a predetermined chemical resistant preferably slightly yieldable composition material which functions in combination with the metal of the valve seat to form a substantially yieldable air and liquid tight joint at all times.

As a further precaution to insure an air tight, liquid tight joint, we preferably provide in the valve seat a countersunk preferably resilient fibre or other type of washer to positively bear against the oscillatable valve at all times to insure a tight joint, said washer being preferably countersunk within the valve seat to keep it in accurate alignment therein at all times.

Great difficulty has been hitherto experienced in the manufacture of collapsible tubes, containers and closure means therefor, in providing a closure joint resistant to the specific chemicals which may be contained within the contents of said cans, containers, tubes, bottles or the like. By employing plasticizable composition material we have been able to select the materials of which the valve is made to make it resistant specifically against the known chemicals in the contents of the container, for instance, resistant to mild acids, alkalis, alcohol, other solvents etc., and we therefore construct the material of which our valve is preferably made of predetermined chemical characteristics to be so resistant.

Further objects of our invention are not only to provide a nozzle closure means of the type mentioned above which may be readily and simply manufactured, but also to provide one which will positively oscillate and which will function to close or open the nozzle at all times. We preferably provide a turning lug projecting upwardly through the open end of the nozzle to limit the oscillatable movement of the valve member from an open to a closed position by the sides of said lug abutting the sides of the upper end of the nozzle. We also provide means to positively pivot the valve member on a defined horizontal axis so that it may positively function at all times and not tend to slip around within the valve seat so that the end or ends thereof will not come into accurate alignment with the nozzle end or ends. In order that the turning lug may positively function to both open and close the valve, we construct it so that in closed position the upper surface thereof projects substantially tangentially from the top of the valve, so that it may be readily opened and provide the end of said lug having a tangential upper surface with an upturned portion to form an upwardly projecting tip or projection for the ready oscillation of said valve from an open to a closed position.

Further features of our invention relate to the improved method of manufacture of and certain details of construction thereof so that it may be readily manufactured in a commercial and practical manner. Thus we preferably mold the valve closure member with flattened opposite sides to assist in forming an axis of rotation therefor and we provide centrally thereof outwardly projecting pivot lugs of a length with the said adjacent central valve portion of substantially the exact diameter of said sphere so that if the valve be molded in hemi-spherical molds, the mold line will substantially pass through the centers of said flattened side portions and said lugs to permit the ready removal thereof in an easier manner than if indentations were provided in said flat portions which would be hard and almost impossible to remove from the molds, and as the total length of said pivot lugs taken through the axis thereof is not greater than that of the diameter of said sphere so that they may be more readily removed from the molds. A further detail in the construction of our valve which makes pressure molding thereof possible is the particular shape of the turning lug we preferably employ which includes a curved lower surface and a flat upper surface substantially tangential to said spherical valve and terminating in an upwardly bent outer end meeting said lower surface to form an outwardly projecting lug being so shaped for a double purpose namely so that said integrally molded lug may be readily pivoted out of a hemispherical valve mold by pivoting it therefrom on the point of contact of said mold with the lower surface of said lug, and to provide a turning lug engageable by the finger which will oscillate the valve in either direction.

A further feature of our valve construction is that we provide means for readily pivotally attaching it on a fixed axis within the relatively thin upper portion of the nozzle wall, it being only necessary to insert the valve closure member within the partially spherical extruded recess or lower valve seat portion and press inwardly diametrically opposite portions of said relatively thin nozzle upper wall against said diametrically opposite flat valve portions to cause the pivot lugs to be imbedded within the nozzle wall to form sockets to receive said pivot lugs to provide an axis of rotation for said valve.

Further features of the inherent construction of our improved closure device are that we provide a nozzle which may be readily extruded from a circular, annular or other type of blank in the form of a nozzle having a partially spherical lower valve seat portion in a thickened or lower portion thereof and a relatively thin upper wall projecting substantially vertically upwardly from said lower valve seat portion after which the insertion of the valve member therein may be readily crimped downwardly over said valve to provide a supplemental partially spherical upper valve seat portion for the upper portion of said valve to firmly retain it in position against said washer where employed and said lower valve seat portion formed during the extrusion process.

A further feature of our particular construction is that the countersunk annular recess for receiving the washer may be readily extruded in the valve seat simultaneously with the extrusion of the nozzle and also if desired supplemental metal saving recess means may be formed in the lower surface of said thickened portion to save the expense of additional metal or, if desired, the valve seat may be formed from an inwardly depending annular flange projecting inwardly from said nozzle. If desired, however, the countersunk washer receiving recess may be readily formed in the upper portion as well as the lower portion of said valve seat during the extrusion process.

Further objects of our invention therefore are to provide a novel method of pressure molding of selected predetermined chemical resistant composition material in which a valve of the desired type may be readily made at a minimum cost.

Further objects of our invention are to provide a novel type of extrusion apparatus and process for manufacturing the nozzle portion of our invention with a suitable lower partially spherical valve seat portion in a thickened portion of said nozzle preferably having a countersunk washer receiving recess therein and with the lower surface of said thickened portion underneath said valve seat being partially removed to save metal; preferably extruded simultaneously with a flange projecting outwardly from a downwardly depending nozzle extension or a complete container or tube as shown.

Further features of our invention relate to the various features of construction of our valve and nozzle members hitherto described which function to provide a novel method of assembling them into a nozzle closure unit which may be entirely manual, semi-automatic, or completely automatic.

Further features of our invention are to provide an improved apparatus for such assembly, being either fully automatic or requiring at the most a single operator. By providing the valve structure hitherto described and the valve seat structure also described in said nozzle, we have provided a construction whereby the nozzle may be readily mounted on a rotatable ring or conveyor and the following sequence of steps performed thereon during intermittent intervals of movement of said rotatable ring or conveyor, namely, (1) the mounting of said nozzle on suitable means on said conveyor, (2) manufacture, shaping and insertion of the fibre washer within the countersunk valve seat in the lower valve seat portion of said nozzle or upper valve seat portion, if desired, (3) the insertion of the oscillatable valve closure member so as to abut said washer and lower valve seat nozzle portion in correct alignment, (4) the downward crimping of said nozzle upper wall to provide a partially spherical upper valve seat portion enclosing said valve member and firmly securing it against said washer and said lower valve seat portion, (5) the inwardly pressing diametrically opposite portions of said relatively thin upper wall against said diametrically opposite flattened valve portions to form flat abutting surfaces to accurately align the axis of oscillation of said valve within said nozzle and to simultaneously press the pivot lugs where employed into the relatively thin nozzle wall to form sockets therein to receive said pivot lugs to positively provide an axis of rotation for said valve member to keep the discharge passage thereof in the desired alignment with the dispensing holes at the upper and lower ends of said nozzle when in open position, (6) oscillating said valve turning lug to move said valve member to a position closing said nozzle either by hand or by automatic means if desired, (7) again crimping the upper portion of said nozzle wall over said valve member to align said hollow upper valve seat portion and seal said valve in a shipping position and, (8) removing said assembled nozzle from said conveyor or ring. If desired, however, the first and second crimping steps and inwardly pressing axis forming steps may be performed simultaneously, the portions of the upper side wall of the nozzle being pressed inwardly against the flat diametrically opposite valve side portions to provide the flat abutting surfaces and lug sockets to provide a true axis of oscillation for said valve member while the upper end of said nozzle wall portion is being bent downwardly over the upper surface of said valve to form the upper valve seat portion, it being apparent that these two operations are performed simultaneously with the crimping step, preferably maintained slightly longer. In our preferred embodiment, we have shown mandrel means for supporting the nozzle during this sequence of steps and indexing means to advance said ring or conveyor amounts to progressively change stations to permit the above described sequences of assembly steps to be performed thereon during the intervals between said progressive advancements. It is obvious that any type of continuous conveyor may be employed and in our preferred embodiment we preferably employ a ring rotatably mounted on a suitable standard on which the desired tools to accomplish the steps described are mounted on the respective stations thereof to perform the actual work thereon at these stations between the intermittent intervals of movement of said conveyor or ring.

Further features of our invention are therefore to provide a novel type of apparatus for this method of assembly which may be done either by hand, semi-automatically, or fully automatically to save the number of operatives required.

While our invention is particularly applicable for use in the manufacture of collapsible tubes, cans, containers, etc., which may have either the upper portion or entire body thereof simultaneously extruded with the formation of the nozzle, it is apparent that our invention may be equally applicable to bottle closures which may also be provided with an outwardly projecting annular flange analogous to a can or container top or collapsible tube top and if desired the nozzle portion may be extended below said spherical valve seat portion in the extrusion process to provide means whereby an annular cork or other device may be employed to surround said extruded nozzle for insertion within a bottle neck. If desired, the entire valve closure member may be constructed hollow and the valve seat portion of the nozzle similarly enlarged if necessary so as to receive and dispense a predetermined bulk of powder, liquid, or other material contained within said hollow valve. For this purpose we preferably provide the hollow valve seat portion with a single discharge end and we preferably construct the cooperating surfaces of the nozzle side wall and the nozzle inlet and outlet holes so that the predetermined bulk holding hollow valve may be moved to three positions, namely (1) a position to fill said hollow valve when the bottle or container is in inverted position, (2) to a loaded position in which the hollow valve is turned so that the discharge vent is completely sealed by the side wall of the nozzle, which position may provide a convenient loaded position taking a much less time to dispense from than if first filling the hollow valve portion and immediately discharging it, and (3) to a position bringing the discharge vent in the hollow valve member into substantial alignment with the nozzle discharge hole for discharging. This specific embodiment of our invention is specifically adapted for use when serving liquors at a crowded bar, as the bar-keeper may at intervals load up the hollow valve member and pivot it to loaded or cocked position again ready for immediate dispensing.

An object of our invention therefore is to broadly cover in this application the broad inventive method and apparatus set forth in said prior application in whatever respects this application is a true divisional application with the advantages of such assembly, method and apparatus set forth therein.

A further object of our invention is to provide a completely automatic machine for automatically assembling valves in nozzles in accordance with the teachings of said prior application and involves novel structural arrangements and combination of means for carrying out the broad principles set forth in said application.

A further object of our invention is to provide a fully automatic machine which will substantially eliminate all but one low-priced attendant in its operation, a machine in which no time is lost between operations and a machine capable of speeding up the assembly over a hand operation requiring two high priced operators substantially 1000%. It is apparent that we have not only speeded up the speed of operations substantially 1000%, but have substantially lessened the labor cost attendant thereon 75%, thus effectually lowering the total cost of assembly 4000%, the power cost to operate our improved machine being negligible.

These and such other objects of our invention as may hereinafter appear will be best understood from a description of the accompanying drawings, which illustrate various embodiments of our invention applied to collapsible tubes, or containers, bottle tops, and various steps in its method of manufacture and apparatus suitable therefor.

In the drawings

Fig. 1 is a perspective view of a collapsible tube equipped with our invention.

Fig. 2 is a vertical sectional view of the upper portion of said collapsible tube including the nozzle portion thereof with the valve closure member thereof in closed position.

Fig. 3 is a vertical sectional view similar to Fig. 2 with the valve member oscillated to an open dispensing position.

Fig. 4 is a vertical sectional view taken along the line 4—4 of Fig. 2 at right angles to the section shown therein to illustrate the improved means we preferably employ for positively providing an axis of oscillation for the valve closure member within the tube nozzle.

Fig. 5 is a plan view of the tube prior to the assembly of the valve closure member therein, showing the washer in the countersunk recess of the lower valve seat portion thereof.

Fig. 6 is a cross sectional view taken along the line 6—6 of Fig. 3 looking upwardly at the lower end of said nozzle and attached valve member.

Fig. 7 is a plan view of the improved valve member we preferably employ.

Fig. 8 is a side elevation of the improved valve member we preferably employ.

Fig. 9 is a vertical sectional view taken along the same section line as Fig. 4 illustrating an alternative type of pivot means for our invention including recesses in the valve member adapted to receive inwardly projecting lugs from the nozzle side wall.

Fig. 10 is a vertical sectional view generally similar to Fig. 2 of a different embodiment of our invention but employing a lower valve seat forming downwardly projecting flange projecting inwardly from the nozzle wall to provide a yieldable lower valve seat and to save metal in the manufacture thereof.

Figure 25:
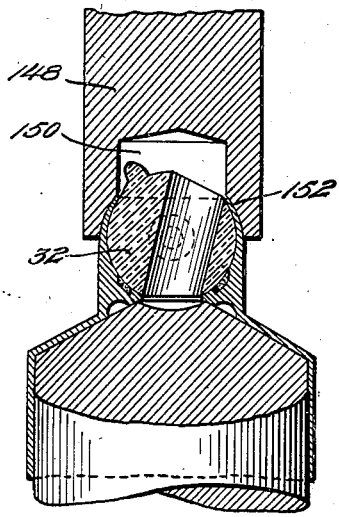

Figs. 11 to 18 show our invention as applied to a bottle or container top. Fig. 11 is a cross sectional view illustrating an embodiment of our invention having a nozzle extension projecting downwardly from the valve seat portion surrounded by a cork for ready insertion within bottle neck, the passage through the valve member being preferably of a size to dispense a single drop at a time. Fig. 12 is a side elevation partially broken away of the valve member shown in Fig. 11. Fig. 13 is a vertical sectional view similar to Fig. 11 of an alternative embodiment of our invention in open position showing a supplemental air inlet port in the valve member to permit the more rapid dispensing of liquid therefrom. Fig. 14 is an inverted plan view of the valve member employed in the embodiment shown in Fig. 13. Fig. 15 is a vertical sectional view of an embodiment of our invention for dispensing liquid of the type shown in Fig. 11 in which, however, the valve member is made hollow and of a size to permit the dispensing of a predetermined bulk of liquid, shown in full lines in filling position, in dotted lines in a loaded position and again in dotted lines in a dispensing position. Fig. 16 is a side elevation partially shown in section of the improved type of hollow valve member we employ in the embodiment shown in Fig. 15. Fig. 17 is a vertical sectional view of an embodiment of our invention adapted to dispense powder of the same general type as that shown in Fig. 15 for dispensing liquids and with the valve member shown in the positions shown therein in full and dotted lines respectively, in which the nozzle member extension is enlarged to be secured over the outside of a bottle neck to be attached thereto. Fig. 18 is a reverse plan view of the type of powder dispenser employed in Fig. 17.

Figs. 19 and 20 are enlarged sectional views of the extrusion punch and die members we preferably employ, Fig. 19 showing the punch and die members separated and a tube blank inserted in the die member, and Fig. 20 showing the punch member lowered into pressing relationship with the die member to simultaneously form the nozzle portion of our invention with a partially spherical valve seat portion in the thickened lower portion of the nozzle thereof preferably provided with an annular washer receiving recess and a cut away portion in the under surface of said thickened valve seat forming portion and the usual annular flange or top and side wall of a collapsible tube.

Fig. 21 is a vertical sectional view of a collapsible tube extruded according to the method illustrated in Figs. 19 and 20 provided with a partially spherical lower valve seat portion in the lower portion of the nozzle thereof and with the upper portion of the nozzle wall projecting substantially vertically upwardly from said lower valve seat portion, said lower valve seat portion being preferably also provided with an annular washer receiving recess and having the under portion underneath said lower valve seat portion removed to save metal.

Fig. 22 is a plan view of the intermediate product shown in Fig. 21.

Fig. 23 is a plan view of an apparatus particularly adapted for assembling our improved valve member in its respective nozzle including the assembly of the washer and valve closure member thereof in the lower valve seat portion, the formation of the upper partially spherical valve seat portion formed by crimping the upper portion of the nozzle wall downwardly over said valve, the formation of the axis of rotation for said valve, the closing of the valve and the final crimping operation for shipping purposes.

Fig. 24 is a side elevation partially shown in section of the apparatus shown in plan in Fig. 23.

Fig. 25 is a vertical sectional view illustrating the crimping tools we preferably employ in the first crimping step in our improved assembly method.

Figure 26:
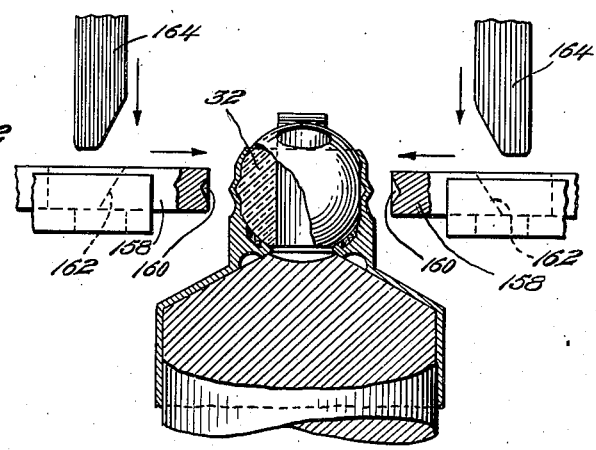

Fig. 26 is a vertical sectional view of the inwardly pressing tools we preferably employ for pressing the side wall of the nozzle inwardly against the flattened portions of the valve to provide the axis of rotation for said valve.

Figure 27:
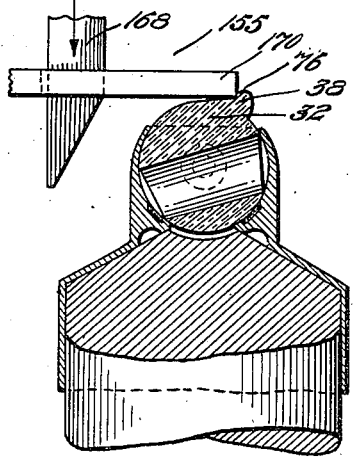

Fig. 27 is a vertical sectional view diagrammatically illustrating the turning mechanism adapted to substantially tangentially abut said lug to turn the valve from an open to a closed position.

Figure 28:
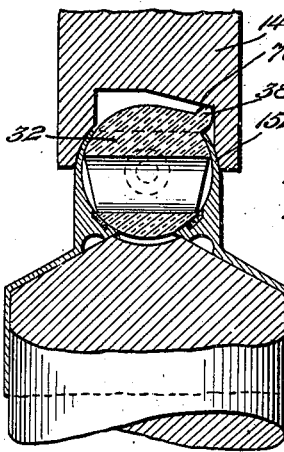

Fig. 28 is a vertical diagrammatic sectional view of the means we preferably employ for giving the upper surface of the valve seat portion a final crimping, after the valve has been turned to a closed position.

Figure 29:
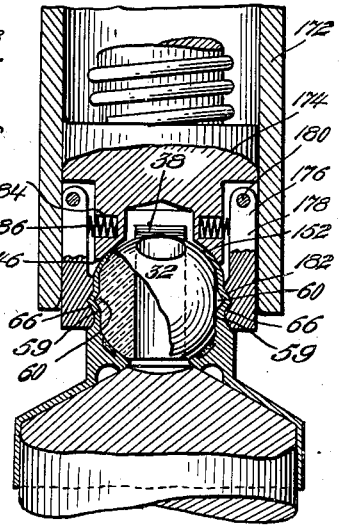

Fig. 29 is a diagrammatic vertical sectional view of an alternative type of tool which we may employ to simultaneously crimp the upper end of the nozzle side wall to form the upper partially spherical valve seat portion while substantially simultaneously inwardly pressing diametrically opposite portions of the nozzle side wall against the flattened portions of the valve member to form a true axis of rotation for said valve member within said nozzle.

Figure 30:
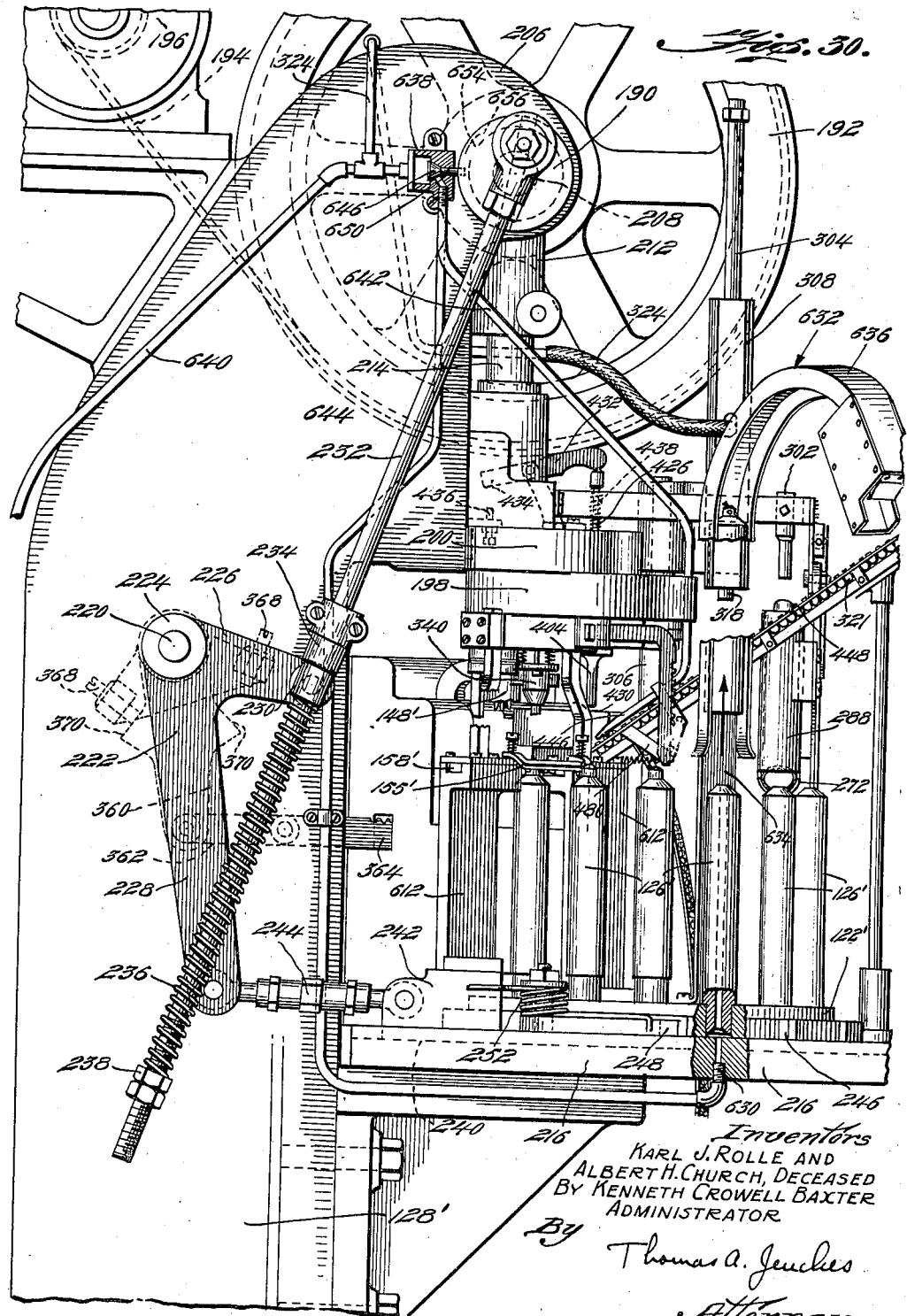

Fig. 30 is a side elevation of a fully automatic assembly machine constructed in accordance with our invention.

Fig. 31 is a plan view thereof with the ram and drive shaft removed.

Fig. 32 is a front elevation of our improved machine.

Fig. 33 is a reverse plan view of the improved tool carrying ram we preferably employ with our improved type of tools mounted thereon.

Fig. 34 is a diagrammatic view of the mandrels mounted on the conveyor and tools on the ram in distorted vertical alignment of the curved rotatable ring embodiment shown in the other figures, but also indicating a possible alternative construction employing a straight conveyor and aligned tools.

Fig. 35 is a fragmentary side elevation of the improved type of means we preferably employ controlled in its action by the ram for automatically loading a nozzle on an adjacent mandrel, including a movable conveyor and a chute pivotable by the ram from a lowered position to receive a nozzle from said conveyor to a vertical position to load the nozzle on a mandrel.

Fig. 36 is a fragmentary side elevation of an air actuated plunger for seating the nozzle on the mandrel controlled in its action by the strokes of the ram plate with the air cylinder and control means therefor being partially shown in section.

Fig. 37 is an enlarged face view of our improved nozzle seating and stripping tool in the act of seating a nozzle on a mandrel, portions of said mandrel, nozzle and tool being shown in section.

Fig. 38 is a side elevation of the improved means we preferably employ for automatically cutting a washer and inserting it within a countersunk recess in the nozzle, including tool means mounted on said ram plate partially shown in section.

Fig. 39 is a longitudinal sectional view taken through the improved type of die plate we preferably employ, illustrating the ends of the tools mounted on the ram for cutting the individual washers from strip material, seating them within each nozzle and also showing the means we preferably employ to slightly flatten opposite end portions of the nozzle wall.

Fig. 40 is a perspective view of the washer as it is cut as in the device shown in Fig. 39.

Fig. 41 is a transverse vertical sectional view taken through the washer cutting and seating plunger and associated parts along the line 41—41 of Fig. 39.

Fig. 42 is a vertical sectional view taken through the improved type of washer, stripping and seating tool we preferably employ.

Fig. 43 is a cross sectional view taken along the line 43—43 of said tool shown in Fig. 42.

Fig. 44 is a side elevation of a portion of the means we preferably employ including a tool carried by the ram, an air nozzle, an inclined chute and an agitator for receiving the end of a valve turning lug and for automatically feeding said valve within the nozzle with the turning lug in a substantially vertical position and the axis forming means thereof extending in a horizontal line.

Fig. 45 is an enlarged sectional view of portions thereof taken through the lower end of the chute and showing portions of the tool, nozzle and mandrel also in section.

Fig. 46 is a plan view of the lower end of the chute taken below the tool when in raised position.

Fig. 47 is a reverse plan view of the valve loading tool.

Fig. 48 is a transverse sectional view through the lower end of the chute taken along the line 48—48 of Fig. 46 and showing the tool in the act of receiving the valve from the chute and lowering it within the nozzle.

Figure 49C:
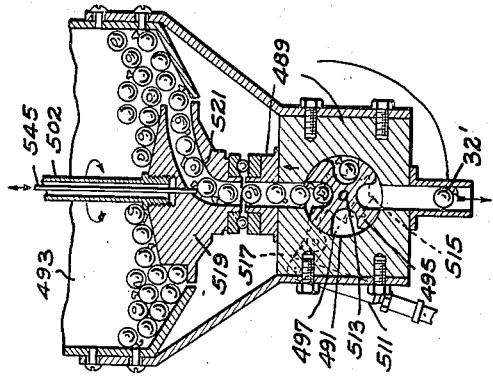
Figure 49B:
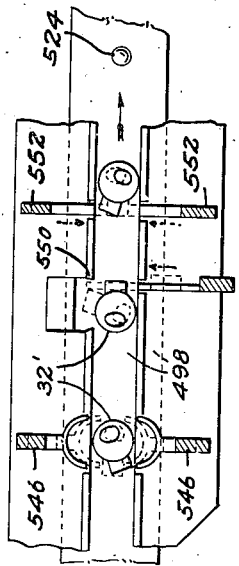
Figure 49A:
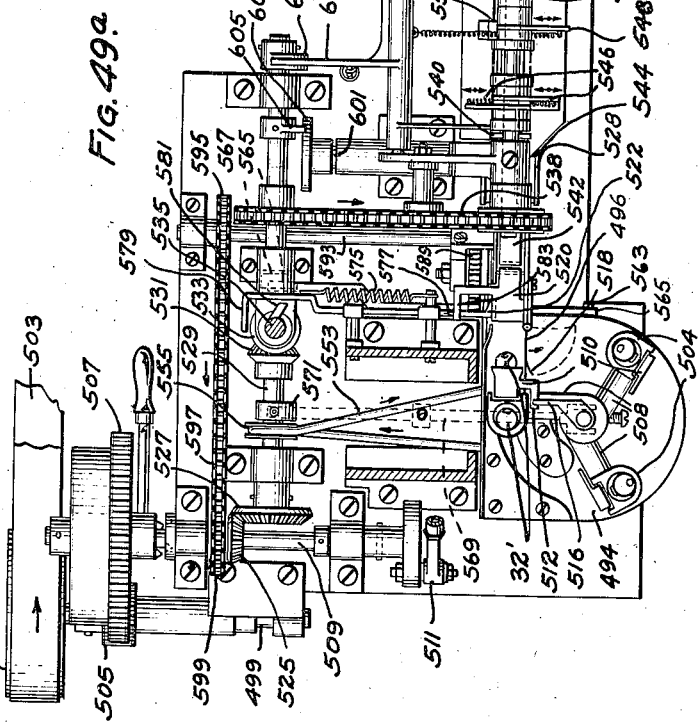

Fig. 49 is a side elevation of the means we preferably employ for automatically correctly positioning a succession of valves with the turning lugs in a position to be successively gripped by the edges of the longitudinal chute slot shown in Fig. 43 to fall down said slot.

Fig. 49ª is a plan view of the positioning and feeding means shown in Fig. 49.

Fig. 49ᵇ is a diagrammatic plan view of the valve positioning means above the main conveyor thereof.

Fig. 49ᶜ is a vertical sectional view taken centrally of the feeding hopper thereof.

Fig. 50 is a vertical sectional view taken through the improved type of nozzle, crimping and stripping tool we preferably employ.

Fig. 51 is a view taken transversely of the ring and illustrating the means we preferably employ including a valve holding and stripping tool carried by the ram and horizontally movable plungers for automatically pressing diametrically opposite portions of said nozzle wall diametrically inwardly to form bearing and retaining means diametrically of the wall of said nozzle.

Fig. 52 is a cross sectional view taken along the line 52—52 of Fig. 51.

Fig. 53 is a longitudinal vertical sectional view taken through the center of a nozzle and mandrel to illustrate the action of the means we preferably employ for automatically tilting said valve turning lug from a vertical to a closed position.

In the drawings, wherein like characters of reference indicate like parts throughout, 10 generally indicates a nozzle closure means for containers, constructed in accordance with our invention. The nozzle closure means 10 may have the annular flange 12 projecting radially outwardly and also downwardly therefrom to which the side wall 14 of the collapsible tube may be attached, or if desired, our nozzle closure means 10 may be employed as a bottle top as shown in Figs. 11 and 13. Our improved nozzle closure member 10 includes a preferably hollow preferably extruded, preferably metal nozzle member 16 preferably having the lower portion 18 thickened as at 20 and having a central dispensing hole means 22 therein, said lower portion 18 preferably having a partially spherical preferably slightly yieldable lower valve seat portion 24 on the inner surface thereof extruded thereon at the same time that the nozzle portion 16 is being extruded, and also extruded simultaneously with the flange 12 if employed, and the container or tube side wall 14 or, if desired, simultaneously with the nozzle extension 26 as shown in Figs. 11, 13 and 15. In the embodiment shown the lower valve seat portion 24 is preferably substantially hemi-spherical. The flange 12 may as shown in Fig. 1 be the means to secure said nozzle member to a container, bottle tube, can or the like such as by forming the wall 14 integral therewith as shown in Fig. 1 or other means may be provided, if desired, to secure said bottle, tube, can, container or the like such as by providing an annular cork member 28 adapted to surround the extruded nozzle portion 26 as shown in Figs. 11 to 15 adapted to be slightly yieldable contained within the bottle neck.

Our invention broadly includes a preferably substantially spherical valve closure member 32 mounted within the upper end of said nozzle 16 and provided with a discharge vent or passage 34 and a suitable axis of rotation 36 and preferably a turning lug 38 whereby said valve closure member 32 may be oscillated to positions bringing the discharge vent or passage 34 thereof in alignment with the inlet hole 22 in the lower portion of said nozzle and/or the outlet hole 40 in the upper portion of said nozzle. While we are aware that substantially spherical valve closure members of this general type have hitherto been provided for nozzles, so far as we are aware they have tended to leak, and to aid in preventing the leakage thereof we have provided washer means 56 adapted to be countersunk within the valve seat 44 formed in said nozzle. Said valve seat 44 includes the lower valve seat portion 24 and the upper valve seat portion 46 to be described. Where a collapsible tube is employed we preferably suitably countersink the circular washer 56 in a countersunk recess 42 in the lower valve seat portion 24, but may, if desired, as shown in Figs. 15 and 17 countersink said washer recess 42 in the upper valve seat portion of the nozzle.

As to be explained later in connection with Figs. 19 to 22, we preferably extrude our improved nozzle member 16 and simultaneously provide it with a lower valve seat portion 24 in a thickened portion of said nozzle and we may simultaneously therewith extrude the annular washer receiving recess 42 therein. In order to save metal, we also preferably provide metal saving recess means preferably in the form of an annular groove 48 on the lower surface of said thickened portion 20 or we may, as shown in Fig. 10 so construct the recess 48 as to substantially form as the lower valve seat portion 24 the annular slightly yieldable flange 24 projecting arcuately inwardly substantially centrally of the side wall 50 of said nozzle. In our preferred embodiment each recess, namely the washer receiving recess 42 and the annular metal saving recess 48 are preferably concentric with the dispensing hole means 22 in the lower portion of said nozzle substantially centrally of the lower substantially hemi-spherical valve seat portion 24. After the extrusion process, the upper portion 52 of the side wall 50 of said nozzle projects substantially vertically upwardly from the upper edge of said lower valve seat portion 24. In the embodiments shown in Figs. 1 and 22, the annular flange 12 projects outwardly and downwardly from the lower portion 54 of said nozzle wall 50.

As stated hitherto, in order to prevent leakage through our improved valve closure means 10, we preferably provide a washer 56, mounted in said countersunk annular washer receiving recess 42, preferably constructed of fibre, leather, rubber or other suitable preferably resilient material preferably of a greater thickness than the depth of said recess 42 to at all times closely engage the oscillatable valve closure member 32 to form an air and liquid tight seal at all times therewith, and being constructed preferably of material where liquids are employed resistant to the chemical constituents thereof.

In the preferred embodiment shown, we preferably extrude the nozzle portion 16 and integral flange 12 where employed and tube or container side wall 14 where employed or nozzle extension 26 where employed of metal. And whereas we may make our improved valve member 32 of metal to provide a metal to metal contact, this it not at all times thoroughly air and liquid proof and we therefore preferably construct our improved substantially spherical valve member 32 of predetermined chemical resistant composition material and one of which the constituents thereof may be predetermined to be resistant to any specific chemicals contained in the contents of the container, such as mild acid, weak or strong alkali, alcohol, or other solvents, etc. Said improved valve member 32 is pivotally oscillatably mounted on said valve seat 44 on a horizontal axis 36 against said washer 56. In order to provide a suitable axis of rotation and a construction which may be pressure molded in two superimposed substantially hemi-spherical molds, we provide diametrically opposite flattened side portions 58 on said valve member 32 as more particularly shown in Figs. 4, 7 and 8 provided with pivot lugs 60 preferably having rounded ends as shown and preferably projecting outwardly centrally of said flattened side portions 58, and of a length with said adjacent central valve portions, of substantially the diameter of the sphere of which our improved valve member is preferably molded for a double purpose, (1) so that lugs 60 will not be of such a length as to prohibit their being removed from the molds, they being normally so placed as to lie substantially on the mold line between the two hemi-spherical molds and (2) so that they may be readily dropped to the desired feeding position within the diameter of said nozzle against the partially spherical lower valve seat portion 24 thereof. Portions of said nozzle member side wall 50 are diametrically pressed flatly inwardly as at 59 against said flattened valve sides 58 to assist in providing an axis of oscillation for said valve portion 32 and to form sockets 66 therein as shown in Fig. 4 to receive said pivot lugs 60 diametrically of said wall 50 to provide an axis of oscillation for said valve member 32, and the upper portion 52 of said vertical nozzle member side wall is preferably crimped downwardly over said rotatable valve member to form a hollow partially spherical upper valve seat portion 46 having a central dispensing hole means 40.

Said valve member 32 is also provided on the upper end thereof with a turning lug 38. Said lug 38 is preferably formed with a curved lower surface 72 and a flat substantially tangential upper surface 74, terminating in an upwardly bent rounded outer end 76 meeting said curved lower surface 72 to form an outwardly projecting lug 76 projecting radially outwardly from said valve member 32, being thus shaped for a double purpose, (1) so that said turning lug may be readily removed from a hemi-spherical mold on pivoting said closure member therefrom, the inner end of the lower curved portion 32 forming an axis for said pivoting, and (2) to provide means whereby the closure member 32 may be readily oscillated in either direction namely to open by grasping underneath the lower curved portion and to close by grasping the inner portion of the upwardly projecting lug 76 thereof, thus providing means to oscillate said valve an amount limited by said turning lug 38 abutting opposite edges of said dispensing hole means 40 in said hollow crimped upper hollow valve seat portion 46. As stated, said valve member 32 is also preferably provided with a discharge vent 34 either at one end thereof or passing therethrough of such a size and so located relative to the center of said valve and said nozzle side wall 50 and the upper and lower dispensing holes 40 and 22 respectively of said nozzle 16 are of such a size and shape that said discharge vent or passage 34 may be rotated into alignment with the respective discharge hole means 40 and 22 in the hollow ends of said nozzle valve seat 44 with the outwardly projecting end 76 of said lug abutting one edge of said upper valve seat hole or said valve member 32 with its discharge passage 34 may be oscillated to have the respective upper end 37 and lower end 35 thereof closed by said nozzle side wall 50, with the lower portion of said side wall 72 of said turning lug substantially abutting the other end of said upper valve seat hole 40, if desired.

While the improved washer 56 is highly desirable, it may, if desired, be omitted or inserted as shown in Fig. 15 in a suitably countersunk hole 42 in the upper valve seat portion 46. While we have shown, for reasons to be explained, our improved type of means for oscillatably pivotally mounting the valve closure member 32 in said nozzle, in place of the pivot lugs 60 hitherto described, we may as shown in Fig. 9 provide suitable sockets 60' in the flattened side portions 58 of the valve member to receive the pivot lugs 66' formed from the nozzle side wall 52 when diametrically opposite portions of said side wall are pressed inwardly as hitherto explained. The vent or passage 34 of our improved valve member is preferably shown located substantially near the center thereof and passing therethrough but it is obvious that if desired it may be located along the side thereof as suggested in Fig. 13 or through any portion thereof. It is also obvious that the valve seat 44 including the lower valve seat portion 24 and the upper valve seat portion 36 may be formed in any other desired manner than in the manner shown. While we preferably employ an extruded metal nozzle it is apparent that if desired the nozzle portion may be molded or extruded out of composition or other like material, cast or otherwise fabricated and while we have preferably constructed our improved valve closure member of molded composition material, it may if desired be suitably fabricated in any desired manner out of other material. As explained hitherto, by constructing the valve seat of slightly yieldable metal material and by constructing the valve of slightly yieldable composition material we have found that a true cooperation exists therebetween, providing substantially an air and liquid proof joint at all times and one in which there is substantially no wear as in a metal to metal contact, permitting the use of our improved nozzle closure means over a long period of time. In order that a more slightly yieldable lower valve seat portion 24' may be provided, a larger metal saving recess 48 may be provided and particularly when extruding aluminum, we may extrude the lower valve seat 24' in the form of a slightly yieldable annular flange depending arcuately inwardly from the center portion of the nozzle side wall to the central dispensing hole 22.

As explained, we have shown in Fig. 9, the axis of rotation of the valve member 32 on said nozzle member 16 formed not only by the flattened side portions 58 of the valve and adjacent flat portions 59 of the nozzle side wall but in place of the pivot lugs projecting outwardly from the valve into sockets 66 formed in the adjacent nozzle wall, we have provided the recesses 66' in said valve to receive the pivot lugs 60' formed in said nozzle side wall when said nozzle side wall is pressed inwardly on diametrically opposite points thereof in the manner hitherto explained.

We have shown in Figs. 11 to 18 various forms of our invention particularly adapted as closures for bottle tops: the embodiments shown in Figs. 11 to 14 being constructed substantially similarly to our invention as shown in Fig. 1 applied to a collapsible tube except that the side wall of the tube 14 is omitted from the flange 12, the nozzle 16 is extended downwardly as at 26 and provided with an annular cork ring 28 for securing our improved closure means within the bottle neck 30. In the embodiment shown in Figs. 11 and 12, the discharge passage 34 of said valve may be tapered as shown and of a size to dispense a single drop at a time from the interior of said container 31. The embodiment shown in the Figs. 13 to 14 may as shown be applied to the neck 30 of a liquor bottle and in addition to the discharge passage 34 is provided with the air inlet passage 78 to rapidly admit air within the bottle to permit the rapid discharge of the liquid contents thereof through the discharge passage 34 of said valve member 32. It is apparent, however, that the discharge passage 34 may be constructed at the side of the closure instead of through it as the air inlet passage 78 shown in Fig. 14 or that said discharge passage 34 may comprise any desired part of a sphere up to a hemisphere. If the discharge passage 34 be located at the side however and substantially enlarged, it is not anywhere near so desirable as the type specifically shown herein for ease of manufacture and assembly but may for some features of our invention be provided.

We have shown in Figs. 15 to 18 embodiments of our invention, adapted to dispense a measured dose of predetermined bulk from the container and for this purpose we have enlarged the vent 34 so as to substantially take up the entire interior of said valve member 32 and we have correspondingly enlarged the adjacent substantially spherical valve seat portion 44 of said nozzle wall. The hollow closure and vent are preferably of such a size and shape and said nozzle side wall and lower and upper dispensing hole means 22 and 40 thereof respectively are preferably of such a size and shape that said hollow closure vent 34 may be rotated into alignment with said lower dispensing hole means 22 when said closure means is inverted to permit reception of said measured dose or quantity within said hollow closure member with said turning lug 38 abutting one edge of said nozzle hole means 40, oscillated against the friction of said composition closure member 32 against said metal valve socket 44 to bring said hollow closure vent 34 opposite said nozzle side wall 50 into intermediate loaded or cocked dose or drink holding position, so as to be frictionally retained therein, or rotated into alignment with said upper dispensing hole means 40 to expel said measured dose therethrough with said turning lug 38 substantially abutting the other edge of said upper nozzle hole means 40. We have shown in Fig. 15 this embodiment of our invention applied to a neck 30 of a liquor bottle provided with the elongated nozzle extension 26 and being secured within said neck by the annular cork 28, the flange 12 in this instance being omitted. While it is possible to extrude this nozzle it is not as easy as the extrusion of the other nozzles shown and described hitherto and if desired the nozzle portion 16 may be cast, stamped or otherwise shaped for this embodiment. We have shown in Figs. 17 and 18 an embodiment of our invention similar to the embodiment shown in Figs. 15 and 16 but particularly adapted for dispensing a measured dose of powder. In this instance the lower nozzle discharge portion 22 is made relatively small so that the closure member 32 may be oscillated or rotated into three positions, namely the filling, loading, and dispensing positions as shown in full or dotted lines respectively therein. In this instance, the lower nozzle extension 26 is widened to fit outside of the neck 30 of the bottle and is provided at its lower extremity with the inwardly projecting lip 29 providing means to secure our improved nozzle closure member 10 to the bottle. In this embodiment the nozzle means 16 may be conveniently molded.

As stated hitherto, we have preferably provided in the specific details of our construction both a valve closure member 32 which may be readily fabricated in a simple manner and a nozzle portion 16 which may be also extruded or otherwise fabricated in a simple manner, the nozzle being preferably constructed out of metal and the valve member being preferably constructed out of molded composition material so as to yieldingly abut each other and form an air and liquid tight non-wearing joint in use better than it is possible to obtain by composition against composition or metal against metal. We have also constructed the details of our improved valve structure with a view to a simple method of its manufacture. We thus, as explained, provide a substantially spherical slightly yieldable closure valve member preferably consisting of hemi-spherically molded predetermined chemically resistant composition material having the diametrically opposite flat sides 58, having the pivot lugs 60 projecting outwardly centrally thereof, of a length with said adjacent central valve portion of substantially the diameter of said valve for easier removal from a hemi-spherical mold and for easy insertion within said nozzle member with said mold line passing therethrough and a turning lug 38 at the upper end thereof preferably having a curved lower surface 72 and a flat substantially tangential upper surface 74 terminating in an upwardly extending outer end 76 meeting said curved lower surface 72 to form an outwardly projecting turning lug 76 shaped to be removed on pivoting thereof from said hemi-spherical valve mold and a discharge vent 34 therein or therethrough substantially at right angles to the diametric axis of said pivot lugs 60. As stated hitherto, our improved valve closure member may be constructed in this specific manner out of any suitable material, but for the reasons described and for the additional reason that composition material may be brightly pigmented or otherwise colored with any desired color to provide an attractive contrast with the metal nozzle, we preferably construct it of predetermined chemical resistant composition material. While we have preferably formed the axis of rotation thereof by providing the substantially spherical closure member with diametrically flattened sides 58 and pivot lugs 60 projecting outwardly centrally thereof of less total length than the diameter of said sphere for easy withdrawal from the mold and insertion within the nozzle, it is obvious that in place of pivot lugs we may provide the pivot recesses 60' as shown in Fig. 9 or other types of pivot means, such recesses or other types of pivot means being not however so easily withdrawn from the molds and we may in place of the side portions 58 and lugs 60 provide any type of oscillation axis forming means. While the turning lug 38 at the upper end of said closure means is preferably constructed in the manner described with a double function of easy removal from the mold and being operable to be actuated by a finger to readily oscillate the valve in either direction it may if desired be constructed in other ways than in the specific manner shown.

As stated hitherto, for the reasons given above and as a plastic composition material may be readily pigmented or otherwise colored to provide an attractive appearance, we preferably construct our substantially spherical closure member of hemi-spherically molded, predetermined chemical resistant composition material. While any suitable type of plasticizable composition material may be employed, we preferably employ one of insoluble phenol formaldehyde, intermediate condensation product type such as Bakelite, or insoluble urea formaldehyde intermediate condensation product or an insoluble cellulose acetate product or in fact any suitable type of a moldable preferably resilient composition material. With the widespread range of composition materials possible, it is obvious that we are able to select a composition material particularly resistant against the chemicals in the known contents in the container for which our improved nozzle closure means is desired to be used. Thus for instance if it would be desired that the closure member be resistant to alkali or weak acid, we preferably employ an alkali or acid resistant insoluble phenol formaldehyde intermediate condensation product specially treated to make it acid and/or alkali resistant. If we desire a valve member resistant to alcohol we preferably employ an insoluble urea formaldehyde intermediate condensation product or we may if desired employ a cellulose acetate product or any of a great many possible composition materials preferably so selected as to be resistant to the particular chemicals in the contents of the container.

Employing these materials it is possible to manufacture our improved valve member 32 by pressure molding in two superimposed hemi-spherical molds. The hemi-spherical molds are preferably so shaped as to provide the flattened sides 58 and the pivot lugs 60 projecting outwardly therefrom substantially centrally between the hemi-spherical molds of a length with said adjacent central valve portion of substantially the diameter of said valve and molds. It is apparent therefore that the mold line will be formed substantially centrally of the flattened portions 58 and through the pivot lugs 60 to permit the easy withdrawal of said pivot lugs from the mold. Thus the particular construction we employ to provide an axis of rotation for the valve member is constructed with a view of its easy manufacture or molding.

One of the molds is also shaped to provide said closure member with a turning lug 38 at the upper end thereof in the manner hitherto described namely preferably with a curved lower surface 72 and a flat substantially tangential upper surface 74 terminating in an upwardly bent rounded outer end 76 meeting said lower surface to form an outwardly projecting turning lug 38. To provide the discharge vent passage 34, we preferably suitably mount within the molds substantially centrally thereof as desired, suitable pin means. When the molding is complete we separate the hemi-spherical molds, remove said pin means from said valve member to provide a discharge vent in said valve member substantially at right angles to the diametric axis of said pivot lugs and pivot said valve member substantially at about the point where the lower lug surface 72 joins the valve member to remove said turning lug from its hemi-spherical mold. If desired, the pin means may project through the molds to assist holding them together and may be removed prior to separation of the hemi-spherical molds.

We have shown in Figs. 19 to 20 an improved extrusion press for simultaneously manufacturing our improved nozzle blank member and simultaneously therewith if desired the annular wall 12 and simultaneously therewith the side wall 14 of a collapsible tube or container. For this purpose we provide a female die 80 having an outwardly tapered face 82 for receiving a round, annular or otherwise shaped tube blank 84 and an annular nozzle forming hole 86 depending centrally therein having a cylindrical outer surface 88 and a convex partially spherical valve seat forming inner surface or protuberance 90. To form the annular washer receiving recess 42 we preferably provide said female die with the annular washer recess forming projection 92 thereon. If desired, as shown the valve seat and nozzle forming protuberance 90 is mounted on a plunger 95 slidable within the central bore 87 in said die, a portion of which forms the outer surface of said annular hole 86, said plunger being provided at the lower end thereof with the annular shoulder 94 adapted to abut the shoulder 96 on the lower portion of said die, said shoulder 94 being adapted to be actuated by the lifter cam 98 for a purpose to be described. We provide a cooperating male die 102 of slightly less diameter where a collapsible tube side wall 14 is to be formed than that of said cooperating side wall 83 of said female die and having a cooperating tapered face 104 to cooperate with the tapered face 82 to form the annular flange 12 and to simultaneously extrude said tube side wall or body 14 in the space between the side wall of said male die 102 and the side wall 83 of said female die and a center portion 106 shaped to form with the outer surface 88 of the annular nozzle forming hole 86 in said nozzle 16 and with the inner surface or projection 90 of said annular hole 86 the partially spherical lower valve seat portion 24 on the inner surface of said nozzle, said center portion 106 of said male die being preferably provided with an annular metal saving recess forming projection 108 thereon substantially opposite and inside of the outer edge of said nozzle forming hole 86. The center portion 106 of said male die may be provided with the plunger 110 slidably mounted in the central bore 112 of said male die 102 and having its up and down movement limited by the lug 114 projecting inwardly in a vertical slot 116 in said plunger 110 to limit the up and down movement of said plunger 110 and attached male die center portion 106 for a purpose to be described.

As shown in Fig. 20 when the male die member is compressed downwardly against said blank 84, it presses a portion of said blank against the lower tapered surface 82 of the female die to form the annular shoulder 12 hitherto described and the tube body 14 where employed is simultaneously extruded upwardly in the space 118 formed by the difference in diameters between the hollow female die portion 83 and the male die 102 and a portion of the blank is extruded downwards against the cylindrical outer side wall 88 of said annular nozzle forming hole 86 to abut the central nozzle forming projection 90 of the female die to form said nozzle 16 and valve seat, the annular projection 92 of said projection 90 forming the annular washer receiving recess 42 in said lower valve seat portion 84 and said annular projection 108 forming an annular metal saving recess 48 in the under surface of said simultaneously formed partially spherical lower valve seat portion 24, the substantially vertical cylindrical upper valve seat portion 52 being formed between the outer surface of the projection 90 and the outer surface 88 of the annular female die hole 86. After the tube and nozzle with its integral partially spherical lower valve seat portion 24 have been simultaneously extruded as shown in Fig. 20 and the male die member has been partially removed, the lifter cam 98 raised to simultaneously remove the projection 90 upwardly to free the extruded tube 12, flange 14 and nozzle 16 are removed from said male die by air pressure forced down the duct 112 in the male die, said air pressure forcing the plunger 110 downwardly to lower said center portion 106 against the thin disk or web 120 formed centrally of said lower valve seat portion 24 to free said extruded tube flange and nozzle from said male die. It is thus obvious that we have produced by placing a tube blank in the die and extruding said blank to simultaneously form a tube body 14 and integral preferably tapered annular shoulder 18 and integral nozzle 16 secured thereto having a partially spherical lower valve seat portion 24 on the inner surface of the thickened lower portion of the nozzle provided with an annular washer receiving recess 42 therein and a metal saving annular recess 48 on the under surface of said thickened lower portion, and a substantially vertical inner surface 52 above said valve seat; a nozzle portion for a container or a collapsible tube comprising an extruded body 14, an integral annular flange 12 attached to said body 14 and an integral nozzle 16 attached to said annular flange 12 having a side wall 50 having a partially spherical lower valve seat portion 24 on the inner surface of the thickened lower portion 18 thereof preferably adjacent to said tube flange 12 having a continuous annular washer receiving recess 42 in said partially spherical lower valve seat portion 24 formed therein and a metal saving annular recess 48 in the under surface of said thickened lower portion 18, the upper surface of which forms said lower valve seat portion 24 with the inner surface of said side wall 50 projecting substantially vertically upwardly above said lower valve seat portion 24 and as shown a film or disk 120 filming over the lower hole 22 of said nozzle. In practice this film or disk is then removed and this intermediate extruded product is then ready for the attachment of the valve closure member described above therein.

Further features of our invention relate to the novel type of apparatus and the method we employ in assembling the valve closure member 32 within said nozzle 16. It is obvious that both the nozzle member 16 and closure member 32 are designed with the view of permitting the easy assembly thereof. We have shown in Figs. 23 to 29 a suitable type of apparatus for this purpose which broadly includes a conveyor 122, movable predetermined amounts to permit the following sequence of steps to be performed thereon substantially simultaneously during the intervals of movement thereof. The entire sequence of steps of assembly are performed on a series of nozzles in one position and the conveyor is moved ahead a predetermined amount and the same sequence of steps is performed all over again on the next adjacent nozzle thus making a sequence of steps to be performed successively on the same nozzle throughout a cycle of assembly on the conveyor. Broadly we load the free ends 124 of said tubes or nozzles on the holders which preferably contain suitable mandrels 126 mounted at successive spaced distances along said conveyor and we employ mandrel means in the claims to designate any suitable types of holders.

In our preferred embodiment the sequence of assembly steps comprises the following: (1) loading the free end 124 of said collapsible tube or nozzle 16 on said mandrel means 126, (2) inserting the annnular preferably fibre washer 56 in said lower partially spherical valve seat portion 24 where the washer be employed and within said annular washer receiving recess 42 where the countersunk washer recess 42 be employed, (3) inserting said substantially spherical preferably resilient valve closure member 32 within said nozzle on said lower valve seat portion 24 over said washer 56 with its turning lug 38 in an upright position thereby providing the discharge vent passage 34 in an open position if a collapsible tube be employed and with the pivot lugs 60 being in a substantially horizontal plane therein, (4) crimping the upper portion 46 of said nozzle member upper side wall 52 downwardly over the upper surface of said valve member 32 to form a hollow partially spherical upper valve seat portion 46 having the central dispensing hole means 40 therein with said turning lug 38 projecting upwardly therethrough, (5) pressing inwardly diametrically opposite center portions of said relatively thin nozzle upper wall as at 59 against said diametrically opposite flattened valve portions 58 to form sockets 66 in said nozzle wall 50 to receive said pivot lugs 60 to provide a horizontal axis of rotation for said valve member 32, (6) oscillating said valve turning lug 38 to move said valve member so that the discharge vent or passage 34 thereof will be opposite the nozzle side wall 50 in a position closing said nozzle, (7) again crimping the upper portion of said nozzle member upper side wall downwardly as at 46 over the upper surface of valve member 36 to realign said hollow upper valve seat portion 46 and seal said valve in a shipping position and (8) removing said assembled collapsible tube from said mandrel means, where employed, on said conveyor. If desired, step 2 of inserting the annular washer may be dispensed with where said washer is not employed. Said annular washer receiving recess 42 may be dispensed with if it is not desired to accurately align the washer in said lower valve seat portion. Steps 6 and 7 of oscillating said turning lug to close said nozzle and again crimping the upper portion of said nozzle may be dispensed with if desired, or if desired as shown in an embodiment of our invention we may simultaneously press inwardly the diametrically opposite portions of the said relatively thin nozzle upper wall against said diametrically opposite flat valve portions 58 to form sockets 66 in said nozzle wall 50 to receive said pivot lugs 60 to provide an axis of rotation 36 for said valve member 32 while simultaneously crimping the upper portion of said nozzle member upper side wall 52 downwardly over the upper surface of said valve member to form a partially spherical upper valve seat portion 46 having central dispensing hole means 40 with said turning lug 38 projecting upwardly therethrough, preferably continuing the crimping after the diametric inward pressure has been released if desired to firmly seat the valve 32 within its valve seat 44. Thus this simultaneous operation may be substituted for steps 4, 5, 6 and 7.

While the improved hitherto described method may be performed by hand or by machinery in the afore-described sequence of steps we preferably mount said nozzle or tube on said conveyor and move said conveyor predetermined amounts to permit said sequence of steps to be performed thereon preferably simultaneously between the intervals of movement of said conveyor. We have shown in Figs. 23 to 29, however, an improved type of assembly apparatus for use in carrying out said method comprising a central standard 128 and a ring or conveyor 122 rotatably mounted in any suitable manner on said standard 128. We have mounted a plurality of nozzle receiving mandrel or holding means 126 at equally spaced points of said conveyor or ring. In the embodiment shown we have arranged for eight steps to be performed on the conveyor and we have shown two mandrels for each step although if desired one or any number of mandrel means may be provided for each step, the ring or conveyor being advanced proportionate amounts. We thus provide on adjacent portions of said standard a nozzle loading station 1, a washer loading station 2, a closure member loading station, 3, a crimping station 4, a pivot fixing flattening station 5, a valve closing station 6, a second crimping station 7, and an unloading station 8.

As indicated hitherto, our improved apparatus may be either operated entirely by hand or partially by hand and partially by machinery thus semi-automatically, or may be operated entirely by machinery or completely automatically. In any event in order that the conveyor or ring may be moved forward predetermined amounts such as to move from one station to the next, we have shown in the drawings suitable indexing means for this purpose to advance said ring equal or other suitable amounts to progressively change stations and for this purpose we have pivotally mounted the lever 134 having the handle 136 projecting outwardly from said ring 122 on the lower surface of said standard as at 138 and we have pivotally mounted substantially adjacent to the outer edge of said ring on said lever 134 the pawl 140 adapted to register against ratchet teeth 142 projecting outwardly from said ring 122 substantially opposite each individual mandrel and thus being provided in the embodiment shown with two mandrels with adjacent ratchet teeth 142 for each respective station. In order to accurately index or stop the ring so that the mandrel thereof 126 with attached nozzle 16 will be exactly opposite its appropriate tool at the desired station, we provide the spring actuated plunger 144 mounted on said standard overlying a hole 146 for receiving the end thereof in said ring so as to stop each desired mandrel exactly opposite its respective station and overhanging tool where employed.

We have shown in the drawings the loading step at the loading station #1 as being done by hand although if desired this may be done automatically. We have also shown the insertion of the washer to be done by hand at the washer loading station #2 although if desired the washed may be individually formed from a continuous strip of strip material and automatically inserted in the valve seat portion and in the countersunk annular recess 42 thereon by machinery. We have shown in these drawings, the valve member 32 inserted on the lower valve seat portion 24 within said nozzle 16 by hand although it is obvious that by chutes or other means this may be entirely done by machinery at valve loading station #3. It is also obvious that in place of the hand conveyor moving and indexing mechanism shown herein that an automatically moving and indexing mechanism may be provided by machinery. We have shown at station 4 crimping means such as the punch 148 provided with the central hole 150, provided with an interior concaved annular crimping surface 152 adapted to abut the upper surface of the nozzle member wall 52 to crimp the upper portion of said nozzle member upper side wall 52 downwardly over the upper surface of said valve member to form a hollow partially spherical upper valve seat portion 46 having central dispensing hole means 40 with said turning lug 38 projecting upwardly therethrough. We have shown the punch member 148 in the drawings provided with the rack teeth 154 on the upper portion thereof and the pinion 156 mounted in said standard to actuate said rack teeth. The pinion 156 may be rotated for this purpose either by hand or by suitable machinery, and we have shown a similar rack 154 to actuate the other means at stations 5, 6, and 7 about to be described. At station 5 we provide diametrically inwardly pressing means mounted on said standard at said pivot fixing flattening station to function with said adjacent mandrel to press the nozzle side walls inwardly at diametric points thereof against the flattened sides 58 of said valve to form the adjacent flattened sides 59 and the sockets 66 to receive the pivot lugs 60. While any means may be provided for this purpose we have shown diagrammatically in Fig. 26 suitable plungers 158 at diametrically opposite points of said nozzle provided, if desired, with the central sockets 160 in the ends thereof, and the vertical cam holes 162 therein to be actuated simultaneously inwardly on the simultaneous downward depression of the vertically reciprocal cam means 164 to accomplish the above results at station 5. We have shown in station 7 means 155 mounted on said standard to function with said adjacent mandrel at said valve closing station 6 to oscillate said valve 32 to a closed position, in the specific embodiment comprising a horizontally reciprocal plunger having a cam hole 166 therein adapted to be moved inwardly by the vertically reciprocal cam 168, the end 170 of said horizontally reciprocal plunger being adapted to abut the outwardly projecting surface 76 of said turning lug 38 to move said turning lug and oscillate said closure member 32 from the open position shown in Figs. 25 and 26 to the closed position shown in Figs. 27 and 28 to bring the ends of the discharge passage 34 of said valve member 32 in a closed position opposite the side wall 50 of said nozzle. We have shown at the second crimping station 7 in detail in Fig. 28 crimping means mounted on said standard to function with said adjacent mandrel to perfect said first crimping and seal said closure means into a shipping position comprising a vertically reciprocal punch or press member 148 having the annular crimping portion 152 thereon substantially identical in structure to that shown in Fig. 25 for the first crimping station 4.

In place of the first crimping station 4, flattening pivot forming station 5, valve closing station 6 and final crimping station 7, we may perform the entire operation done at said stations at one station by providing means mounted on said standard to function with said adjacent mandrel at a single crimping and pivot forming station to simultaneously crimp the upper portion of said nozzle side wall 52 over the upper surface of said valve member and diametrically press the nozzle side walls inwardly at diametric points thereof as at 59 to form a pivotal axis of rotation for said valve member. We have shown in Fig. 29 a suitable type of means for this purpose which comprises a vertically reciprocal punch sleeve 172 having slidably mounted therein a supplemental punch shaft 174 having the upper ends 176 of pressing cams 178 pivotally mounted thereon as at 180 at diametrically opposite points thereof and having the pivot forming sockets 182 on the inner surfaces of the lower ends thereof. At diametric points thereof, said slidable punch shaft 174 is provided with suitable recesses 184 to receive the springs 186 therein to tend to pivot the cam members 178 outwardly at all times. With this construction it is obvious that the pivot shaft 174 may be lowered so that the annular crimping edge 152 thereof may abut the upper portion 52 of said hollow nozzle side wall to crimp it over the upper valve seat of said valve member as the upper valve seat portion 46 and after said crimping surface 152 has started to function the outer punch sleeve 172 may be slid downwardly over said punch shaft 174 compressing the cam members 178 inwardly to cause the pivot forming sockets 182 thereof to press the nozzle side wall inwardly at diametric points thereof to form the flattened sides 59 to provide a pivotal axis of rotation 36 for said valve member 32, the pivot lugs 60 sinking in the sockets 66 of said nozzle side wall portion for this purpose.

It is apparent however in this assembly apparatus that if desired, the washer loading station may be dispensed with and the valve closing station 6 and the second crimping station 7 may, if desired, be also dispensed with or that the four stations, namely numbers 4, 5, 6, and 7 may be combined into one station in a manner hitherto described. When performing the steps of crimping and inwardly pressing simultaneously, the turning lug 38 may be in upright position aligning the discharge passage 34 with the ends 22 and 40 of said nozzle, it being no longer necessary for a second crimping as the sleeve 172 may be withdrawn to free the outwardly impelled socket forming pivoted surfaces 182 from the diametrically opposite sides of said hollow nozzle wall prior to withdrawing the crimping shaft 174 from said upper valve seat forming portion 46. It is apparent however that the effect of giving the upper valve seat portion a final separate crimp to firmly keep the valve in closed position for shipping purposes is not possible where all these steps are combined in one.

As stated hitherto, Figs. 30–53 illustrate the type of fully automatic machine which has been developed from the initial machine shown in Figs. 22–29 for assembling the valves 32 within the nozzles 16, either embodiment of assembly machine being capable of carrying out our improved assembly method which broadly comprises moving a conveyor 122' predetermined amounts to permit the following steps to be performed thereon at the intervals between movements thereof. The first step comprises loading the free end of a nozzle member 16' having a side wall 50' having if desired an annular washer receiving recess 42' therein on mandrel means 126' mounted on said conveyor 122'.

It is apparent that our improved method may be employed for assembling the specific type of nozzle closure shown in Figs. 1–8 having pivot lugs on the valves 32 adapted to project into diametric sockets 66 formed on the wall 50 of the nozzle as in the apparatus shown in Figs. 23–29, or our method may be employed to alternately assemble valves within nozzles to provide axis of oscillation forming means on the nozzle and valve by providing diametric projections 66' projecting inwardly from the nozzle wall into suitable sockets or dimples 60' formed therefor in the valve 32' as in the embodiment shown in Fig. 9 employing the apparatus shown in Figs. 30–53, or alternately our improved method may be employed for assembling the species of nozzle closure shown in Figs. 27–34 in the application of Albert H. Church for Nozzle closure means for containers and method of making same, S. N. 137,517, filed April 27, 1937, certain steps of which are shown in diagrammatic form in Figs. 35–40 thereof. As shown in this device, the valve is provided with a lower valve seat portion 24' having the annular washer receiving recess 42' therein with the inner surface of the nozzle side wall 50' projecting substantially vertically upwardly above said lower valve seat portion as at 52'.

We gently press inwardly diametrically opposite portions only of said nozzle wall adjacent diametrically opposite axis forming means on said valve, whether said means comprise the lugs 60 or dimples or sockets 60' or the sockets 88 shown in said application, S. N. 137,517, to form bearing and retaining means diametrically of the inner wall of said nozzle to function in association with said axis forming means located diametrically of the closure member, whether said means on the nozzle comprises the projections 60, as shown in Figs. 1–8, the dimples or sockets 60' as shown in Fig. 9 and Figs. 30–53, or the projections 90, as shown in said application. This feature of gently pressing in diametrically opposite portions only of the nozzle wall may take place prior to the insertion of the valve 32 within the nozzle as shown in said application S. N. 137,517, but with the species of axis forming means employed in the drawings forming part of this application, this operation preferably takes place after the valve has been inserted within the nozzle and the diametrically opposite portions only of the nozzle wall are actually pressed inwardly against the opposite axis forming means on the valve.

We then insert an annular washer 56' within the countersunk washer receiving recess 42'.

As stated, in the preferred embodiment shown, the valve is inserted prior to forming means on the nozzle wall to provide an axis of oscillation therefor and as one step in our method, we insert an at least partial spherical valve closure member 32' having axis forming means located diametrically thereof (whether said means comprise the lugs 60 or the sockets or dimples 60'), a turning lug 38' on the upper end thereof and a discharge vent 34' or open portion substantially at right angles to the diametric axis forming means, within said nozzle, in the embodiment shown, on the lower valve seat portion 24' thereof.

We may then, as a distinct step of our improved method crimp the upper portion 52' of the nozzle member side wall downwardly over the upper surface of said valve member 32' to form a hollow partially spherical upper valve seat portion 46' having a preferably central dispensing hole means 34' therein.

Then if desired, we may rotate said valve turning lug 38' to move said valve member 32' to a position closing said nozzle 16', namely, with the ends of the dispensing openings 34' therein abutting the walls 50' of said nozzle.

In the embodiment of our invention shown in Figs. 23–29, we may again crimp the upper portion of the nozzle member side wall 46 downwardly over the upper surface of said valve member 32 to realign said hollow upper valve seat portion and to seal said valve in a shipping position. After the valve member has been assembled within the nozzle, we then may automatically or otherwise remove it from the conveyor.

If the washer 56 be not employed, of course the step of assembling it within the nozzle is omitted.

It is apparent that if desired, our improved method may be accomplished by hand or by completely automatic machinery as in the embodiment of our invention shown in Figs. 30–53, or in the semi-automatic type shown in Figs. 23–29.

In either type of machine, we employ a movable conveyor which may move in a straight line as diagrammatically suggested in Fig. 34, but which in the embodiments of our invention shown, preferably comprises the rotatable ring 122'. As also stated, the nozzle holding mandrel means 126' are preferably located at equidistantly spaced points of said ring to provide at adjacent portions of the standard 128' on which said rotatable ring is mounted a nozzle loading station, 1, a fluid actuated nozzle seating station 2, a ram actuated nozzle seating station 3, a washer cutting and loading station 4, a washer seating station 5, a valve or closure means loading station 6, a crimping station 7, an axis of oscillation forming station 8, a valve closing station 8 and a nozzle unloading station 9. In either embodiment of our invention shown, indexing means are provided to successively advance said ring 122' equal amounts to successively change stations and the desired tools or means are provided at the different stations in the manners hitherto described or about to be described for performing the desired operations of assembling at the respective stations.

Our improved machine therefore, comprises, in combination, a machine for assembling a nozzle closure 32' and if desired, a washer 56' within a nozzle 16' for a container, said nozzle having a countersunk washer receiving recess 42' therein, automatically comprising holding means or mandrels 126' for the nozzle, means for loading said nozzle on the holding means, in the embodiment shown in Figs. 30–53, at station 1, means for automatically rigidly seating said nozzle on the holding means 126', in the embodiment shown in Figs. 30–53, at stations 2 and 3, means for automatically cutting a washer 56' and inserting it within said countersunk recess 42' in said nozzle in the embodiment shown in Figs. 30–42 at station 4, means for positively seating said washer within said countersunk recess in the embodiment shown in Figs. 30–53 at station 5, means for correctly aligning and automatically feeding the nozzle closure 32' having axis forming means diametrically thereof, a turning lug 38' and an open dispensing portion 34' within said nozzle 16' with said turning lug 38' in a substantially vertical position and the axis forming means in a substantially horizontal plane, in the embodiment shown in Figs. 30–53 at station 6, means for pressing diametrically opposite portions of said nozzle wall 50' diametrically inwardly of the inner wall of said valve seat against said diametric axis forming means of said valve in the embodiment shown in Figs. 30–53 at station 8, means for crimping the upper portion of said nozzle wall over said valve to form an upper valve seat 46' and retaining said valve 32' within the nozzle in the embodiment shown in Figs. 30–53 at station 7, means for tilting said turning lug to a closed position in the embodiment shown in Figs. 30–53 at station 8a, means for removing said nozzle from said holding means, in the embodiment shown in Figs. 30–53 at station 9, and means for moving said other means relative to said holding means. While we preferably move the mandrels relative to the tools, it is obvious that if desired the relative movement may be reversed. It is also obvious that these means may function in the order given or the slightly different sequences shown in Figs. 23-29 and 30-53 or in said aforesaid application. S. N. 137,517.

In addition, we preferably construct all said means in a manner to operate automatically as in the embodiment shown in Figs. 30-53. As stated hitherto, if no washer be employed, the means adapted to function in association therewith may be omitted, the means for tilting the valve may also be omitted if desired and the means for automatically positively aligning the valves prior to seating them as shown in Fig 49 may also be omitted.

Our preferred embodiment of fully automatic machine is shown in Figs. 30-53. Said machine is provided with the standard 128'. As our preferred embodiment of conveyor 122' we provide the ring 122' rotatable on said standard having the plurality of nozzle holding mandrels 126' mounted at equidistantly spaced intervals thereon.

As the main motive power of our device, we provide a drive shaft 190 driven by any suitable source of power, such as by means of the drive wheel 192 fast thereon driven by the belt 194 driven by a suitable electric motor 196.

To actuate the various tools, we provide a vertically reciprocatable tool carrying ram plate 198. The ram plate 198 is constrained to reciprocate in a vertical direction only, by providing the ram 200 to which the ram plate is suitably attached provided with guides 202 projecting from each side thereof adapted to register in suitable guideways 204 in spaced vertically extending arms 206 in which are mounted the bearings 208 for supporting the main drive shaft 190. The main drive shaft 190 is provided with an eccentric portion 210 between the bearings 208, thus forming a crank shaft on the main drive shaft 190 to which the upper end of a connecting rod 212 may be suitably pivotally connected, the lower end of which is suitably pivotally connected to the upper end of rod 214 projecting upwardly from the ram 200 adjustable in length to vary the initial height of the ram. The mandrel carrying ring 122' may be mounted on a table 216 having a circular upstanding portion 218 forming a guide around which said ring 122' may rotate.

Indexing means are also provided to successively advance said ring on each revolution of said shaft 190 amounts equal to the distances between adjacent mandrels. While any suitable means may be provided for this purpose, we provide the spring safety means provided with the spring safety feature about to be described. A shaft 220 is mounted in the frame 128' in rear of said machine parallel with the main drive shaft 190 and substantially half way between said drive shaft 190 and ram plate 198. A bell crank lever 222 is provided having a hub 224 adapted to be rigidly mounted on said shaft 220 and from which the crank arm 226 projects inwardly and the other crank arm 228 projects downwardly. The inner end of the crank arm 226 is provided with a sleeve 230 pivotally mounted thereon to slidably receive therein the connecting rod 232. The upper end of the connecting rod is eccentrically pivotally secured to the end of the main drive shaft 190. A stop collar 231 is mounted substantially centrally of said connecting rod adapted to abut the edges of the sleeve 230 to force the crank arm 226 downwardly and the connected crank arm 228 outwardly. A helical spring 236 surrounds the lower end of the connecting rod 232 with its upper end abutting the sleeve 230 and its lower end abutting a nut 238 on the lower end of said connecting rod 232. A slide-way 240 is provided in the table 216 extending from the rear to the front thereof on the side of said ring 122' opposite the lower end of the crank arm 228 of said bell crank lever 222. A sliding member 242 of substantial length is mounted in said slide-way 240 to reciprocate forwards and backwards therein. An adjusting connecting link 244 connects the rear of said slide member to the lower end of the crank arm 228. The outer surface of said ring 122' is provided with the spaced index notches 246 equally spaced apart proportionately to the amounts that said mandrels 126' are spaced apart. A pawl 248 is pivotally mounted on said sliding member terminating at its end in a lug 250 projecting inwardly therefrom of a shape to register in a respective indexing notch 246 on the forward stroke of said slide member 242 and to slide out of a respective notch on the rearward stroke of said slide member 242. A spring 252 is mounted on said slide-way to normally urge the lug 250 within a respective notch 246. A guide-way 254 is mounted on said table radially in line with the successive index notches 246 on said ring 122'. A locking key 256 is slidably mounted within said guide-way to slide radially therein having an inner end adapted to selectively register in a selected index notch 246 and a pin 258 projecting upwardly. A locking lever 260 is pivotally mounted on said table to have a longitudinal slot in the inner end thereof to receive the pin 258 projecting upwardly from the locking key 256 therein. The arms of said lever 260 are preferably bent relative to each other and the outer arm is provided with a roller 264 projecting upwardly therefrom. A spring 266 normally urges said lever to force the arm carrying the longitudinal slot 262 inwardly to force the locking key 256 radially inwardly through the medium of the pin 258 registering in said slot 262 and incidently moving the roller 264 outwards towards the slide-way 240.

A cam 268 projects inwardly over said table from said slide member 242 provided with a cam surface inclined outwardly from front to rear.

The operation of the indexing mechanism is apparent from the above description. On each revolution of the drive shaft 190, the connecting rod 232 mounted eccentrically thereon is raised and lowered. During the upstroke thereof which is timed to coincide with the upstroke of the ram, the arm 226 of the bell crank lever 222 is raised by the spring 236 forcing the lower end of the crank arm 228 inwardly forcing the slide member 242 forwards in said slide-way 240. Just prior to the initiation of the forward stroke of the slide member 242, the lug 250 of the pawl 248 has registered in a respective index notch 246 on said ring 122' being forced inwardly thereof by the spring 252. On the forward stroke of the slide 240 controlled in its action by the spring 236, the pawl operates to move the ring circumferentially forward the distance between the respective notches 246. During this forward stroke, the end of the locking key 256 rides along the outer peripheral surface of the ring. At the completion of the forward stroke, the spring 266 pivots the locking lever 260 to radially slide the locking key 256 inwardly to engage another respective notch 246 in said ring 122' to hold the table stationary during initiation of the rearward stroke of the slide member 242 and thus during the period of rotation of the drive shaft during which the ram operates. On the rearward stroke of the slide member 242, the lug 250 of the pawl 248 will slide out of its respective notch 246, the spring 252 compressing for this purpose and as the slide member 242 approaches the end of its rearward stroke, the cam 268 will abut the roller 264 to cause the opposite end of said locking lever 260 to urge the locking key 256 out of its respective notch 246 and the end of the lug 250 will slide in the next adjacent clock-wise index notch 246 being urged therein by the spring 232, the apparatus then being ready for the next forward stroke of the slide 242. It is obvious that the forward movement of the ring 122' is caused under pressure of the spring 236 and should there be any obstruction on the table, the spring 236 will merely compress further without causing any breakage.

We also provide suitable means controlled by said ram 200 for automatically loading successive nozzles 16' on successive mandrels 122'. As stated in the actual embodiment shown, we have shown the nozzles 16' as component parts of collapsible tubes and the side wall 14' of each tube is adapted to surround the side wall of each mandrel and the annular portion 12' of each tube is adapted to lie upon the upper end of each respective mandrel. While any suitable means may be provided for this purpose, we have shown in the drawings and in detail in Figs. 35 and 36 suitable means for this purpose, said means being adapted to function at station 1 as shown in Fig. 34. While said means may be constructed in any suitable manner, in our preferred embodiment shown, we preferably construct said means as follows: We provide a holder 270 stationarily mounted adjacent a portion of our device for discharging a nozzle in line with a mandrel, said holder being substantially the size of a tube. A stop 272 is pivotally mounted on the inner end of said holder and spring means 274 is provided to normally return said stop to its normal position. A conveyor 276 successively feeds nozzles to said holder 270 from a source of supply of nozzles or tubes, such as an extrusion press or a trimming machine and it will be observed that the holder 270 is so constructed to only accommodate one tube or nozzle at a time and as only one tube or nozzle can be retained in said holder at a time, it is apparent that the speed of feeding tubes or nozzles to the conveyor becomes immaterial to the accurate timing of our device. We pivotally mount a chute 278 on a stand 281 projecting upwardly from said table 216, preferably on a pin 280 rotatably mounted on said stand on which a gear 282 is also rigidly mounted. Another gear 284 is mounted on said stand 286 to mesh with said gear 282. The chute 278 is thus pivotally mounted to be pivotal from a lower position abutting said stop 272 for the purpose of releasing said stop 272 and hence receive a nozzle or tube from said holder 270 thereon, said tube being forced from said holder by the friction of the conveyor belt 276 onto said chute 278 to a vertical position for feeding said nozzle or tube on said mandrel 126'. Suitable means are provided controlled by the stroke of said ram plate 198 to pivot said chute from a lowered nozzle receiving position to a raised position for feeding said nozzle on the mandrel. If desired a hemi-cylindrical stop plate 288 may be provided projecting vertically upwardly from the stand 281 on the opposite side of said mandrel to form when said pivotable hemi-cylindrical chute 278 is raised to a vertical position a substantially cylindrical sheaf for guiding said tube on to the mandrel. In our preferred embodiment, the means employed for pivoting said chute are constructed as follows. The gear 284 is mounted on a pin 286 mounted on said stand 281 and a lever 290 is rigidly mounted on the end of said pin 286 to be pivoted from a substantially horizontal position to a position having the outer end thereof raised. A spring 292 is provided to normally urge the outer end of said lever to a raised position and as moved to said raised position, the chute 278 is lowered to its lowermost position by means of the inter-meshing gearing 284 and 282 and abutting the stop 272 to permit the nozzle to be loaded thereon in the manner hitherto explained. A finger 294 is pivotally mounted on an extension of the ram plate to normally project downwardly therefrom. Said finger 294 is adapted on the downward stroke of the ram plate to abut the outer end of said lever 290 to rotate said gearing 282 and 284 to raise said chute to a substantially vertical position. The lower end 296 of said finger is so shaped that on a continued downward movement of said ram plate as it nears the end of its stroke, it is forced by the pin 298 away from the outer end of the lever 290 to cause the spring 292 to again rotate the gearing to positively move the chute 278 downwardly to its lowered position releasing said stop 272. A spring 300 is also mounted on said ram plate extension to normally pivot the finger 294 inwardly. If desired, a seating plunger 302 may be also mounted on the ram plate to force the tube downwardly on the mandrel 126' on the further downward stroke of the ram.

We also provide means for rigidly seating a nozzle or tube on said ram plate to function in association with said nozzle loading means, in our preferred embodiment, said means comprising two means, namely, an air actuated plunger 304 for seating the nozzle on the mandrel controlled in its action by the strokes of the ram plate, preferably at station 2 of Fig. 34 and also if desired, a nozzle seating and stripping tool 306 carried by said ram plate and operative on the downward stroke of the ram plate 198 at station 3 of Fig. 34.

In our preferred embodiment, our improved air actuated plunger 304 is preferably constructed and operated as shown in detail in Fig. 36. We provide an air cylinder 308 vertically mounted on a stand 310 projecting upwardly from the table 216 above an adjacent mandrel 126', said cylinder having the air ports 312 and 314 respectively at the top and bottom thereof continuously connected to a source of compressed air under pressure. The plunger 304 is provided with a piston head 316 slidable within said cylinder and with an operating head 318 for abutting said nozzle to seat it on the mandrel. As valve means to positively connect the continuous source of compressed air alternately to the upper port 312 or lower port 314 of the cylinder 308, we provide a vertically slidable valve plate 320 having an interior compartment 322 therein connected to a source of air supply 324 and to one of said cylinder air ports 312 or 314 at a time only. This construction is made possible by providing the air compartment 322 of a lesser height than the respective distances between said ports. To slidably move said valve plate 320 from a position admitting air to the upper air port 312 to lower the air plunger 304, to a position admitting air to the lower air port 314 to raise the air plunger 304, we suitably pivot the lever 326 on said stand 310. Said lever 326 has one arm projecting loosely within a hole 328 therefor in said slidable valve plate 320 and a pin 330 on the opposite arm thereof, which projects inwardly from said stand. The ram plate 198 is provided with a continuous vertically extending slot 332 for receiving said pin 330 having a vertical upper portion 334 and a vertical lower portion 336 spaced closer to said valve plate 320 than said upper portion and an obliquely extending center cam portion 338 connecting said upper and lower vertical portions to lower said plunger to seat said nozzle on the downward stroke of the ram plate and to release and raise said plunger head on the upward stroke of the ram plate.

In the actual construction, we have shown a tool carrying ram plate 198 detachably securable to the ram head 200 for mounting the various tools thereon. In the claims we employ the word "ram plate" to include either the ram head 200 or the detachable plate 198 to cover the contingency that said members be made in one piece.

We mount on the ram plate the nozzle seating and stripping tool 306 to function at station 3 as shown in Fig. 34 and as shown in detail in Fig. 37, the washer seating and stripping tool 339 to function at station 5 as shown in Fig. 34 and as shown in detail in Fig. 42, the nozzle crimping and stripping tool 148' to function at station 7 as shown in Fig. 34 and as shown in detail in Fig. 50 and a nozzle holding and stripping tool 340 to function in association with the horizontally movable plungers 158' for use in forming diametric axis forming means on the nozzle wall 50' as shown in Fig. 26 and more particularly shown at station 7 of Fig. 34 and in Fig. 51. These four tools are in general constructed in accordance with the disclosure of such a crimping tool in Fig. 8 of the application for patent of James Rest, S. N. 48,043, filed Nov. 2, 1935, for Closure for bottles, collapsible tubes, and like containers, and are in general provided with an exterior annular holding or shaping portion 342, a plunger portion 344 slidable relative to said outer portion, one of said portions normally being urged downwardly by a compressible spring 346 mounted in the upper portion of said tool.

The nozzle seating and stripping tool 306 adapted to function at station 3 is more particularly shown in Fig. 37. The inner portion of the lower end of the annular portion is tapered upwardly to provide a frustro-conical portion 348 to firmly seat against the annular portion 12' of the tube resting on the upper end of a mandrel. The plunger portion 344 is normally urged downwardly by the spring 346 mounted in a suitable compartment 351 in said tool, and it is apparent that the spring 346 will urge the plunger portion 344 downwardly as the ram plate 198 starts to raise the outer portion 342 from the annular tube portion 12', thereby assisting in stripping the tool 306 from said tube seated on the nozzle and thereby stripping the tube from said tool. An enlarged head portion 349 of said plunger abuts the lower end of the compartment 351 to prevent the plunger 344 from falling out of the tool.

As stated hitherto, we also provide means for automatically cutting a washer 56' or succession of washers from strip material 350 and inserting it within the countersunk recess 42' in said nozzle 16', in the embodiment shown in the lower valve seat portion 24' formed therein, including tool means mounted on said ram plate and in our preferred embodiment shown, we preferably employ means to function in association therewith for slightly flattening opposite portions of the nozzle wall 50' so that said nozzle 16' may resiliently retain a valve 32' therein. While said means may be constructed in any suitable fashion, in our preferred embodiment, they are preferably constructed as follows. We provide a spool 352 on which is wound a continuous strip of washer material 350 and we provide means for feeding said strip washer material over the center of a mandrel 126', including upper and lower feed rolls 354 and 356 respectively suitably mounted on a casing 358 suitably mounted on the table 216. We also provide means including a ratchet for intermittently actuating said feed rolls 354 and 356 from said drive shaft 220 during the upper portion of the ram plate stroke. In the preferred embodiment shown for this purpose an arm 360 has the upper portion thereof rigidly attached to said shaft 220 and has the lower end thereof pivotally connected to the link 362 having its opposite end pivotally connected to a rack bar 364 slidably mounted in a guideway 366 in said casing. If desired suitably adjustable set screws 368 may be provided on opposite sides of said arm 360 to abut stop shoulders 370 on said frame on opposite sides of said arm to initially regulate the amount of reciprocating movement imparted to the rack bar 364. The rack bar 364 is provided with the oblique rack teeth 372 thereon to advance the respective feed rolls 354 and 356 intermittently in a manner to be described. A large gear 374 is loosely mounted on a shaft 376 extending transversely of said casing 358. Said shaft 376 has the ratchet gear 378 rigidly mounted thereon. A pawl 380 is pivotally mounted on the side wall of the large gear 374 to intermittently actuate said ratchet on the forward stroke of said rack bar 364. A gear 382 also rigid on said shaft 376 drives a suitable gear 384 fast on the shaft on which the lower feed roll 356 is mounted, which in turn meshes with a gear 386 on the shaft of the upper feed roll 354 for positively driving both said upper and lower feed rolls 354 and 356 during the forward motion of said rack.

A narrow die plate 388 is suitably mounted on said table 216 substantially radially of the center of the ring and extending over the center of a mandrel 126' when in a fixed operating position.

Also in substantially the same radial alignment are the following tools mounted in the following order on said ram plate 198. The external tool thereof comprises a circular washer center hole piercing tool 390. Said washer center hole piercing tool or plunger 390 is adapted to project downwards through a suitable circular hole 392 in the die 388 to cut out the circular center portion 394 of the washer shown dropping below the die 388. Said plunger 390 may, as in the embodiment shown, also be provided with the embossing sleeve 396, in our preferred embodiment provided with concentric embossing ridges on the end thereof to provide concentric grooves on said washer stock exterior of the hole 398 formed therein by cutting the center portion 394 therefrom. The intermediate tool comprises a pilot tool 400 adapted to descend into a suitable hole 402 therefor in the die 388. The internal tool comprises a washer blanking tool 404 having an outer circular cutting edge 406 at the lower end thereof of the desired external periphery of the washer adapted to descend within a suitable hole 408, also of substantially the desired size of the washer in the die plate 388 to cut the washer from said washer stock and feed it downwards through said hole. The hole 408 is exactly in alignment with a nozzle 16' suitably mounted on the mandrel 126' below it.

We also provide means including a portion carried by said ram plate to raise said upper roll 354 to release said washer strip 350 to permit the pilot tool 400 to accurately align the washer strip 350 during the down stroke of the ram plate, said portion carried by the ram plate comprising the trigger 410 pivotally mounted on an arm 412 projecting laterally from said ram plate 198 and normally urged outwardly to a substantially vertical position by the spring 414. A lever 416 is pivotally mounted on said casing 358 and is provided with a work arm (not shown), for lifting the upper roll 354 against the pressure of the spring 418. The outer end of the power arm 420 of said lever has a toe 422 at the lower end thereof and a cam surface 424 thereon above said toe. It is thus apparent that on the downward stroke of the ram, the lower end of the trigger 410 will initially contact the toe 422 to raise the upper feed roll 354. The pilot tool 400 will then register in the washer center hole 398 immediately below it to accurately align the washer strip 350 prior to the cutting ends of the washer center piercing tool 390 and washer blanking tool 404 striking the washer strip 350. Substantially at this period of the down stroke of the ram, the cam surface 424 functions to pivot the trigger 410 against the pressure of the spring 414 to pivot the lower end of the trigger out of contact with the toe 422 to permit the spring 418 to force the upper feed roll 454 downwardly to again provide a nip between said upper and lower feed rolls 354 and 356 to rigidly hold the washer stock 350 while the cutting tools 390 and 404 function simultaneously to cut the washer therefrom. The washer blanking tool 404 is provided with a plunger 426 mounted centrally thereof provided with a mushroom shaped washer seating head 428 and a central pilot lug 430. Said plunger 426 is adapted to advance after the cutting edge 406 has functioned to cut the washer within its respective die hole 408, said mushroom head being substantially the diameter of said hole 409, to force said washer downwards within its seat 42' in said nozzle 16', the pilot lug 430 fitting within the central hole 398 in said washer to guide it downwards into position in said countersunk washer seat 42'. To advance said plunger 426 after the washer cutting tool sleeve 404 has completed its downward stroke, we provide a lever 432 pivotally mounted on the ram plate 200 having an end thereof pivotally connected to said plunger 426 and a free end 434. An adjustable stop 436 is suitably mounted on the frame of the machine and is adapted on the downward stroke of the ram to contact the free end 434 of said lever to advance said plunger 426 to seat said washer 56' within the washer seat 42' in said nozzle 16' after said washer 56' has been cut from said strip washer material 350 on the downward stroke of the ram plate in the manner hitherto described. To urge the plunger 426 to its upper position a suitable helical expansion spring 438 is mounted on said plunger between the upper edge of the ram plate 200 and a suitable enlargement on the upper end of said plunger.

As stated hitherto, we also provide in association with said die plate, means mounted thereon to flatten diametrically opposite portions of said nozzle wall 50' as the nozzle carrying mandrels 126' are passed therethrough. In our preferred embodiment, said means comprises the spaced rollers 440 suitably mounted on pins 442 projecting downwardly from the lower surface of said die plate, the peripheries of said rollers being spaced apart the desired distance between said desired diametric flattened sides. In the embodiment shown, said rollers 440 are tapered downwardly so as to inwardly flatten the upper portions of the nozzle wall 50' only. It is thus obvious that this flattening will occur as each nozzle is advanced by the ring away from the washer punching position shown between said rollers.

As previously explained and as shown diagrammatically in Fig. 34, we provide at the washer seating station 5 to accurately seat and concave the washer 46' within its countersunk recess 42', the washer seating and stripping tool 339 adapted to function at this station and as shown in detail in Fig. 42 which as hitherto described and as hitherto stated, is generally similar to the nozzle stripping and seating tool 306 hitherto described in detail. In certain respects, however, the washer seating and stripping tool 339 differs from the general description of this type of tool hitherto given in that in this instance the plunger 344 is rigidly mounted centrally of said tool and the annular holding or stripping portion 342 is resiliently slidably mounted on said tool by the compressible springs 346 externally of said rigid center plunger portion 344. The compressible spring means 346 comprise as shown in Fig. 43 a set of three helical springs mounted in circular alignment between said slidable annular portion 342 and the rigid upper portion 345 of said tool, said tool also being provided with rigid guide rods 347 in the same circular alignment intermediate said springs 346. The upper ends 349 of said rods are enlarged in the form of bolt heads and are adapted to reciprocate in suitable chambers 351 in said rigid upper portion 345. The heads 349 abut the lower ends of said chambers to limit the downward movement of said annular slidable stripping portion 342. The plunger 344 terminates in a hemi-spherical lower end 444 of the desired curvature of the lower valve seat portion 24' and is adapted to contact the washer 56' resting loosely in its countersunk recess 42' and press it firmly downwards in concave formation to rigidly seat it within said recess, the outer periphery of the resilient washer abutting the adjacent wall of said recess to retain the washer within. In this instance the annular portion 342 functions to resiliently abut the upper end of said nozzle to function as a stripping portion as said seating plunger 344 is initially withdrawn from the interior of said nozzle.

As stated, we also provide means for automatically seating a nozzle closure having axis forming means diametrically thereof, a turning lug and an open dispensing portion within said nozzle with said turning lug in a substantially vertical position and the axis forming means in a substantially horizontal plane and preferably in association therewith means for correctly aligning said valve means so that they may be properly fed and seated by said valve seating means, in our preferred embodiment said means including an air nozzle 446 and an inclined chute 448 having a longitudinal slot 450 therein for receiving the ends of the valve turning lugs 38' for automatically correctly positioning and automatically feeding and seating said valves within the nozzles in the manner hereinbefore set forth, said means preferably functioning at station 6 as shown in Fig. 34 and as shown in detail in Figs. 44–49. Said inclined chute 448 has the longitudinal slot 450 therein and terminates in the flat lower portion 452.

Our preferred valve feeding means is particularly adapted for use in feeding valves having turning lugs constructed in accordance with the type of turning lug shown in the application of Elton C. Church for Nozzle closure means for containers, S. N. 101,967, in which said turning lug 38' is provided with the concaved outer walls 39 and thus terminates in the wider tip portion 41 adapted to support said lugs on said chute with the concaved portions thereof contained within said longitudinal slot 450. The valves may be manually fed to the upper end of said chute if desired or they may be automatically fed to the upper end of said chute in correct alignment by the means we have shown for this purpose in Fig. 49 and later to be described.

To take the valve from the chute and to feed the valve downwardly from the chute into the nozzle we have provided in said flat lower nozzle portion 452 suitable means for this purpose and employ in conjunction therewith the valve loading tool 454. We provide means in the flat lower portion 452 of said chute to permit the valve loading tool 454 to grip a valve therein and yield to permit said tool to push the valve downwardly through said lower flat portion into a nozzle. The valve loading tool 454 is suitably mounted on the ram plate 198 above the mandrel 126' located at the valve loading station 6 as shown in Fig. 34. Said mandrel is provided with a pair of transversely extending fingers 456 spaced apart to align between them the side walls of the tip 41 of said turning lug 38'. Said tool 454 is also provided with a pair of longitudinally spaced fingers 458, adapted to sink within said longitudinal chute slot 450 in the flat portion 452 of said chute, pivotally mounted on said tool 454 and having arms 460 extending upwardly therefrom. Spring means 462 are provided comprising a helical spring interposed between said arms yieldingly urging said arms apart so that said longitudinally extending fingers 458 may yieldingly grip the end walls of successive turning lugs between them prior to and as forced downwardly through said flat portion 452 in a manner to be described to firmly seat said valves with said turning lugs in a vertical position and the axis forming means thereof transversely aligned between the preferably flattened side walls of said nozzle. In practice the longitudinally spaced fingers 458 function to do the actual gripping of the valve tips 41, the transversely extending fingers 456 merely functioning as guide fingers.

To provide yieldable means in said flat portion 452 to permit the valve loading tool 454 on its downward stroke to pick up a valve turning lug 38' between the fingers thereof and feed it downwardly within said nozzle, we provide a stop plate 464 longitudinally slidably mounted on the outer portion of the flat lower portion 452 of said chute having a stop finger 466 projecting forwardly in said longitudinal slot 450 and a vertical slot 468 therein. Spring means are provided comprising tension springs 470 each having one end thereof connected to a stationary portion of said flat portion 452 and the opposite end thereof connected to said longitudinally slidable stop plate 464 to normally urge the stop finger 466 thereof forwards to a position substantially vertically in line with the pointed outer longitudinally extending tool finger. Said valve loading tool 454 is also provided with a supplemental finger 472 depending therefrom to contact the end of said vertical slot 468 to move said stop plate 464 outwardly on depression of said valve loading tool 454 to remove said finger 466 so that said tool may feed the valve 32' within the nozzle 16'. As part of said yielding means, we also mount within the flat lower portion 452 of said chute, a pair of oppositely disposed transversely movable plates 474 and provide a pair of spring means 476, one for each plate having one end thereof abutting each plate and the other end thereof abutting a stationary portion of said flat chute portion 452 to normally urge said transversely movable plates inwardly so that their inner ends 478 may be spaced to form a continuation of said longitudinal chute slot 450. Said transversely movable plates 474 are adapted to be spread by portions of said valve gripping tool, namely the transversely spaced fingers 456 on depression thereof contacting said ends 478 to permit said tool 454 to carry said valve downwards within the nozzle.

We also provide means to blow and agitate said valves 32' down the chute 448. As hitherto described, for this purpose we provide the air nozzle 446 discharging substantially at the lower end of the inclined chute portion in line with said longitudinal slot 450. We also provide means to agitate said chute for this purpose comprising the agitator 480 having an end 482 pivotally mounted on the inclined portion of said chute 448 and the free end 484 adapted to contact the lower surface of said chute and a pin 486 projecting laterally therefrom adjacent said free end. Spring means 488 having an end connected to said chute and its opposite end connected to the free end 484 of said agitator are provided to normally urge said free end 484 against said chute. A rack 490 is provided depending from said ram plate 198 provided with the rack teeth 492 adapted to successively contact said pin 486 on depression of said ram plate 198 to permit said spring means 488 to successively urge the free end 484 of the agitator 480 against said chute on depression of said ram to assist in sliding said valves 32' down the chute 448.

We also, as stated, provide means for automatically correctly positioning a succession of valves 32' with the turning lugs 38' in a position to have the tips 41' thereof successively supported by the edges of the longitudinal chute slot 450 to slide down said slot. Said means includes a hopper 493, a table 494 for individually successively receiving valves from the hopper 493, and conveyor means comprising an upper conveyor 496 and a lower conveyor 498 and an inclined chute 500 connecting said two conveyors. We also provide means to successively rotate said valves 32' upon said table 494 to bring the turning lugs 38' and upper valve orifices 34' in flat position and discharge them on said conveyor means. We also provide means to remove incorrectly positioned valves from said conveyor means, means to position said valves on said conveyor with the turning lugs in rear and in alignment and means to move said correctly positioned and aligned valves from said conveyor and feed the concaved sides of the turning lugs thereof within the longitudinal slot 450 in said inclined chute 448 in a position to permit the tips 41 of said valves to be gripped by the edges of said slot 450 to permit said valves to slide down the inclined chute (see Fig. 31).

We provide positive means to successively feed one valve at a time through said hopper 493. Said means comprises a gate wheel 495 having valve receiving notches 497 therein spaced 90° from each other rotatably mounted in a gate enlargement 491 in the channel spout 489. The main drive includes a stub shaft 499 having a drive pulley 501 on the end thereof driven by a suitable belt 503. Said stub shaft 499 has a pinion 505 thereon meshing with a gear 507 on a crank shaft 509. Said crank shaft 509 has the connecting rod 511 eccentrically mounted thereon. The gate wheel 495 is mounted on a shaft 513 which projects laterally from said gate enlargement 491 and has a ratchet gear 515 mounted on the exposed end thereof. The upper end of said connecting rod 511 has a pawl 517 mounted therein adapted on each revolution of said crank shaft 509 to actuate said ratchet 515 to move said gate wheel 45°. The lower end of the hopper body comprises a rotatable scoop portion 519 having a channel 521 for feeding one valve 32' at a time through the hopper spout 489. Said scoop portion 519 is rotated by the vertical hollow shaft 502 having the bevel gear 523 on the upper end thereof. Said crank shaft 509 has a bevel gear 525 mounted thereon, driving a suitable bevel gear 527 on the drive shaft 529 with a ratio of 2 to 1, as shown. A bevel gear 531 on the drive shaft 529 drives a bevel gear 533 on a shaft 535 projecting vertically upwardly adjacent said hopper 493 having a bevel gear 537 on the upper end thereof driving a bevel gear 539 on a cross shaft 541 having the bevel gear 543 on the opposite end thereof in mesh with the bevel gear 523 on the upper end of the hollow shaft 502.

Means may be provided to urge the valves 32' down said channel 521 and in the preferred embodiment shown, include a poker rod 545 having a lower end reciprocatable to abut said valves 32' to urge them down said channel 521. Said poker rod 545 is normally urged upwardly by the spring 547. The cross shaft 541 has a cam 549 mounted thereon actuating the power arm of a lever 551 pivotally mounted on top of said hopper 493 to cause the work arm thereof to intermittently abut said poker rod 545 to reciprocate said rod to feed said valves 32' down said channel 521. A rotatable sleeve 506 projects vertically upwardly through said table 494 and is suitably rotated by the main drive of the machine by means of a slippable belt 553 driven by a pulley 555 on the main drive shaft 529 driving a cooperating pulley 557 on said sleeve 506. Said drive sleeve 506 is provided with one or more radial arms 508 each having a hollow cup 504 mounted on the end thereof having an open lower end adapted to be rotated by said arm 508 around said table, the rotation of the cup or cups 504 being intermittent. For this purpose a disk 559 is mounted on said shaft 506 and has a plurality of stop projections 561 projecting upwardly therefrom corresponding in number and spacing to the arms 508. Means are provided to intermittently abut one of said projections to cause slippage of said belt 553. In the embodiment shown, said means comprises the tip of a bell crank lever 563 having its opposite end vertically reciprocated by the front end of a timing lever 565 having its rear end abutting a suitable cam 567 on the drive shaft 529. Each cup is adapted to receive a valve 32' as it drops from the lower end of the hopper 493 to contact the table 494 through the hollow lower end thereof. The cup 504 on the intermittent rotation thereof, rotates said valve on said table throughout substantially a circle to attempt to bring the turning lug 33' and upper valve orifice 34' thereof in a flat position on said table and discharge it on the upper conveyor 496 comprising a constantly moving conveyor. To discharge said valve from the side of each cup 504, a gate 510 is provided with an unlocking lug 512 projecting upwardly therefrom. A rod 514 projects upwardly through said drive sleeve 506 and has an arm 516 projecting radially therefrom adapted to abut said gate lug 512 to pivot said gate outwardly to leave the valve 32' previously held in said cup 504 on the upper conveyor 496 so that it may be carried forward thereon through said open gate 510. After said valve is discharged through said open gate, means are provided to lift the arm 516 away from contact with the gate lock 512 so that the hollow cup may receive another valve 32' from said hopper with the gate in a closed position to carry it around said table on rotation of said drive sleeve 506. For this purpose, in the preferred embodiment shown, the rod 514 is vertically reciprocated in the desired timed relationship by the front end of a cam lever 569 abutting the lower end thereof, the rear end of said lever 569 being reciprocated by a suitable cam 571 on said drive shaft 529, said rod 514 being normally biased to its lowermost position by the spring 573. A resiliently pivoted gate 518 is mounted on said machine adjacent said conveyor 496 to pivot out of the way of the cup as it moves from its position on said conveyor and to be spring urged to a position adjacent said conveyor to guide the valves thereon after said cup has passed therethrough.

We also provide trigger means 520 comprising a vertically movable plate adapted to be contacted by a valve 32' in incorrect position, namely, when the valve is other than in a position on said conveyor with its turning lug and upper valve orifice in flat position thereon. We also provide means comprising a transversely movable plunger 522 urged forwardly by suitable spring means 575 adapted to be released by said trigger means 520 to move forwards across said conveyor to knock or discharge incorrectly positioned valves 32' from said conveyor 496. Said plunger 522 has a projection 577 thereon and also has a cocking arm 579 projecting rearwardly and laterally therefrom. A cocking finger 581 projects radially from said vertical shaft 535 and on rotation thereof abuts said cocking arm 579 to urge said plunger 522 rearwards against the tension of the spring means 575 until the projection 577 engages a projection 583 on said trigger means 520 when its trigger plate pivots by gravity downwardly to its normal position after removal of an incorrectly positioned valve 32' from said conveyor 496 by said plunger 522 and thereby recocking said trigger 520 and plunger 522. The upper conveyor 496 is continuously driven around an end pulley 585 by a drive pulley 587. The drive pulley 587 has the gear 589 attached thereto engaging a pinion 591 on the end of a cross shaft 593 having a sprocket gear 595 on the rear end thereof driven by a sprocket chain 597 in mesh with a sprocket gear 599 on the crank shaft 509. We also provide a lower intermittently movable conveyor 498 having spaced knobs 524 projecting upwardly therefrom to receive the upper valve orifices 34' thereon and pulley means comprising an end pulley 526 and drive pulley 528 located generally centrally of our device for guiding and driving said conveyor 498. The drive pulley 528 is mounted on the front end of a cross shaft 601 which has the star gear 603 on the rear end thereof driven by the stud 605 projecting radially from the drive shaft 529 to advance said star gear 603 intermittently, one star tooth on each revolution of said drive shaft 529. Each pulley is provided with a plurality of spaced holes to receive extensions from said knobs 524 or other spaced means projecting therefrom to positively drive the conveyor, although any other suitable type of positive drive means may be provided.

As stated previously, we provide the inclined chute 500 leading from the end of the continuously moving conveyor 496 to the intermittently movable conveyor 498. Said chute 500 is confined by a top plate 530 and the side walls thereof are spaced at such a distance apart that the valves may fall down said chute without any rotation. A pivot shaft 532 is mounted on suitable bearing posts 534 projecting upwardly from the frame longitudinally over said conveyor 498. A cam shaft 536 is also mounted on said bearing posts underneath said pivot shaft 532 and is suitably rotated by the drive chain 538 driven by the drive shaft 529. A combination booster and gate member 540 is normally urged up and down at intermittent intervals by a suitable cam on said cam shaft. Said member is provided with a booster projection 542 projecting rearwardly therefrom adapted to strike a valve 32' as it leaves the end of the upper conveyor 496 and knocks it down the chute 500. Said member 540 is also provided with a gate portion 544 projecting downwardly therefrom adapted to close the lower end of the chute 500 as said booster portion 542 simultaneously knocks a valve down the chute and is adapted to be intermittently raised by said cam at desired intervals to feed a succession of valves at successively spaced time intervals on said intermittently movable conveyor 498 so that said knob portions 524 on said conveyor may successively pick up the valves at substantially the desired spacings thereon.

We also provide a set of pincer fingers 546 having the upper ends thereof mounted on said pivot shaft 532 and controlled in their transverse oscillation by 607 on the cam shaft 536. By said cam action are the pincer fingers adapted to grip opposite sides of the valve lugs 38' to align said lugs between intervals of movement of said conveyor 498, the timing of the drive for our improved mechanism being so arranged that the pincer fingers operate between intervals of movement of said conveyor. We also provide a transversely slidable finger 548 pivotally mounted on said pivot shaft 532 and controlled by a cam 609 on said cam shaft 536 adapted between intervals of movement of said conveyor to function substantially simultaneously with said pincer fingers 546 to abut a turning lug if wrongly in position in front of said valve 32'. Suitable stop means 550 are provided comprising the edge of a slot in the side wall of said conveyor operative to abut said lug after it has been partially moved by said transversely movable finger 548, on continued movement of said conveyor, to complete the rotation of said lug to the rear of said valve during the next interval of movement of said conveyor as illustrated in dotted lines in Fig. 49b. We also provide a second set of pincer fingers 552 pivotally mounted on said pivot shaft 532 and also controlled by suitable cam means 611 on said cam shaft 536 to function like said first set of pincer fingers to grip opposite sides of said rearwardly extending valve lugs 38' to align said lugs whether just previously rotated or otherwise between intervals of movement of said conveyor. To hold said successively actuated valves 32' against said conveyor 498 during actuation of said sets of pincer fingers 546 and 552 and transversely movable finger 548, we provide a frame 554 pivotally mounted on a portion of the machine and having mounted thereon a plurality of vertically movable holding plungers 556 terminating in the enlarged lower ends 558 normally urged downwardly by the springs 560, the pivotal movement of said frame being so timed to force said enlarged ends 558 downwardly to confine said respective valves against the conveyor during the first portion of the periods between intervals of movement of said conveyor so that during the later portions of said periods when the gang operation of said pincer fingers 546 and 552 and transversely movable finger 548 takes place, the valves may rotate, during this gang operation of said members, on axes formed between said knobs 524 and the lower ends 558 of said plungers. The frame 554 is rigidly mounted on the sleeve shaft 613 extending longitudinally and pivotally mounted on the machine. Said shaft 613 has the rocker arm 615 projecting rearwardly therefrom abutting a cam 617 on the main drive shaft 529 to pivot the frame 554 with the desired timed pivotal movement. We also provide an arcuate shield 562 substantially concentric with the periphery of the end pulley 526 to retain said valves 32' on said knobs 524 as they are discharged downwardly from the conveyor end pulley 526.

We also provide a vertical rotary shaft 564 having an arm 566 pivotally mounted thereon by means of the yoke 568 and projecting radially therefrom having a hollow cup 570 at the outer end thereof having the lugs 572 urged inwardly by the springs 574 at diametrically opposite sides thereof. Suitable means are provided to initially rotate said cup 570 into position between the inclined shield 562 and conveyor 498 so that said lugs 572 may register within the diametric axis forming dimples 60' of a valve 32' and then to rotate said cup into alignment with the upper end of said chute 448 so that the concaved portions 39' of a valve lug 38' may register in the longitudinal groove 450 thereof and then operative to lower said cup 570 to expand said lugs 572 against the action of said springs 574 to strip said valve from said cup on to said chute slot and then operative to raise said cup and to rotate it to starting operative position below said conveyor end and shield 562. While any suitable means may be provided to so move said arm, to provide rotary movement for said arm, a cam 576 is suitably mounted on the end of the cam shaft 536 and a rack 578 is longitudinally movable on the base plate 580 having teeth adapted to register with a suitable pinion 582 on the vertical shaft 564. A spring 584 normally urges the rack to inward position. The lever 586 having its lower end connected to said rack 578 is pivotally mounted intermediate its ends on an extension from the end bearing portion 534 and has its upper end abutting the surface of said cam 576. Thus, on a revolution of said cam shaft 536, will the arm 566 be alternately rotated outwardly from a loading position below said chute 448 and returned to its loading position. A spring 588 normally urges the pivotally mounted arm 566 upwardly. A supplemental cam 590 is also mounted on said cam shaft 536. A lever 592 is pivotally mounted on and extends longitudinally of the machine. A rod 594 having its lower end connected to the inner end of said lever is vertically reciprocated by said cam 590 and the outer end of said lever 592 underlies and abuts an extension 596 from said yoke 568 so that on the raising of said abutting lever end 592 by said cam 590 against the pressure of the spring 588, said cup 570 is lowered on pivoting of said yoke to strip the valve therefrom on to said chute 448, the spring 588 then functioning to raise said arm prior to its rear rotative movement. The side walls of said cup taper upwardly as at 598 at diametrically opposite sides thereof so that said cup may slide in position between the shield 562 and the downwardly moving portion of the conveyor 498. As a valve 32' is fed downwardly by the conveyor, it is obvious that the spring actuated lugs 572 will first sink within the dimples 60' and the feeding knob 524 for the valve may pivot downwardly through the tapered portion 598 on the then inner side of said cup 570, the cup 570 and its arm 566 gently pivoting downwardly against the pressure of the spring 588 to permit said feeding knob 524 to pass by said cup on the continued movement of the conveyor.

The respective conveyors 496 and 498 may alternatively be driven by any suitable means, the frame 554 may be alternatively suitably pivoted in timed relation to the movement of the cam shaft 536 by any suitable means, and the trigger 520 may be alternatively automatically set or cocked and the plunger 522 also suitably actuated by any suitable means than the respective means shown.

It is thus apparent that the aforedescribed mechanism operates completely automatically in almost human fashion to feed a single valve at a time within a hollow cup 504 rotated on a table 494 to bring the flat portions of the turning lug and upper orifice in alignment on said table in 90% of the cases with the turning lug in the desired position in rear of said valve and in approximately 98% of the cases with the flat portion of said lug and said upper valve orifice flat on said table 494 and upper conveyor 496. The 2% of wrongly positioned valves will function to abut the trigger means 520 to be automatically discharged from the conveyor by the plunger 522, the plunger 522 being automatically brought into operative position for a further actuation thereof and the trigger means automatically reset by means on the continued operation of the machine. After leaving the upper conveyor 496, the valves will be automatically boosted down the chute 500 by the booster 542 and retained in position by the gate 544 so that they may be loaded at the desired intervals on the respective knobs 524 of the intermittently movable conveyor 498. The sets of pincer fingers 546 and 552 will then operate to align the lugs 38' in the exact desired position centrally of said valves, the transversely movable fingers 548 and stop means 550 supplementally functioning simultaneously therewith to rotate the 10% of turning lugs wrongly projecting in front of their respective valves to the desired rearward position, during the gang operation of said fingers, the valves being retained in position by the plungers 556 to permit the proper rotative movement thereof to bring the lugs thereof in the desired position and alignment. As each respective valve leaves the conveyor, it is apparent that it will be automatically picked up from a position discharging from said conveyor by said cup and moved to a position to be automatically stripped therefrom to slide down said chute, being automatically stripped from said cup by our improved device.

As stated hitherto, a nozzle crimping and stripping tool 148' is provided operative to crimp the upper portion of the nozzle wall 50' downwardly over the upper portion of said at least partially spherical valve 32' to form an upper valve seat 46'. As also stated hitherto, this nozzle crimping and stripping tool 148' is generally similar to the nozzle seating and stripping tool 306 shown in Fig. 37 and described generically therein. This tool 148' differs from the tool 306 in following particulars. A tubular resilient rubber cushioning washer 600 is interposed between relatively movable portions of the outer annular portion 342 thereof. The lower end of said annular portion 342 around the orifice for the movable plunger 344 is provided with the partially spherical concavity 152' to perform the actual crimping operation. The lower end of the plunger 344 is provided with a central cavity 602 therein for receiving the turning lug 38' then mounted vertically within said nozzle so that the annular projecting portion 604 at the end thereof may abut the upper surface of the valve 32' and retain it in position while the crimping concavity 152' is functioning to crimp the upper end of the nozzle wall 50' downwardly over the valve to form said upper valve seat 46', and due to its actuation by the spring 346 to continue to abut said valve to permit the ready stripping of said annular portion 342 from said nozzle.

As stated hitherto, we provide means for pressing diametrically opposite portions of said nozzle wall 50' diametrically inwardly of the inner wall of said valve seat against said diametric axis forming means of said valve, said means being operative at station 8 as shown in Fig. 34 and we also provide means for tilting said turning lug to a closed position, said means being operative at station 8a as shown in Fig. 34 in association with said just described axis forming means.

While any suitable means may be provided for accomplishing this function, in our preferred embodiment, said means are preferably constructed as follows. For this purpose, we provide a nozzle holding and stripping tool 340 generally similar in its operation to the generic type of holding and stripping tools hitherto described in connection with the nozzle holding and stripping tool shown in Fig. 37, containing the exterior annular portion 342 and the spring actuated central plunger portion 344. In this instance, however, the lower end of the spring actuated plunger 344 is provided, as in the embodiment of this tool shown and described in Fig. 50 for crimping the nozzle wall to provide the upper valve seat, with a central cavity 602 for receiving the turning lug 38' therein and the annular wall 604 exterior of said concavity 602 for abutting said valve 32' to hold it firmly on its seat during the axis forming operation and to function in similar fashion to strip the annular portion 342 from the upper end of said nozzle, the lower end of the annular portion 342 being also provided with a concavity 152' for overlying the outer surface of the upper nozzle wall forming the upper valve seat 46' and the lower annular portion 342 being supplementally cushioned on its supporting upper portion by the supplemental springs 606 circularly aligned with the aligning rods 608 for supplementally yieldingly applying said outer annular portion 342 to also function as a retaining device during the operation of the axis forming plungers 158'. The lower ends of said rods are provided with the screw heads 610 to limit the downward movement of said annular portions 342.

The diametric axis forming means is preferably constructed and operates in the following manner. A pair of stands 612 are mounted on said table 216 on transversely opposite sides of a mandrel 126', a pair of horizontally movable plungers 158' are transversely slidably mounted on said stands to move towards and away from said mandrel, said plungers being provided with the dimple forming projections 160' on their inner ends and having the vertical holes or cam slots 162'. A pair of arms 614 are mounted to depend vertically from each side of said nozzle holding and stripping tool 340 having spaced upper portions 616, center cam portions 164' projecting obliquely transversely outwardly therefrom and vertical lower portions 618 spaced a greater distance apart than said upper portions 616, whereby on depression of said tool 340, said center cam portions 164' may engage the inner edges of said plunger holes or cam slots 162' to force the projections 160' on the inner ends of said slidable plungers 158' inwardly to force said projections 160' on said inner ends against said nozzle walls 59' while said valve 32' is held in position by said valve holding tool 340 to punch projections 66' inwardly of said nozzle walls 59' fitting within said diametric axis forming dimples 60' on said valve 32' to form diametric axis forming and retaining means 66' projecting inwardly from said nozzle wall to function in association with said axis forming means or dimples 60' on said closure 32' and on raising of said tool, said center cam portions 164' may abut the outer edges of said plunger holes or cam slots 162' to remove the projections 160' of said plungers 158' from said nozzle, the nozzle holding tool 340 retaining said upper valve seat 46' and valve 32' in position on said lower valve seat portion 24' until the plungers have been moved away from said nozzle walls, and then stripping the tool from the nozzle in the manner hitherto described.

As also stated, we have provided at station 8a in association with the mechanism just described, means for tilting said turning lug 36' to a closed position. In the preferred embodiment shown, said means is constructed as follows as shown in detail in Fig. 53. Each of said pair of stands 612 has a pin 620 provided with a head 622 projecting upwardly therefrom. A yoke 155' is provided to connect said pins having holes 624 in the ends thereof to receive each of said pins 620. Spring means, namely, the helical springs 626 are provided to surround said pins, each having one end thereof abutting a pin head 622 and the other end thereof abutting the upper surface of the yoke end around a hole 624 to yieldingly align the yoke center portion 628 projecting transversely across the path of said mandrel to a height to abut a vertically extending valve turning lug 36' and lower it to a closed flattened position on movement of said conveyor, the springs 626 yieldingly permitting the center yoke portion 628 to spring past said lug on the continued movement of said conveyor after said lug is moved to lowered position.

As stated hitherto and as shown in Fig. 34, we have also provided a valve unloading station 9 and suitable means for automatically removing said nozzle 16' from said mandrel 126' or other holding means employed. For this purpose we provide the compressed air line 630 connected to project upwardly within the table 216 underneath said ring 122' in line with the path which each hollow mandrel 126' takes in passing thereover and arranged to be in line with an indexed position at station 9 of each respective mandrel. Adjacent this point a turning chute 632 is provided comprising a portion 634 projecting vertically upwardly axially of the mandrel and an upper arcuate turning portion 636 discharging the assembled nozzle downwardly and away from the ring.

To provide means to admit air to the nozzle 446 for forcing the valves 32' down the chute 448 and to admit air to the air line 630 discharging vertically for removing the nozzles from the mandrels at the desired periods of the cycle of rotation of the main drive shaft 190, we provide an air chamber 638 mounted on a supporting arm 206 and continuously connected by means of the pipe 640 to a source of compressed air (not shown.) A pipe 642 is provided to connect said chamber 638 to the valve feeding air nozzle 446 and a pipe 644 is provided to connect said chamber 638 to said nozzle discharging compressed air line 630. The valves 646 and 648 respectively are provided in said chamber 638 each having the valve stems 650 and 652 projecting therefrom to control the passage of air from said chamber to said respective valve feeding line 642 and nozzle discharge line 644 and the cams 654 and 656 are mounted on said main drive shaft 190 adapted to respectively contact the valve stems 650 and 652 to open the respective valves 646 and 648 to admit air respectively to the valve feeding nozzle 446 and nozzle discharge compressed air line 630 at the desired periods of rotation of the drive shaft, the time intervals of feeding air in said cycle being controlled by the length of said cams, the nozzle discharge line being operative for a longer period than the valve feeding nozzle line.

As stated Figs. 30–32 are various views of the complete operative machine. Fig. 33 is an under plan view of the substantially crescent shaped ram plate 198 showing the position of the tools thereon and Fig. 34 illustrates the steps which are simultaneously performed at the various stations. In the operation of the machine, it is obvious that on each revolution of the cam shaft, the ram plate 198 is once depressed and successive mandrels successively carried forward to the successively indexed positions, 1–9 shown in Fig. 34. On each rotation of the drive shaft 190 on the upward stroke of the ram plate 198 the ring 122' is advanced to bring the mandrels 126' in their respective indexed positions underneath their respective tools or adjacent their respective means to operate thereon at the respective stations. The actual loading, forming, shaping or other work is performed on the parts of our device at each respective station during the down stroke of the ram. Thus at station 1 during the downward stroke of the ram a nozzle is taken from the conveyor 276 and loaded on its respective mandrel at station 1 by the mechanism hitherto described and shown in Fig. 35, the air plunger simultaneously functioning to firmly seat the nozzle, previously loaded at station 1 during the next prior rotation of the drive shaft, at station 2 and so on throughout the stations, the nozzle seating and stripping tool 306 functioning at station 3 to rigidly seat the nozzle on its respective mandrel, the washer cutting and inserting mechanism simultaneously functioning at station 4 as the parts carried by the ram plate are lowered, the washer seating and stripping tool carried by the ram plate simultaneously functioning on its respective nozzle and mandrel at station 5, the valve inserting tool carried by the ram plate simultaneously functioning to pick up a valve from the flat lower portion of said chute and insert it within its respective nozzle at station 6, the air nozzle 446 and agitator 480 functioning in timed relationship to also feed the valves during an early portion of said ram down stroke, the valve aligning mechanism shown in Fig. 49 continuously functioning at a different speed if desired to successively feed the valves to the upper end of the chute, the nozzle crimping and stripping tool 148' simultaneously functioning at station 7 on the downward stroke of the ram, the means for automatically pressing diametrically opposite portions of the nozzle wall diametrically inwardly functioning on the downward stroke of the ram at station 8 and during a portion of this same interval, air is admitted through the nozzle discharge line 630 to discharge the assembled nozzle from its respective mandrel at station 9, all at the desired intervals of the downward stroke of the ram. The rollers 440 for flattening diametrically opposite portions of said nozzle wall 50' and the valve closing tool 155' function on the up stroke of the ram as the ring is being moved by the indexing mechanism to the successive stations.

As stated hitherto, it is apparent that one or more of the successive steps hitherto described may be omitted or the specific order thereof shown varied.

It is apparent that we have provided a novel type of fully automatic assembly machine with the advantages explained above.

It is thus obvious that we have provided a novel type of nozzle closure means for containers, bottles, tubes, cans and the like having various novel features therein specifically designed for ease of manufacture of both nozzle member and valve member thereof and ease of assembly thereof, a novel valve member for this purpose and a novel method of its manufacture, a novel type of extrusion apparatus to extrude the nozzle in a novel method and forming a novel intermediate nozzle product, and a novel process of assembly as well as an entire process of manufacture of said nozzle closure means and a novel apparatus for assembling the valve closure member within the valve seat of the nozzle portion thereof with the advantages carefully explained above.

It is understood that our invention is not limited to the specific embodiments of apparatus shown and methods described and that various deviations may be made therefrom without departing from the spirit and scope of the appended claims.

What we claim is:

1. In an assembly apparatus for assembling oscillatable closure means in nozzles, in combination, a central standard, a ring rotatable on said standard, nozzle holding mandrel means located at equidistantly spaced points of said ring to provide at adjacent positions of said standard, a nozzle loading station, a washer loading station, a closure means loading station, a crimping station, a pivot forming station, a valve closing station, a second crimping station and an unloading station, indexing means to successively advance said ring equal amounts to successively change stations, crimping means mounted on said standard to function with the adjacent mandrel means at said crimping station to crimp the upper portion of the hollow nozzle side wall over the upper surface of said closure means, diametrically inwardly pressing means mounted on said standard at said pivot forming station to function with said adjacent mandrel means to press the nozzle side wall inwardly at diametric points thereof to form a pivotal axis of oscillation for said closure means, means mounted on said standard to function with the adjacent mandrel at said valve closing station to rotate said closure means to a closed position, and crimping means mounted on said standard to function with said adjacent mandrel at said second crimping station to perfect said first crimping and seal said closure means in a shipping position.

2. In an assembly apparatus for assembling oscillatable closure means in nozzles, in combination, a central standard, a ring rotatable on said standard, nozzle holding mandrel means located at equidistantly spaced points of said ring to provide at adjacent positions of said standard, a nozzle loading station, a washer loading station, a closure means loading station, a crimping station, a pivot forming station, a valve closing station and an unloading station, indexing means to successively advance said ring equal amounts to successively change stations, crimping means mounted on said standard to function with the adjacent mandrel means at said crimping station to crimp the upper portion of the hollow nozzle side wall over the upper surface of said closure means, diametrically inwardly pressing means mounted on said standard at said pivot forming station to function with said adjacent mandrel means to press the nozzle side wall inwardly at diametric points thereof to form a pivotal axis of oscillation for said closure means and means mounted on said standard to function with the adjacent mandrel at said valve closing station to rotate said closure means to a closed position.

3. In an assembly apparatus for assembling oscillatable closure means in nozzles, in combination, a central standard, a ring rotatable on said standard, nozzle holding mandrel means located at equidistantly spaced points of said ring to provide at adjacent positions of said standard, a nozzle loading station, a washer loading station, a closure means loading station, a crimping station, a pivot forming station, and an unloading station, indexing means to successively advance said ring equal amounts to successively change stations, crimping means mounted on said standard to function with the adjacent mandrel means at said crimping station to crimp the upper portion of the hollow nozzle side wall over the upper surface of said closure means and diametrically inwardly pressing means mounted on said standard at said pivot forming station to function with said adjacent mandrel means to press the nozzle side wall inwardly at diametric points thereof to form a pivotal axis of oscillation for said closure means.

4. In an assembly apparatus for assembling oscillatable closure means in nozzles, in combination, a central standard, a ring rotatable on said standard, nozzle holding mandrel means located at equidistantly spaced points of said ring to provide at adjacent positions of said standard, a nozzle loading station, a closure means loading station, a crimping station, a pivot forming station, a valve closing station, a second crimping station and an unloading station, indexing means to successively advance said ring equal amounts to successively change stations, crimping means mounted on said standard to function with the adjacent mandrel means at said crimping station to crimp the upper portion of the hollow nozzle side wall over the upper surface of said closure means, diametrically inwardly pressing means mounted on said standard at said pivot forming station to function with said adjacent mandrel means to press the nozzle side wall inwardly at diametric points thereof to form a pivotal axis of oscillation for said closure means, means mounted on said standard to function with the adjacent mandrel at said valve closing station to rotate said closure means to a closed position, and crimping means mounted on said standard to function with said adjacent mandrel at said second crimping station to perfect said first crimping and seal said closure means in a shipping position.

5. In an assembly apparatus for assembling oscillatable closure means in nozzles, in combination, a central standard, a ring rotatable on said standard, nozzle holding mandrel means located at equidistantly spaced points of said ring to provide at adjacent positions of said standard, a nozzle loading station, a closure means loading station, a crimping station, a pivot forming station and an unloading station, indexing means to successively advance said ring equal amounts to successively change stations, crimping means mounted on said standard to function with the adjacent mandrel means at said crimping station to crimp the upper portion of the hollow nozzle side wall over the upper surface of said closure means and diametrically inwardly pressing means mounted on said standard at said pivot forming station to function with said adjacent mandrel means to press the nozzle side wall inwardly at diametric points thereof to form a pivotal axis of oscillation for said closure means.

6. In an assembly apparatus for assembling oscillatable closure means in nozzles, in combination, a conveyor, nozzle holding mandrel means located at equidistantly spaced points of said conveyor to provide at spaced points of said conveyor a nozzle loading station, a washer loading station, a closure means loading station, a crimping station, a pivot forming station, a valve closing station, a second crimping station and an unloading station, indexing means to successively advance said conveyor equal amounts to successively change stations, crimping means to function with the adjacent mandrel means at said crimping station to crimp the upper portion of the hollow nozzle side wall over the upper surface of said closure means, diametrically inwardly pressing means at said pivot forming station to function with said adjacent mandrel means to press the nozzle side wall inwardly at diametric points thereof to form a pivotal axis of oscillation for said closure means, means to function with the adjacent mandrel at said valve closing station to rotate said closure means to a closed position, and crimping means to function with said adjacent mandrel at said second crimping station to perfect said first crimping and seal said closure means in a shipping position.

7. In an assembly apparatus for assembling oscillatable closure means in nozzles, in combination, a conveyor, nozzle holding mandrel means located at equidistantly spaced points of said conveyor to provide at spaced points of said conveyor, a nozzle loading station, a washer loading station, a closure means loading station, a crimping station, a pivot forming station, a valve closing station and an unloading station, indexing means to successively advance said conveyor equal amounts to successively change stations, crimping means to function with the adjacent mandrel means at said crimping station to crimp the upper portion of the hollow nozzle side wall over the upper surface of said closure means, diametrically inwardly pressing means at said pivot forming station to function with said adjacent mandrel means to press the nozzle side wall inwardly at diametric points thereof to form a pivotal axis of oscillation for said closure means, and means to function with the adjacent mandrel at said valve closing station to rotate said closure means to a closed position.

8. In an assembly apparatus for assembling oscillatable closure means in nozzles, in combination, a conveyor, nozzle holding mandrel means located at equidistantly spaced points of said conveyor to provide at spaced points of said conveyor a nozzle loading station, a washer loading station, a closure means loading station, a crimping station, a pivot forming station and an unloading station, indexing means to successively advance said conveyor equal amounts to successively change stations, crimping means to function with the adjacent mandrel means at said crimping station to crimp the upper portion of the hollow nozzle side wall over the upper surface of said closure means and diametrically inwardly pressing means at said pivot forming station to function with said adjacent mandrel means to press the nozzle side wall inwardly at diametric points thereof to form a pivotal axis of oscillation for said closure means.

9. In an assembly apparatus for assembling oscillatable closure means in nozzles, in combination, a conveyor, nozzle holding mandrel means located at equidistantly spaced points of said conveyor to provide at spaced points of said conveyor, a nozzle loading station, a closure means loading station, a crimping station, a pivot forming station, a valve closing station, a second crimping station and an unloading station, indexing means to successively advance said conveyor equal amounts to successively change stations, crimping means to function with the adjacent mandrel means at said crimping station to crimp the upper portion of the hollow nozzle side wall over the upper surface of said closure means, diametrically inwardly pressing means at said pivot forming station to function with said adjacent mandrel means to press the nozzle side wall inwardly at diametric points thereof to form a pivotal axis of oscillation for said closure means, means to function with the adjacent mandrel at said valve closing station to rotate said closure means to a closed position, and crimping means to function with said adjacent mandrel at said second crimping station to perfect said first crimping and seal said closure means in a shipping position.

10. In an assembly apparatus for assembling oscillatable closure means in nozzles, in combination, a conveyor, nozzle holding mandrel means located at equidistantly spaced points of said conveyor to provide at spaced points of said conveyor a nozzle loading station, a closure means loading station, a crimping station, a pivot forming station, and an unloading station, indexing means to successively advance said conveyor equal amounts to successively change stations, crimping means to function with the adjacent mandrel means at said crimping station to crimp the upper portion of the hollow nozzle side wall over the upper surface of said closure means and diametrically inwardly pressing means at said pivot forming station to function with said adjacent mandrel means to press the nozzle side wall inwardly at diametric points thereof to form a pivotal axis of oscillation for said closure means.

11. A machine for automatically assembling a nozzle closure within a nozzle for a container, said nozzle having a countersunk recess therein comprising holding means for the nozzle, means for automatically loading said nozzle on the holding means, means for automatically rigidly seating said nozzle on the holding means, means for automatically cutting a washer and inserting it within said countersunk recess in said nozzle, means for automatically positively seating said washer within said countersunk recess, means for automatically correctly aligning and automatically seating a nozzle closure having axis forming means diametrically thereof, a turning lug and an open dispensing portion within said nozzle, with said turning lug in a substantially vertical position and the axis forming means in a substantially horizontal plane, means for automatically pressing diametrically opposite portions of said nozzle wall diametrically inwardly to form bearing and retaining means diametrically of the inner wall of said valve seat adapted to be in alignment with said diametric axis forming means of said nozzle, means for automatically crimping the upper portion of said nozzle over said valve to form a valve seat and to retain said closure within said nozzle, means for automatically tilting said closure turning lug to a closed position, means for automatically removing said nozzle from said holding means and means for automatically relatively moving said other means relative to said holding means.

12. A machine for automatically assembling a nozzle closure within a nozzle for a container comprising holding means for the nozzle, means for automatically loading said nozzle on the holding means, and for automatically rigidly seating said nozzle on the holding means, means for automatically feeding a nozzle closure having axis forming means diametrically thereof, a turning lug and an open dispensing portion within said nozzle, with said turning lug in a substantially vertical position and the axis forming means in a substantially horizontal plane, means for automatically pressing diametrically opposite portions of said nozzle wall diametrically inwardly to form bearing and retaining means diametrically of the inner wall of said valve seat adapted to be in alignment with said diametric axis forming means of said nozzle, means for automatically crimping the upper portion of said nozzle over said valve to form a valve seat and to retain said closure within said nozzle, means for automatically removing said nozzle from said holding means and means for automatically relatively moving said other means relative to said holding means.

13. A machine for automatically assembling a nozzle closure within a nozzle for a container comprising holding means for the nozzle, means for automatically loading said nozzle on the holding means, and for automatically rigidly seating said nozzle on the holding means, means for automatically feeding a nozzle closure having axis forming means diametrically thereof, a turning lug and an open dispensing portion within said nozzle, with said turning lug in a substantially vertical position and the axis forming means in a substantially horizontal plane, means for automatically pressing diametrically opposite portions of said nozzle wall diametrically inwardly to form bearing and retaining means diametrically of the inner wall of said valve seat adapted to be in alignment with said diametric axis forming means of said nozzle, means for automatically crimping the upper portion of said nozzle over said valve to form a valve seat and to retain said closure within said nozzle, means for automatically tilting said closure turning lug to a closed position, means for automatically removing said nozzle from said holding means and means for automatically relatively moving said other means relative to said holding means.

14. A machine for automatically assembling a nozzle closure within a nozzle for a container, said nozzle having a countersunk recess therein, comprising holding means for the nozzle, means for automatically loading said nozzle on the holding means, and for automatically rigidly seating said nozzle on the holding means, means for automatically cutting a washer and inserting it within said countersunk recess in said nozzle, means for automatically feeding a nozzle closure having axis forming means diametrically thereof, a turning lug and an open dispensing portion within said nozzle, with said turning lug in a substantially vertical position and the axis forming means in a substantially horizontal plane, means for automatically pressing diametrically opposite portions of said nozzle wall diametrically inwardly to form bearing and retaining means diametrically of the inner wall of said valve seat adapted to be in alignment with said diametric axis forming means of said nozzle, means for automatically crimping the upper portion of said nozzle over said valve to form a valve seat and to retain said closure within said nozzle, means for automatically removing said nozzle from said holding means and means for automatically relatively moving said other means relative to said holding means.

15. A machine for automatically assembling a nozzle closure within a nozzle for a container comprising holding means for the nozzle, means for automatically loading said nozzle on the holding means, means for automatically rigidly seating said nozzle on the holding means, means for automatically correctly aligning and automatically feeding a nozzle closure having axis forming means diametrically thereof, a turning lug and an open dispensing portion within said nozzle, with said turning lug in a substantially vertical position and the axis forming means in a substantially horizontal plane, means for automatically pressing diametrically opposite portions of said nozzle wall diametrically inwardly to form bearing and retaining means diametrically of the inner wall of said valve seat adapted to be in alignment with said diametric axis forming means of said nozzle, means for automatically crimping the upper portion of said nozzle over said valve to form a valve seat and to retain said closure within said nozzle, means for automatically removing said nozzle from said holding means and means for automatically relatively moving said other means relative to said holding means.

16. A machine for assembling a nozzle closure within a nozzle for a container, said nozzle having a countersunk recess therein, comprising holding means for the nozzle, means for loading said nozzle on the holding means, means for rigidly seating said nozzle on the holding means, means for cutting a washer and inserting it within said countersunk recess in said nozzle, means for positively seating said washer within said countersunk recess, means for correctly aligning and feeding a nozzle closure having axis forming means diametrically thereof, a turning lug and an open dispensing portion within said nozzle, with said turning lug in a substantially vertical position and the axis forming means in a substantially horizontal plane, means for pressing diametrically opposite portions of said nozzle wall diametrically inwardly to form bearing and retaining means diametrically of the inner wall of said valve seat adapted to be in alignment with said diametric axis forming means of said nozzle, means for crimping the upper portion of said nozzle over said valve to form a valve seat and to retain said closure within said nozzle, means for tilting said closure turning lug to a closed position, means for removing said nozzle from said holding means and means for relatively moving said other means relative to said holding means.

17. A machine for assembling a nozzle closure within a nozzle for a container comprising holding means for the nozzle, means for loading said nozzle on the holding means, means for rigidly seating said nozzle on the holding means, means for feeding a nozzle closure having axis forming means diametrically thereof, a turning lug and an open dispensing portion within said nozzle, with said turning lug in a substantially vertical position and the axis forming means in a substantially horizontal plane, means for pressing diametrically opposite portions of said nozzle wall diametrically inwardly to form bearing and retaining means diametrically of the inner wall of said valve seat adapted to be in alignment with said diametric axis forming means of said nozzle, means for crimping the upper portion of said nozzle over said valve to form a valve seat and to retain said closure within said nozzle, means for removing said nozzle from said holding means and means for relatively moving said other means relative to said holding means.

18. A machine for automatically assembling a nozzle closure within a nozzle for a container, said nozzle having a countersunk recess therein comprising holding means for the nozzle, means for automatically loading said nozzle on the holding means, and for automatically rigidly seating said nozzle on the holding means, means for automatically inserting and seating a washer within said countersunk recess, means for automatically feeding a nozzle closure having axis forming means diametrically thereof, a turning lug and an open dispensing portion within said nozzle, with said turning lug in a substantially vertical position and the axis forming means in a substantially horizontal plane, means for automatically pressing diametrically opposite portions of said nozzle wall diametrically inwardly to form bearing and retaining means diametrically of the inner wall of said valve seat adapted to be in alignment with said diametric axis forming means of said nozzle, means for automatically crimping the upper portion of said nozzle over said valve to form a valve seat and to retain said closure within said nozzle, means for automatically removing said nozzle from said holding means and means for automatically relatively moving said other means relative to said holding means.

19. In a machine for automatically assembling at least partially spherical valve nozzle closures each having a turning lug having concaved side walls, axis of oscillation forming means diametrically thereof and an open dispensing portion therein, within nozzles for containers, said nozzles each having a countersunk recess within, comprising a standard, a ring rotatable on said standard having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said ring on each revolution of said shaft amounts equal to the distances between adjacent mandrels, means controlled by said ram plate for automatically loading a nozzle on a mandrel, an air actuated plunger for seating the nozzle on said mandrel controlled in its action by the strokes of said ram plate, a plurality of tools mounted on said ram plate in alignment with said mandrels, including a nozzle seating and stripping tool, a washer seating and stripping tool, a nozzle crimping and stripping tool, and a nozzle holding and stripping tool, each having an outer annular seating portion and a plunger portion slidable relative to said outer portion, and spring means mounted within said tool yieldingly urging one of said portions downwards, means for automatically cutting a washer and inserting it within said countersunk recess in said nozzle including tool means mounted on said ram plate, means mounted on said standard for slightly flattening opposite portions of the nozzle wall so that said nozzle may resiliently retain a valve therein, means including an air nozzle and an inclined chute having a longitudinal slot therein for receiving the end of a valve turning lug for automatically correctly positioning and automatically feeding said valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve while held in position by said nozzle holding tool, means for automatically tilting said valve turning lug to a closed position, compressed air means for automatically removing said nozzle from said mandrel means, an air chamber mounted on said standard continuously connected to a source of compressed air, means connecting said chamber to said valve feeding air nozzle and means connecting said chamber to said nozzle removing means, valves associated with each of said connecting means, and cams mounted on said main drive shaft to actuate means to open said valves for predetermined portions of each revolution of said drive shaft.

20. In a machine for automatically assembling at least partially spherical valve nozzle closures each having a turning lug having concaved side walls, axis of oscillation forming means diametrically thereof and an open dispensing portion therein, within nozzles for containers, said nozzles each having a countersunk recess within comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, an air actuated plunger for seating the nozzle on said mandrel controlled in its action by the strokes of said ram plate, a plurality of tools mounted on said ram plate in alignment with said mandrels, including a nozzle seating and stripping tool, a washer seating and stripping tool, a nozzle crimping and stripping tool, and a nozzle holding and stripping tool, each having an outer annular seating portion and a stripping plunger portion slidable relative to said outer portion, and spring means mounted within said tool yieldingly urging one of said portions downwards, means for automatically cutting a washer and inserting it within said countersunk recess in said nozzle including tool means mounted on said ram plate, means for slightly flattening opposite portions of the nozzle wall so that said nozzle may resiliently retain a valve therein, means including an air nozzle and an inclined chute having a longitudinal slot therein for receiving the end of a valve turning lug for automatically correctly positioning and automatically feeding said valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve while held in position by said nozzle holding tool, means for automatically tilting said valve turning lug to a closed position, compressed air means for automatically removing said nozzle from said mandrel means, an air chamber continuously connected to a source of compressed air, means connecting said chamber to said valve feeding air nozzle and means connecting said chamber to said nozzle removing means, valves associated with each of said connecting means, and cams mounted on said main drive shaft to actuate means to open said valves for predetermined portions of each revolution of said drive shaft.

21. In a machine for automatically assembling at least partially spherical valve nozzle closures each having a turning lug having concaved side walls, axis of oscillation forming means diametrically thereof and an open dispensing portion therein, within nozzles for containers, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool, a nozzle crimping tool, and a nozzle holding tool, means including an inclined chute having a longitudinal slot therein for receiving the end of a valve turning lug for automatically correctly positioning and automatically feeding said valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve while held in position by said nozzle and holding tool, and means for automatically removing said nozzle from said mandrel means.

22. In a machine for automatically assembling at least partially spherical valve nozzle closures each having a turning lug, axis of oscillation forming means diametrically thereof and an open dispensing portion therein, within nozzles for containers, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool and a nozzle crimping tool, means for automatically correctly positioning and automatically feeding said valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve, and means for automatically removing said nozzle from said mandrel means.

23. In a machine for automatically assembling at least partially spherical valve nozzle closures each having a turning lug having concaved side walls, axis of oscillation forming means diametrically thereof and an open dispensing portion therein, within nozzles for containers, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool, a nozzle crimping tool, and a nozzle holding tool, means including an inclined chute having a longitudinal slot therein for receiving the end of a valve turning lug for automatically feeding said valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve while held in position by said nozzle holding tool, and means for automatically removing said nozzle from said mandrel means.

24. In a machine for automatically assembling at least partially spherical valve nozzle closures each having a turning lug, axis of oscillation forming means diametrically thereof and an open dispensing portion therein, within nozzles for containers, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool and a nozzle crimping tool, for automatically feeding said valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve, and means for automatically removing said nozzle from said mandrel means.

25. In a machine for automatically assembling at least partially spherical valve nozzle closures each having a turning lug, axis of oscillation forming means diametrically thereof and an open dispensing portion therein, within nozzles for containers, said nozzles each having a countersunk recess within, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool, a washer seating tool, and a nozzle crimping tool, means for automatically cutting a washer and inserting it within said countersunk recess in said nozzle including tool means mounted on said ram plate, means for automatically feeding a valve within said nozzle with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve, and means for automatically removing said nozzle from said mandrel means.

26. In a machine for automatically assembling at least partially spherical valve nozzle closures each having a turning lug, axis of oscillation forming means diametrically thereof and an open dispensing portion therein, within nozzles for containers, said nozzles each having a countersunk recess within, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool, a washer seating tool, and a nozzle crimping tool, means for automatically cutting a washer and inserting it within said countersunk recess in said nozzle including tool means mounted on said ram plate, means for slightly flattening opposite portions of the nozzle wall so that said nozzle may resiliently retain a valve therein, means for automatically feeding a valve within said nozzle with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve, and means for automatically removing said nozzle from said mandrel means.

27. In a machine for automatically assembling at least partially spherical valve nozzle closures each having a turning lug, axis of oscillation forming means diametrically thereof and an open dispensing portion therein, within nozzles for containers comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, an air actuated plunger for seating the nozzle on said mandrel controlled in its action by the strokes of said ram plate, a plurality of tools mounted on said ram plate in alignment with said mandrels, including a nozzle seating tool, and a nozzle crimping tool, means including an air nozzle and an inclined chute having a longitudinal slot therein for receiving the end of a valve turning lug for automatically feeding said valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve, compressed air means for automatically removing said nozzle from said mandrel means, an air chamber continuously connected to a source of compressed air, means connecting said chamber to said nozzle removing means, valves associated with each of said connecting means, and cams mounted on said main drive shaft to actuate means to open said valves for predetermined portions of each revolution of said drive shaft.

28. In a machine for automatically assembling at least partially spherical valve nozzle closures each having a turning lug, axis of oscillation forming means diametrically thereof and an open dispensing portion therein, within nozzles for containers, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating and stripping tool, a nozzle crimping and stripping tool, and a nozzle holding and stripping tool, each having an outer annular seating portion and a stripping plunger portion slidable relative to said outer portion, and spring means mounted within said tool yieldingly urging one of said portions downwards, means for automatically feeding a valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve while held in position by said nozzle holding tool, and means for automatically removing said nozzle from said mandrel means.

29. In a machine for automatically assembling at least partially spherical valve nozzle closures each having a turning lug, axis of oscillation forming means diametrically thereof and an open dispensing portion therein, within nozzles for containers, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool, and a nozzle crimping tool, means for automatically feeding a valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve, means for automatically tilting said valve turning lug to a closed position, and means for automatically removing said nozzle from said mandrel means.

30. In a machine for automatically assembling at least partially spherical valve nozzle closures each having a turning lug, axis of oscillation forming means diametrically thereof and an open dispensing portion therein, within nozzles for containers, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, a holder for discharging a nozzle radially in line with a mandrel, having a stop pivotally mounted thereon, and spring means to return said stop to its operative position, a conveyor for successively feeding nozzles to said holder, a pivotally mounted chute adjacent said mandrel pivotable from a lowered position abutting said stop to release said stop position and receive a nozzle thereon to a vertical position for feeding said nozzle on said mandrel, means controlled by the stroke of said ram plate for pivoting said chute, a plurality of tools mounted on said ram plate in alignment with said mandrels, including a nozzle seating tool, and a nozzle crimping tool, means for automatically feeding a valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve, and means for automatically removing said nozzle from said mandrel means.

31. In a machine for automatically assembling at least partially spherical valve nozzle closures each having a turning lug, axis of oscillation forming means diametrically thereof and an open dispensing portion therein, within nozzles for containers, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a vertically mounted air cylinder above an adjacent mandrel having air ports at each end thereof and continuously connected to a source of compressed air, a plunger having a head for abutting said nozzle to seat it on said mandrel and a piston head within said cylinder, a vertically slidable valve plate having a compartment connected to a source of air supply and to one of said cylinder air ports at a time only to raise and lower said plunger, means controlled by said ram plate for controlling the position of said valve plate in synchronism with the ram strokes, a plurality of tools mounted on said ram plate in alignment with said mandrels, including a nozzle seating tool, and a nozzle crimping tool, means for automatically feeding a valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve, and means for automatically removing said nozzle from said mandrel means.

32. In a machine for automatically assembling at least partially spherical valve nozzle closures each having a turning lug, axis of oscillation forming means diametrically thereof and an open dispensing portion therein, within nozzles for containers, said nozzles each having a countersunk recess within, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool, a washer seating tool and a nozzle crimping tool, means including upper and lower feed rolls for feeding strip washer material over the center of a mandrel, means including a ratchet for intermittently actuating said feeding means from said drive shaft during the upper portion of the ram plate stroke, a circular washer center hole piercing tool, a pilot tool and a washer blanking tool mounted on said ram plate substantially in alignment with said strip washer material, a die plate having portions adapted to function in association with said aligned tools mounted below said strip washer material, means including a portion carried by the ram plate to raise said upper rolls to release said washer strip to permit the pilot tool to accurately align said washer strip during the down stroke of the ram plate, said washer blanking tool having a plunger mounted centrally thereof having a washer seating head, and pilot, a lever pivotally mounted on the ram plate having an end connected to said plunger and a free end adapted to be controlled by a stop to advance said plunger to seat said washer within said nozzle after said washer has been cut from said strip washer material on the downward stroke of the ram plate, and spring means to urge said plunger and attached lever to a raised position, spaced nozzle flattening rollers rotatably mounted on the lower surface of the die plate, means for automatically feeding a valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve, and means for automatically removing said nozzle from said mandrel means.

33. In a machine for automatically assembling at least partially spherical valve nozzle closures each having a turning lug having concaved side walls, axis of oscillation forming means diametrically thereof and orifices therein, within nozzles for containers, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool and a nozzle crimping tool, means including an inclined chute having a longitudinal slot therein for receiving the end of a valve turning lug for automatically feeding said valve within said nozzle, with said turning lug in a substantially vertical position and the axis forming means in a horizontal line extending transversely of the nozzle, means for automatically correctly positioning a succession of valves with the turning lugs in a position to be successively gripped by the edges of said longitudinal chute slot to fall down said slot, comprising a hopper, positive means to successively feed one valve at a time through said hopper, a table below said hopper, a hollow cup adapted to receive a valve as it drops from said hopper onto said table and rotate said valve on said table throughout substantially a circle to bring the turning lug and upper valve orifice thereof in a flat position on said table, a constantly moving conveyor adapted to receive said valve from said hollow cup, trigger means adapted to be contacted by incorrectly positioned valves, means actuated by said trigger means to discharge said incorrectly positioned valves from said conveyor, a lower intermittently movable conveyor having spaced knobs thereon to receive the upper valve orifices thereon, pulley means at each end of said conveyor, an inclined chute to discharge said valves from the upper to the lower conveyor, an intermittently actuated booster to move said valves from the upper conveyor down the chute in correct alignment, an intermittently movable gate at the lower end of the chute and start of the operative run of the lower conveyor to hold said valves so that on intermittent operation of said lower conveyor the spaced knobs thereof will successively engage the respective upper valve orifices of successive valves, a set of pincer fingers adapted to grip opposite sides of said valve lugs to align said lugs between intervals of movement of said conveyor, a transversely slidable finger adapted to initiate rotation of a turning lug if wrongly in a position in front of a valve between intervals of movement of said conveyor, and stop means to complete rotation of said lug to the rear of said valve during the next interval of movement of said conveyor, a second set of pincer fingers adapted to grip opposite sides of said rearwardly extending valve lugs to align said lugs between intervals of movement of said conveyor, means to hold said valves against said conveyor during actuation of said sets of pincer fingers and transversely movable finger, an arcuate shield adapted to retain successive valves on said knobs as they are discharging downwardly of the conveyor end pulley, a vertical rotary shaft having an arm projecting radially therefrom having a hollow cup at the outer end thereof having spring urged diametric lugs projecting inwardly thereof, and means to initially rotate said cup into position between said inclined shield and conveyor so that said lugs may register within said diametric axis forming means, operative to then rotate said cup in alignment with the end of said chute so that the concaved portions of said valve lug may register in the longitudinal groove thereof, to lower said cup to expand said lugs, to strip said valve from said cup onto said chute, and to again rotate said cup to a position below said conveyor end and shield, means for automatically pressing diametrically opposite portions of said nozzle wall diametrically inwardly to form bearing and retaining means diametrically of the inner wall of said nozzle in alignment with said diametric axis forming means on said valve, and means for automatically removing said nozzle from said mandrel means.

34. In a machine for automatically assembling substantially at least partially valve nozzle closures each having a turning lug having concaved side walls, axis of oscillation forming means diametrically thereof and orifices therein, within nozzle for containers, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool, and a nozzle crimping tool, means including an inclined chute having a longitudinal slot therein for receiving the end of a valve turning lug for automatically feeding said valve within said nozzle, with said turning lug in a substantially vertical position and the axis forming means in a horizontal line extending transversely of the nozzle, means for automatically correctly positioning a succession of valves with the turning lugs in a position to be successively supported by the edges of said longitudinal chute slot to fall down said slot, comprising a hopper, a table for individually receiving valves from the hopper, conveyor means, means to successively rotate said valves upon said table to bring the turning lugs and upper valve orifices in flat position and discharge them on said conveyor means, means to remove incorrectly positioned valves from said conveyor means, means to position said valves on said conveyor with the turning lugs in rear and in alignment, and means to move said correctly positioned and aligned valves from said conveyor and feed the turning lugs thereof within the longitudinal slot in said inclined chute in a position to permit said valves to slide down said inclined chute, means for automatically pressing diametrically opposite portions of said nozzle wall diametrically inwardly to form bearing and retaining means diametrically of the inner wall of said nozzle in alignment with said diametric axis forming means on said valve, and means for automatically removing said nozzle from said mandrel means.

35. In a machine for automatically assembling at least partially spherical valve nozzle closures each having a turning lug having concaved side walls, axis of oscillation forming means diametrically thereof and an open dispensing portion therein, within nozzles for containers, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool, and a nozzle crimping tool, means for slightly flattening opposite portions of said nozzle wall so that said nozzle may resiliently retain a valve therein, an inclined chute terminating in a flat lower portion having a longitudinal slot therein for successively supporting the outer concaved ends of valve turning lugs and feeding a succession of said valves over the center of a mandrel, a valve loading tool mounted on said ram plate above said mandrel having a pair of transversely extending fingers spaced to receive and guide the side walls of said turning lug between them, and a pair of spaced longitudinally extending fingers adapted to sink within said longitudinal chute slot pivotally mounted on said tool having arms extending upwardly therefrom and spring means yieldingly urging said arms apart so that said longitudinally extending fingers may yieldingly grip the ends of successive turning lugs between them to firmly seat said valves with said turning lugs in a vertical position and the axis forming means thereof transversely aligned between the flattened side walls of said nozzle, a stop plate longitudinally slidably mounted on the flat lower portion of said chute having a stop finger projecting forwardly in said longitudinal slot and a vertical slot therein and spring means normally urging said finger forwards to a position substantially in line with the outer longitudinally extending tool finger, said tool having a supplemental finger depending therefrom to contact the end of said vertical slot to move said plate outwardly on depression of said valve gripping tool to remove said finger so that said tool may feed the valve within the nozzle, a pair of oppositely disposed transversely movable plates and spring means normally urging said plates inwardly so that their inner ends are spaced to form a continuation of said longitudinal chute slot adapted to be spread by portions of said valve gripping tool on depression thereof to permit said tool to carry said valve downwards within the nozzle, an air nozzle discharging substantially at the end of the inclined chute portion in line with said longitudinal slot, an agitator having an end pivotally mounted on said chute, a free end adapted to contact the lower surface of said chute, and a pin projecting laterally therefrom, spring means normally urging said free end against said chute and a rack carried by said ram plate having teeth adapted to successively contact said pin on depression of said ram plate to permit said spring means to successively urge the free end of the agitator against said chute on depression of said ram plate to assist in sliding said valves down the chute, means for automatically pressing diametrically opposite portions of said nozzle wall diametrically inwardly to form bearing and retaining means diametrically of the inner wall of said nozzle in alignment with said diametric axis forming means on said valve, and means for automatically removing said nozzle from said mandrel means.

36. In a machine for automatically assembling at least partially spherical valve nozzle closures each having a turning lug having concaved side walls, axis of oscillation forming means diametrically thereof and an open dispensing portion therein, within nozzles for containers, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool, and a nozzle crimping tool, means for slightly flattening opposite portions of said nozzle wall so that said nozzle may resiliently retain a valve therein, an inclined chute terminating in a flat lower portion having a longitudinal slot therein for successively supporting the outer concaved ends of valve turning lugs and feeding a succession of said valves over the center of a mandrel, a valve loading tool mounted on said ram plate above said mandrel having a pair of transversely extending fingers spaced to receive and guide the side walls of said turning lug between them, and a pair of spaced longitudinally extending fingers adapted to sink within said longitudinal chute slot so that said longitudinally extending fingers may grip the ends of successive turning lugs between them to firmly seat said valves with said turning lugs in a vertical position and the axis forming means thereof transversely aligned between the flattened side walls of said nozzle, a stop plate longitudinally slidably mounted on the flat lower portion of said chute having a stop finger projecting forwardly in said longitudinal slot and a vertical slot therein and spring means normally urging said finger forwards to a position substantially in line with the outer longitudinally extending tool finger, said tool having a supplemental finger depending therefrom to contact the end of said vertical slot to move said plate outwardly on depression of said valve gripping tool to remove said finger so that said tool may feed the valve within the nozzle, a pair of oppositely disposed transversely movable plates and spring means normally urging said plates inwardly so that their inner ends are spaced to form a continuation of said longitudinal chute slot adapted to be spread by portions of said valve gripping tool on depression thereof to permit said tool to carry said valve downwards within the nozzle, means for automatically pressing diametrically opposite portions of said nozzle wall diametrically inwardly to form bearing and retaining means diametrically of the inner wall of said nozzle in alignment with said diametric axis forming means on said valve, and means for automatically removing said nozzle from said mandrel means.

37. In a machine for automatically assembling at least partially spherical valve nozzle closures each having a turning lug, axis of oscillation forming means diametrically thereof and an open dispensing portion therein, within nozzles for containers, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool, a nozzle crimping tool, and a nozzle holding tool, means for automatically feeding a valve within said nozzle, with said turning lug in a substantially vertical position and the axis forming means in a horizontal line extending transversely of the nozzle, a pair of stands mounted on transversely opposite sides of a mandrel, a pair of horizontally movable plungers having projections on their inner ends and vertical holes therein transversely slidable on said stands towards and away from said mandrel, a pair of arms mounted to depend vertically from each side of said nozzle holding tool having spaced upper portions, center cam portions projecting obliquely transversely outwardly therefrom and vertical lower portions spaced a greater distance apart than said upper portions whereby on depression of said tool said center cam portions may abut the inner edges of said plunger holes to force said plungers inwardly to force the projections on the inner ends thereof against said nozzle wall while said valve is held in position by said valve holding tool to form diametric axis forming and retaining means thereon in association with said axis forming means on said closure, and on raising of said tool said center cam portions may abut the outer ends of said plunger holes to remove said projections from said nozzle, and means for automatically removing said nozzle from said mandrel means.

38. In a machine for automatically assembling at least partially spherical valve nozzle closures each having a turning lug, axis of oscillation forming means diametrically thereof and an open dispensing portion therein, within nozzles for containers, comprising a movable conveyor having a plurality of nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool, and a nozzle crimping tool, means for automatically feeding a valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve, a pair of stands on transversely opposite sides of a mandrel having headed pins projecting upwardly therefrom, a yoke having vertical holes in the ends thereof to receive each of said pins, and spring means abutting said pin heads and upper surfaces of the yoke ends around said holes to yieldingly align the yoke center portion to abut the vertically extending valve turning lug and lower it to closed position on movement of the conveyor and yieldingly spring past said lug when said lug is in lowered position, and means for automatically removing said nozzle from said mandrel means.

39. In a machine for automatically assembling at least partially spherical valve nozzle closures each having a turning lug, axis of oscillation forming means diametrically thereof and an open dispensing portion therein, within nozzles for containers, comprising a central standard, a conveyor movable on said standard having a plurality of hollow nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, an air actuated plunger for seating the nozzle on said mandrel controlled in its action by the strokes of said ram plate, a plurality of tools mounted on said ram plate in alignment with said mandrels, including a nozzle seating tool, and a nozzle crimping tool, means including an air nozzle and an inclined chute having a longitudinal slot therein for receiving the ends of said turning lugs for automatically feeding a valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve, a compressed air line connectable to the lower end of each mandrel and a turning arcuate downwardly discharging chute mounted adjacent said line, an air chamber continuously connected to a source of compressed air, means connecting said chamber to said valve feeding air nozzle and means connecting said chamber to said nozzle discharge compressed air line, valves associated with each of said connecting means, and cams mounted on said main drive shaft to actuate means to open said valves for predetermined portions of each revolution of said drive shaft.

40. In a machine for automatically assembling at least partially spherical valve nozzle closures each having a turning lug, axis of oscillation forming means diametrically thereof and an open dispensing portion therein, within nozzles for containers, comprising a central standard, a conveyor movable on said standard having a plurality of hollow nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool, and a nozzle crimping tool, means for automatically feeding a valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve, a compressed air line connectible to the lower end of each mandrel and a turning arcuate downwardly discharging chute mounted adjacent said line, an air chamber continuously connected to a source of compressed air, means connecting said chamber to said nozzle discharge compressed air line, valve means associated with said connecting means and cam means mounted on said main drive shaft to actuate means to open said valve means for predetermined portions of each revolution of said drive shaft.

41. In a machine for automatically assembling at least partially spherical valve nozzle closures each having a turning lug, axis of oscillation forming means diametrically thereof and an open dispensing portion therein, within nozzles for containers, comprising a central standard, a conveyor movable on said standard having a plurality of hollow nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool, and a nozzle crimping tool, means including an air nozzle and an inclined chute having a longitudinal slot therein for receiving the ends of said turning lugs for automatically feeding a valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve, an air chamber continuously connected to a source of compressed air, means connecting said chamber to said valve feeding air nozzle, valve means associated with said connecting means, and cam means mounted on said main drive shaft to actuate means to open said valve means for predetermined portions of each revolution of said drive shaft.

42. In a machine for automatically assembling at least partially spherical valve nozzle closures each having a turning lug, axis of oscillation forming means diametrically thereof and an open dispensing portion therein, within nozzles for containers, comprising a central standard, a conveyor movable on said standard having a plurality of hollow nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, an air actuated plunger for seating the nozzle on said mandrel controlled in its action by the strokes of said ram plate, a plurality of tools mounted on said ram plate in alignment with said mandrels, including a nozzle seating tool, and a nozzle crimping tool, means for automatically feeding a valve within said nozzle, with said turning lug in a substantially vertical position and the axis forming means in a horizontal line extending transversely of the nozzle and means for automatically pressing diametrically opposite portions of said nozzle wall diametrically inwardly to form bearing and retaining means diametrically of the inner wall of said nozzle in alignment with said diametric axis forming means on said valve.

43. In a machine for automatically assembling at least partially spherical valve nozzle closures each having a turning lug, axis of oscillation forming means diametrically thereof and an open dispensing portion therein, within nozzles for containers, comprising a central standard, a conveyor movable on said standard having a plurality of hollow nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, means controlled by said ram plate for automatically loading a nozzle on a mandrel, a plurality of tools mounted on said ram plate in alignment with said mandrels, including a nozzle seating tool, and a nozzle crimping tool, means including an air nozzle and an inclined chute having a longitudinal slot therein for receiving the ends of said turning lugs for automatically feeding a valve within said nozzle, with said turning lug in a substantially vertical position and the axis forming means in a horizontal line extending transversely of the nozzle, means for automatically pressing diametrically opposite portions of said nozzle wall diametrically inwardly to form bearing and retaining means diametrically of the inner wall of said nozzle in alignment with said diametric axis forming means on said valve, a compressed air line connectable to the lower end of each mandrel and a turning arcuate downwardly discharging chute mounted adjacent said line, an air chamber continuously connected to a source of compressed air, means connecting said chamber to said valve feeding air nozzle and means connecting said chamber to said nozzle discharge compressed air line, valves associated with each of said connecting means, and cams mounted on said main drive shaft to actuate means to open said valves for predetermined portions of each revolution of said drive shaft.

44. In a machine for assembling valve closures within nozzles, having a movable conveyor having a plurality of nozzle holding mandrels mounted at equidistantly spaced intervals thereon, and a vertically reciprocal tool carrying ram plate, a holder for discharging a nozzle in line with a mandrel having a stop pivotally mounted thereon, and spring means to return said stop to its stop position, a conveyor for successively feeding nozzles to said holder, a pivotally mounted chute adjacent said mandrel pivotable from a lowered position abutting said stop to release said stop and receive a nozzle thereon to a vertical position for feeding said nozzle on said mandrel, a lever pivotally mounted adjacent said chute adapted on lowering thereof to pivot said chute to a vertical loading position, a finger pivotally mounted on said ram plate adaped to abut said lever to raise said chute on the downward stroke of said ram plate and release said lever substantially at the completion of said stroke, and spring means connected to said lever to positively lower said chute on release of said lever.

45. In a machine for assembling valve closures within nozzles, having a movable conveyor having a plurality of nozzle holding mandrels mounted at equidistantly spaced intervals thereon, and a vertically reciprocal tool carrying ram plate, a holder for discharging a nozzle in line with a mandrel having a stop pivotally mounted thereon, and spring means to return said stop to its operating position, a conveyor for successively feeding nozzles to said holder, a pivotally mounted chute adjacent said mandrel pivotable from a lowered position abutting said stop to release said stop and receive a nozzle thereon to a vertical position for feeding said nozzle on said mandrel, and means controlled by said ram plate for pivoting said chute.

46. In a machine for assembling valve closures within nozzles, having a movable conveyor having a plurality of nozzle holding mandrels mounted at equidistantly spaced intervals thereon, and a vertically reciprocal tool carrying ram plate, a vertically mounted air cylinder above an adjacent mandrel having air ports at each end thereof and continuously connected to a source of compressed air, a plunger having a head for abutting said nozzle to seat it on said mandrel and a piston head within said cylinder, a vertically slidable valve plate having a compartment connected to a source of air supply and connectable to one of said cylinder air ports at a time only to raise and lower said plunger, a lever pivotally mounted adjacent said valve plate having one arm thereof connected to said valve plate and a pin on the other arm thereof, said ram plate having a continuous vertically extending slot for receiving said pin having a vertical upper portion and a vertical lower portion spaced closer to said valve plate than said upper portion and an oblique center cam portion connecting said upper and lower vertical portions to shift said valve plate to cause said plunger to seat said nozzle on the down stroke of the ram plate and to release said plunger head on the upward stroke of said ram plate.

47. In a machine for assembling valve closures within nozzles, having a movable conveyor having a plurality of nozzle holding mandrels mounted at equidistantly spaced intervals thereon, and a vertically reciprocal tool carrying ram plate, a vertically mounted air cylinder above an adjacent mandrel having air ports at each end thereof and continuously connected to a source of compressed air, a plunger having a head for abutting said nozzle to seat it on said mandrel and a piston head within said cylinder, a vertically slidable valve plate having a compartment connected to a source of air supply and connectable to one of said cylinder air ports at a time only to raise and lower said plunger, and means controlled by said ram plate for controlling the position of said valve plate in synchronism with the ram strokes.

48. In a machine for assembling valve closures within nozzles, having a movable conveyor having a plurality of nozzle holding mandrels mounted at equidistantly spaced intervals thereon, and a vertically reciprocal tool carrying ram plate, means including upper and lower feed rolls for feeding strip washer material over the center of a mandrel, means including a ratchet for intermittently actuating said feeding means from said drive shaft during the upper portion of the ram plate stroke, a circular washer center hole piercing tool having an embossing sleeve also mounted thereon, a pilot tool and a washer blanking tool mounted on said ram plate substantially in alignment with said strip washer material, a die plate having portions adapted to function in association with said aligned tools mounted below said strip washer material, means including a portion carried by the ram plate to raise said upper roll to release said washer strip to permit the pilot tool to accurately align said washer strip during the down stroke of the ram plate, said washer blanking tool having a plunger mounted centrally thereof having a washer seating head and pilot, a lever pivotally mounted on the ram plate having an end connected to said plunger and a free end adapted to be controlled by a stop to advance said plunger to seat said washer within said nozzle after said washer has been cut from said strip washer material on the downward stroke of the ram plate, and spring means to urge said plunger and attached lever to a raised position and spaced nozzle flattening rollers mounted on the lower surface of the die plate.

49. In a machine for assembling valve closures within nozzles, having a movable conveyor having a plurality of nozzle holding mandrels mounted at equidistantly spaced intervals thereon, and a vertically reciprocal tool carrying ram plate, means including upper and lower feed rolls for feeding strip washer material over the center of a mandrel, means including a ratchet for intermittently actuating said feeding means from said drive shaft during the upper portion of the ram plate stroke, a circular washer center hole piercing tool, a pilot tool and a washer blanking tool mounted on said ram plate substantially in alignment with said strip washer material, a die plate having portions adapted to function in association with said aligned tools mounted below said strip washer material, means including a portion carried by the ram plate to raise said upper roll to release said washer strip to permit the pilot tool to accurately align said washer strip during the down stroke of the ram plate, said washer blanking tool having a plunger mounted centrally thereof having a washer seating head and pilot, a lever pivotally mounted on the ram plate having an end connected to said plunger and a free end adapted to be controlled by a stop to advance said plunger to seat said washer within said nozzle after said washer has been cut from said strip washer material on the downward stroke of the ram plate, and spring means to urge said plunger and attached lever to a raised position.

50. In a machine for assembling valve closures, each having a turning lug having concaved side walls, axis of oscillation forming means diametrically thereof and an open dispensing portion therein, within nozzles, having a movable conveyor having a plurality of nozzle holding mandrels mounted at equidistantly spaced intervals thereon, and a vertically reciprocal tool carrying ram plate, an inclined chute terminating in a flat lower portion having a longitudinal slot therein for successively supporting the outer concaved ends of valve turning lugs and feeding a succession of said valves over the center of a mandrel, a valve loading tool mounted on said ram plate above said mandrel having a pair of transversely extending fingers spaced to receive and guide the side walls of said turning lugs between them, and a pair of spaced longitudinally extending fingers adapted to sink within said longitudinal chute slot pivotally mounted on said tool having arms extending upwardly therefrom and spring means yieldingly urging said arms apart so that said longitudinally extending fingers may yieldingly grip the ends of successive turning lugs between them to firmly seat said valves with said turning lugs in a vertical position and the axis forming means thereof transversely aligned between the side walls of said nozzle, a stop plate longitudinally slidably mounted on the flat lower portion of said chute having a stop finger projecting forwardly in said longitudinal slot and a vertical slot therein and spring means normally urging said finger forwards to a position substantially in line with the outer longitudinally extending tool finger, said tool having a supplemental finger depending therefrom to contact the end of said vertical slot to move said plate outwardly on depression of said valve gripping tool to remove said finger so that said tool may feed the valve within the nozzle, a pair of oppositely disposed transversely movable plates and spring means normally urging said plates inwardly so that their inner ends are spaced to form a continuation of said longitudinal chute slot adapted to be spread by portions of said valve gripping tool on depression thereof to permit said tool to carry said valve downwards within the nozzle, an air nozzle discharging substantially at the end of the inclined chute portion in line with said longitudinal slot, an agitator having an end pivotally mounted on said chute, a free end adapted to contact the lower surface of said chute and a pin projecting laterally therefrom, spring means normally urging said free end against said chute and a rack carried by said ram plate having teeth adapted to successively contact said pin on depression of said ram plate to permit said spring means to successively urge the free end of the agitator against said chute on depression of said ram plate to assist in sliding said valves down the chute.

51. In a machine for assembling valve closures, each having a turning lug having concaved side walls, axis of oscillation forming means diametrically thereof and an open dispensing portion therein, within nozzles, having a movable conveyor having a plurality of nozzle holding mandrels mounted at equidistantly spaced intervals thereon, and a vertically reciprocal tool carrying ram plate, an inclined chute terminating in a flat lower portion having a longitudinal slot therein for successively supporting the outer concaved ends of valve turning lugs and feeding a succession of said valves over the center of a mandrel, a valve loading tool mounted on said ram plate above said mandrel having a pair of transversely extending fingers spaced to receive and guide the side walls of said turning lugs between them, and a pair of spaced longitudinally extending fingers adapted to sink within said longitudinal chute slot so that said longitudinally extending fingers may grip the ends of successive turning lugs between them to firmly seat said valves with said turning lugs in a vertical position and the axis forming means thereof transversely aligned between the side walls of said nozzle, a stop plate longitudinally slidably mounted on the flat lower portion of said chute having a stop finger projecting forwardly in said longitudinal slot and a vertical slot therein and spring means normally urging said finger forwards to a position substantially in line with the outer longitudinally extending tool finger, said tool having a supplemental finger depending therefrom to contact the end of said vertical slot to move said plate outwardly on depression of said valve gripping tool to remove said finger so that said tool may feed the valve within the nozzle, a pair of oppositely disposed transversely movable plates and spring means normally urging said plates inwardly so that their inner ends are spaced to form a continuation of said longitudinal chute slot adapted to be spread by portions of said valve gripping tool on depression thereof to permit said tool to carry said valve downwards within the nozzle.

52. In a machine for assembling valve closures, each having a turning lug having concaved side walls, axis of oscillation forming means diametrically thereof and an open dispensing portion therein, within nozzles, having a movable conveyor having a plurality of nozzle holding mandrels mounted at equidistantly spaced intervals thereon, and a vertically reciprocal tool carrying ram plate, an inclined chute terminating in a flat lower portion having a longitudinal slot therein for successively supporting the outer concaved ends of valve turning lugs and feeding a succession of said valves over the center of a mandrel, a valve loading tool mounted on said ram plate above said mandrel having a pair of transversely extending fingers spaced to receive and guide the side walls of said turning lugs between them, and a pair of spaced longitudinally extending fingers adapted to sink within said longitudinal chute slot pivotally mounted on said tool having arms extending upwardly therefrom and spring means yieldingly urging said arms apart so that said longitudinally extending fingers may yieldingly grip the ends of successive turning lugs between them to firmly seat said valves with said turning lugs in a vertical position and the axis forming means thereof transversely aligned between the side walls of said nozzle, a stop plate longitudinally slidably mounted on the flat lower portion of said chute having a stop finger projecting forwardly in said longitudinal slot and a vertical slot therein and spring means normally urging said finger forward to a position substantially in line with the outer longitudinally extending tool finger, said tool having a supplemental finger depending therefrom to contact the end of said vertical slot to move said plate outwardly on depression of said valve gripping tool to remove said finger so that said tool may feed the valve within the nozzle, a pair of oppositely disposed transversely movable plates and spring means normally urging said plates inwardly so that their inner ends are spaced to form a continuation of said longitudinal chute slot adapted to be spread by portions of said valve gripping tool on depression thereof to permit said tool to carry said valve downwards within the nozzle, and means to blow and agitate said valves down the chute.

53. Means for automatically correctly positioning a succession of valves with the turning lugs in a position to be successively gripped by the edges of a longitudinal chute slot to fall down said slot, comprising a hopper, positive means to successively feed one valve at a time through said hopper, a table below said hopper, a hollow cup adapted to receive a valve as it drops from said hopper onto said table throughout substantially a circle to bring the turning lug and upper valve orifice thereof in a flat position on said table, a constantly moving conveyor adapted to receive said valve from said hollow cup, trigger means adapted to be contacted by incorrectly positioned valves, means actuated by said trigger means to discharge said incorrectly positioned valves from said conveyor, a lower intermittently movable conveyor having spaced knobs thereon to receive the upper valve orifices thereon, pulley means at each end of said conveyor, an inclined chute to discharge said valves from the upper to the lower conveyor, an intermittently actuated booster to move said valves from the upper conveyor down the chute in correct alignment, an intermittently movable gate at the lower end of the chute and start of the operative run of the lower conveyor to hold said valves so that on intermittent operation of said lower conveyor the spaced knobs thereof will successively engage the respective upper valve orifices of successive valves, a set of pincer fingers adapted to grip opposite sides of said valve lugs to align said lugs between intervals of movement of said conveyor, a transversely slidable finger adapted to initiate rotation of a turning lug if wrongly in a position in front of a valve between intervals of movement of said conveyor, and stop means to complete rotation of said lug to the rear of said valve during the next interval of movement of said conveyor, a second set of pincer fingers adapted to grip opposite sides of said rearwardly extending valve lugs to align said lugs between intervals of movement of said conveyor, means to hold said valves against said conveyor during actuation of said sets of pincer fingers and transversely movable finger, an arcuate shield adapted to retain successive valves on said knobs as they are discharging downwardly of the conveyor end pulley, a vertical rotary shaft having an arm pivotally mounted thereon and projecting radially therefrom having a hollow cup at the outer end thereof having spring urged diametric lugs projecting inwardly thereof, and means to initially rotate said cup into position between said inclined shield and conveyor so that said lugs may register within said diametric axis forming means operative to then rotate said cup into alignment with the end of said chute so that the concaved portions of said valve lug may register in the longitudinal groove thereof, to lower said cup to expand said lugs to strip said valve from said cup onto said chute, and to rotate said cup to a position below said conveyor end and shield.

54. Means for automatically correctly positioning a succession of valves with the turning lugs in a position to be successively supported by the edges of a longitudinal chute slot to fall down said slot, comprising a hopper, a table for individually receiving valves from the hopper, conveyor means, means to successively rotate said valves upon said table to bring the turning lugs and upper valve orifices in flat position and discharge them on said conveyor means, means to remove incorrectly positioned valves from said conveyor means, means to position said valves on said conveyor with the turning lugs in rear and in alignment, and means to move said correctly positioned and aligned valves from said conveyor and feed the turning lugs thereof within the longitudinal slot in said inclined chute in a position to permit said valves to slide down said inclined chute.

55. In a machine for assembling valve closures within nozzles, having a movable conveyor having a plurality of nozzle holding mandrels mounted at equidistantly spaced intervals thereon, and a vertically reciprocal tool carrying ram plate having a nozzle holding tool depending therefrom, a pair of stands mounted on transversely opposite sides of a mandrel, a pair of horizontally movable plungers having projections on their inner ends and vertical holes therein transversely slidable on said stands towards and away from said mandrel, a pair of arms mounted to depend vertically from each side of said nozzle holding tool having spaced upper portions, center cam portions projecting obliquely transversely outwardly therefrom and vertical lower portions spaced a greater distance apart than said upper portions whereby on depression of said tool said center cam portions may engage the inner edges of said plunger holes to force said plungers inwardly to force the projections on the inner ends thereof against said nozzle wall while said valve is held in position by said valve holding tool to form diametric axis forming and retaining means thereon to function in association with axis forming means on said closure, and on raising of said tool said center cam portions may abut the outer edges of said plunger holes to remove said projections from said nozzle.

56. In a machine for assembling valve closures within nozzles, having a movable conveyor having a plurality of nozzle holding mandrels mounted at equidistantly spaced intervals thereon, and a vertically reciprocal tool carrying ram plate, a pair of stands mounted on transversely opposite sides of a mandrel having headed pins projecting upwardly therefrom, a yoke having vertical holes in the ends thereof to receive each of said pins, and spring means abutting said pin heads and upper surfaces of the yoke ends around said holes to yieldingly align the yoke center portion to abut a vertically extending valve turning lug and lower it to closed position on movement of the conveyor and yieldingly spring past said lug when said lug is in lowered position.

57. In a machine for automatically assembling at least partially spherical valve nozzle closures each having a turning lug having side walls, axis of oscillation forming means diametrically thereof and an open dispensing portion therein, within nozzles for containers, comprising a movable conveyor having a plurality of hollow nozzle holding mandrels mounted at equidistantly spaced intervals thereon, a drive shaft, a vertically reciprocal tool carrying ram plate, a connecting rod eccentrically connected to said drive shaft to vertically reciprocate said ram plate, indexing means to successively advance said conveyor on each revolution of said shaft amounts equal to the distances between adjacent mandrels, an air actuated plunger for seating a nozzle on a mandrel controlled in its action by the strokes of said ram plate, means including an air nozzle and an inclined chute having a longitudinal slot therein for receiving the ends of said turning lugs for feeding a valve within said nozzle, with said turning lug in a substantially vertical position and the axis forming means in a horizontal line extending transversely of the nozzle, a compressed air line connectable to the lower end of each mandrel and a turning arcuate downwardly discharging chute mounted adjacent said compressed air line, an air chamber continuously connected to a source of compressed air, means connecting said chamber to said valve feeding air nozzle and means connecting said chamber to said nozzle discharge compressed air line, valves associated with each of said connecting means, and cams mounted on said main drive shaft to actuate means to open said valves for predetermined portions of each revolution of said drive shaft.

58. In a machine for assembling a nozzle closure valve within a nozzle for a container, said nozzle having a recess therein, holding means for said nozzle with a washer inserted in said recess, and a nozzle closure valve having axis forming means diametrically thereof, a turning lug and an open dispensing portion, within said nozzle over said washer, with said turning lug in a substantially vertical position and the axis forming means in a substantially horizontal plane, means for pressing diametrically opposite portions of said nozzle wall diametrically inwardly to form bearing and retaining means diametrically of the inner wall of said nozzle in alignment and in association with said diametric axis forming means of said nozzle closure valve and means for crimping the upper portion of said nozzle over said nozzle closure valve to form a valve seat and to retain said closure within said nozzle.

59. In a machine for assembling a nozzle closure valve within a nozzle for a container, said nozzle having a recess therein, holding means for said nozzle with a washer inserted in said recess, and a nozzle closure valve having axis forming means diametrically thereof, a turning lug and an open dispensing portion, within said nozzle over said washer, with said turning lug in a substantially vertical position and the axis forming means in a substantially horizontal plane, means for simultaneously pressing diametrically opposite portions of said nozzle wall diametrically inwardly to form bearing and retaining means diametrically of the inner wall of said nozzle in alignment and in association with said diametric axis forming means of said nozzle closure valve and for crimping the upper portion of said nozzle over said nozzle closure valve to form a valve seat and to retain said closure within said nozzle.

60. In a machine for assembling a nozzle closure valve within a nozzle for a container, holding means for said nozzle with a nozzle closure valve having axis forming means diametrically thereof, a turning lug and an open dispensing portion, within said nozzle, with said turning lug in a substantially vertical position and the axis forming means in a substantially horizontal plane, means for pressing diametrically opposite portions of said nozzle wall diametrically inwardly to form bearing and retaining means diametrically of the inner wall of said nozzle in alignment and in association with said diametric axis forming means of said nozzle closure valve and means for crimping the upper portion of said nozzle over said nozzle closure valve to form a valve seat and to retain said closure within said nozzle.

61. In a machine for assembling a nozzle closure valve within a nozzle for a container, holding means for said nozzle with a nozzle closure valve having axis forming means diametrically thereof, a turning lug and an open dispensing portion within said nozzle, with said turning lug in a substantially vertical position and the axis forming means in a substantially horizontal plane, means for simultaneously pressing diametrically opposite portions of said nozzle wall diametrically inwardly to form bearing and retaining means diametrically of the inner wall of said nozzle in alignment and in association with said diametric axis forming means of said nozzle closure valve and for crimping the upper portion of said nozzle over said nozzle closure valve to form a valve seat and to retain said closure within said nozzle.

62. In a machine for assembling a nozzle closure valve within a nozzle for a container, said nozzle having a countersunk recess therein, holding means for the nozzle, means for locating a washer over said countersunk recess in said nozzle on said holding means, means for positively seating said washer within said countersunk recess permitting insertion of a nozzle closure valve having axis forming means diametrically thereof, a turning lug and an open dispensing portion within said nozzle over said washer with said turning lug in a substantially horizontal plane, means for pressing diametrically opposite portions of said nozzle wall diametrically inwardly to form bearing and retaining means diametrically of the inner wall of said nozzle in alignment and in association with said diametric axis forming means of said nozzle closure and means for crimping the upper portion of said nozzle over said nozzle closure valve to form a valve seat and to retain said closure within said nozzle.

63. In a machine for assembling a nozzle closure valve within a nozzle for a container, said nozzle having a countersunk recess therein, holding means for the nozzle, means for locating a washer over said countersunk recess in said nozzle on said holding means, means for positively seating said washer within said countersunk recess permitting insertion of a nozzle closure valve having axis forming means diametrically thereof, a turning lug and an open dispensing portion within said nozzle over said washer with said turning lug in a substantially vertical position and the axis forming means in a substantially horizontal plane, means for simultaneously pressing diametrically opposite portions of said nozzle wall diametrically inwardly to form bearing and retaining means diametrically of the inner wall of said nozzle in alignment and in association with said diametric axis forming means of said nozzle closure and for crimping the upper portion of said nozzle over said nozzle closure valve to form a valve seat and to retain said closure within said nozzle.

KENNETH CROWELL BAXTER,
*Administrator of the Estate of Albert H. Church, Deceased.*

KARL J. ROLLE.